US012592141B2

(12) United States Patent
Jacob et al.

(10) Patent No.: US 12,592,141 B2
(45) Date of Patent: Mar. 31, 2026

(54) FALL PROTECTION COMPLIANCE SYSTEM AND METHOD

(71) Applicant: MSA Technology, LLC, Cranberry Township, PA (US)

(72) Inventors: Matthew Frederick Jacob, Pittsburgh, PA (US); Vikram Thiruneermalai Gomatam, Cranberry Township, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 0 days.

(21) Appl. No.: 18/818,726

(22) Filed: Aug. 29, 2024

(65) Prior Publication Data

US 2025/0078641 A1 Mar. 6, 2025

Related U.S. Application Data

(60) Provisional application No. 63/579,975, filed on Sep. 1, 2023.

(51) Int. Cl.
*G08B 21/04* (2006.01)
*A62B 35/00* (2006.01)

(52) U.S. Cl.
CPC ...... *G08B 21/0461* (2013.01); *A62B 35/0056* (2013.01); *A62B 35/0068* (2013.01); *A62B 35/0075* (2013.01)

(58) Field of Classification Search
CPC .. G08B 21/0461; G08B 21/02; G08B 21/043; G08B 21/0446; A62B 35/0056; A62B 35/0068; A62B 35/0075
See application file for complete search history.

(56) References Cited

U.S. PATENT DOCUMENTS

2019/0234202 A1* 8/2019 Orban ........................ G01S 5/30
2019/0338593 A1 11/2019 Knickrehm et al.
2022/0134149 A1 5/2022 Carlson et al.
2022/0379146 A1 12/2022 Carkin
2022/0404388 A1 12/2022 Sepe et al.
2023/0364452 A1* 11/2023 Thayer ............... A62B 35/0037

FOREIGN PATENT DOCUMENTS

WO 2023/017482 2/2023

OTHER PUBLICATIONS

Patent Cooperation Treaty, PCT/US2024/0044326, International Search Report and Written Opinion of the International Searching Authority, Nov. 20, 2024.

* cited by examiner

*Primary Examiner* — Davetta W Goins
*Assistant Examiner* — Sharmin Akhter
(74) *Attorney, Agent, or Firm* — Jones Day

(57) ABSTRACT

A fall protection compliance system includes a fall limiting device connected to an anchor. The fall limiting device comprises a connection device and a sensor system associated with the connection device. The sensor system is configured to determine whether a connector is connected to the connection device and to transmit a signal based on detecting that the connector is connected to the connection device, where operation of a machine associated with the anchor is controlled based on the signal.

20 Claims, 40 Drawing Sheets

FALL PROTECTION COMPLIANCE SYSTEM AND METHOD

CROSS-REFERENCE TO RELATED APPLICATIONS

This application claims priority to U.S. Provisional Application No. 63/579,975, filed Sep. 1, 2023, which is incorporated herein by reference in its entirety.

This application is related to U.S. patent application Ser. No. 18/351,615, which is a continuation in part of U.S. patent application Ser. No. 17/876,699, filed Jul. 29, 2022, which is a continuation in part of U.S. patent application Ser. No. 16/742,381, filed Jan. 14, 2020, which claims priority to U.S. Provisional Application No. 62/792,208, filed Jan. 14, 2019, U.S. Provisional Application No. 62/861,545, filed Jun. 14, 2019, and U.S. Provisional Application No. 62/944,071, filed Dec. 5, 2019, the entireties of each of which are incorporated by reference herein in their entirety.

BACKGROUND

Technical Field

The present disclosure relates generally to the field of safety equipment, and more particularly, to systems and methods for monitoring and recording the use of fall protection equipment.

Technical Description

Safety equipment is often required in the fields of construction, rescue operations, and recreational activities that occur in environments that pose a danger to the user, such as a risk of falling from an elevated height. Most safety equipment is subject to compliance with various regulatory standards, such as those instituted by the Occupational Safety and Health Administration (OSHA) and the National Institute for Occupational Safety and Health (NIOSH). These standards contain information regarding the use of safety equipment, as well as the need for proper inspection, monitoring, and record keeping.

A number of challenges exist regarding inspection, monitoring, and record keeping for safety equipment. For example, verification of use and compliance of such use with existing standards is difficult to confirm without actual physical inspection of the individual wearing the safety equipment while performing the activity. Direct and ongoing verification of use for compliance is virtually impossible in environments where dozens of workers at a construction site may be using different types of safety equipment.

In view of these and other disadvantages of existing safety equipment, it is desirable to provide systems and methods for monitoring and recording the use of safety equipment.

SUMMARY

Therefore, and generally, the present disclosure provides improved systems and methods for monitoring and recording the use of safety equipment. In particular, the present disclosure provides a fall protection compliance system and method that may be configured to detect that a connection has been made between a worker wearing a fall protection harness or similar safety equipment, and an anchor point. The system and method may be further configured to indicate the proper connection, disconnection, and usage compliance of the safety equipment regarding an unsafe or safe condition or area. The system and method may be further configured to store information regarding various aspects of the system, such as connection status of the safety equipment and/or length of use of the safety equipment. The system and method may be further configured to transmit connection status information to an external device or system.

In some non-limiting embodiments or aspects, a connector for a fall protection compliance system may include a frame having an opening and a connection area configured for receiving a connection structure therein, and a connection sensor assembly associated with the frame. The connection sensor assembly may include at least one permanent magnet configured for generating a magnetic field within at least a portion of the connection area, at least one magnetometer configured for detecting a presence or an absence of a disturbance in the magnetic field, and a control device having at least one processor programmed or configured to: receive connection data from the at least one magnetometer, determine a connection status of the connector based on detecting the presence or the absence of the disturbance in the magnetic field, and perform at least one action based on the connection status.

In some non-limiting embodiments or aspects, detecting the presence of the disturbance in the magnetic field may be indicative of a presence of a ferromagnetic material of the connection structure within the connection area, and detecting the absence of the disturbance in the magnetic field may be indicative of an absence of the ferromagnetic material of the connection structure within the connection area.

In some non-limiting embodiments or aspects, the connection status may include a connected status indicative of a presence of a ferromagnetic material of the connection structure within the connection area and a disconnected status indicative of an absence of the ferromagnetic material of the connection structure within the connection area.

In some non-limiting embodiments or aspects, the at least one action may include providing at least one of a visual indication, an audio indication, and a tactile indication based on the connection status. The at least one action may include providing at least one of a first visual indication, a first audio indication, and a first tactile indication indicative of a presence of a ferromagnetic material of the connection structure within the connection area, or providing at least one of a second visual indication, a second audio indication, and a second tactile indication indicative of an absence of the ferromagnetic material of the connection structure within the connection area. At least one of the first visual indication, the first audio indication, and the first tactile indication may be the same as or different from the second visual indication, the second audio indication, and the second tactile indication.

In some non-limiting embodiments or aspects, the connection sensor assembly further may include a communication interface, and the at least one action may include transmitting the connection status to a remote device using the communication interface. The connection sensor assembly further may include at least one short-range wireless communication antenna configured for detecting a presence or an absence of an identification element on the connection structure, and at least one processor may be further programmed or configured to: receive communication data from the at least short-range wireless communication antenna, and determine the connection status of the connector based on detecting the presence or the absence of the identification element. Detecting the presence of the identification element may be indicative of a presence of an approved connection structure, and detecting the absence of the identification element may be indicative of an absence of the approved connection structure.

In some non-limiting embodiments or aspects, the at least one processor may be further programmed or configured for storing the data received from the at least one magnetometer and the at least short-range wireless communication antenna. The at least one magnet and the at least one magnetometer may be positioned away from a surface of the frame that is configured for contacting the connection structure.

In some non-limiting embodiments or aspects, the connector may have a gate for selectively enclosing the opening of the frame. The gate may be movable between a closed position preventing passage through the opening and into the connection area and an open position permitting passage through the opening and into the connection area. The gate may be biased to the closed position by a biasing member. A locking assembly may be operatively connected to the gate and movable between a first position and a second position. In the first position, the locking assembly may be configured for preventing movement of the gate from the closed position toward the open position, and, in the second position, the locking assembly may be configured for permitting movement of the gate from the closed position toward the open position.

In some non-limiting embodiments or aspects, a computer-implemented method for detecting connection of a connector to a connection structure may include receiving, with a control device having at least one processor, connection data gathered by at least one sensor configured for detecting a presence or an absence of an object within a connection area of the connector, determining, with the control device, a connection status of the connector based on detecting the presence or the absence of the object, and performing, with the control device, at least one action based on the connection status.

In some non-limiting embodiments or aspects, detecting the presence of the object may be based on detecting a disturbance in a magnetic field within the connection area that is indicative of a presence of a ferromagnetic material of the connection structure within the connection area, and detecting the absence of the object may be based on detecting a disturbance in the magnetic field within the connection area that is indicative of an absence of the ferromagnetic material of the connection structure within the connection area.

In some non-limiting embodiments or aspects, performing the at least one action may include providing at least one of a visual indication, an audio indication, and a tactile indication based on the connection status.

In some non-limiting embodiments or aspects, the method may further include receiving, with the control device, communication data gathered by at least one short-range wireless communication antenna configured for detecting a presence or an absence of an identification element on the connection structure. Determining the connection status of the connector may be further based on detecting the presence or the absence of the identification element on the connection structure.

In some non-limiting embodiments or aspects, a connector for a fall protection compliance system may include a frame having an opening and a connection area configured for receiving a connection structure therein, and a connection sensor assembly associated with the frame. The connection sensor assembly may have at least one permanent magnet configured for generating a magnetic field within at least a portion of the connection area, at least one magnetometer configured for detecting a presence or an absence of a disturbance in the magnetic field, at least one short-range wireless communication antenna configured for detecting a presence or an absence of an identification element on the connection structure, and a control device having at least one processor programmed or configured to: receive connection data from the at least one magnetometer and communication data from the at least short-range wireless communication antenna, determine a connection status of the connector based on detecting the presence or the absence of the disturbance in the magnetic field and based on detecting the presence or the absence of the identification element, and perform at least one action based on the connection status. Detecting the presence of the disturbance in the magnetic field may be indicative of a presence of a ferromagnetic material of the connection structure within the connection area. Detecting the absence of the disturbance in the magnetic field may be indicative of an absence of the ferromagnetic material of the connection structure within the connection area. Detecting the presence of the identification element may be indicative of a presence of an approved connection structure, and detecting the absence of the identification element may be indicative of an absence of the approved connection structure.

In some non-limiting embodiments or aspects, a connector for a fall protection compliance system may have a frame having an opening and a connection area configured for receiving a connection structure therein, and a connection sensor assembly associated with the frame. The connection sensor assembly may have at least one short-range wireless communication antenna configured for detecting a presence or an absence of an identification element on the connection structure, and a control device having at least one processor programmed or configured to: receive communication data from the at least short-range wireless communication antenna, determine a connection status of the connector based on detecting the presence or the absence of the identification element, and perform at least one action based on the connection status.

In some non-limiting embodiments or aspects, detecting the presence of the identification element may be indicative of a presence of an approved connection structure, and detecting the absence of the identification element may be indicative of an absence of the approved connection structure. The connection status may include a connected status indicative of a presence of an approved connection structure, and a disconnected status indicative of an absence of the approved connection structure. The at least one action may include providing at least one of a visual indication, an audio indication, and a tactile indication based on the connection status. The connection sensor assembly further may include a communication interface, and wherein the at least one action includes transmitting the connection status to a remote device using the communication interface.

As a further example, a fall protection compliance system includes a connection structure configured for interfacing an anchor structure and a connection sensor associated with the connection structure. The connection sensor includes an accelerometer or a pressure switch, where the connection sensor is configured to monitor continued connection of the connection structure to the anchor structure over a period of time and to output a signal indicating said continued connection.

As another example, in a method for providing fall protection compliance monitoring, a signal from a connection sensor associated with a connection structure configured for interfacing with an anchor structure is received, where the connection sensor comprises an accelerometer or a pressure switch. A determination is made as to whether a user is continually connected over a period of time based on the signal, and a signal is output indicating said determination of whether the user is continually connected.

Further non-limiting embodiments or aspects will now be described in the following numbered clauses.

Clause 1. A connector for a fall protection compliance system, the connector comprising: a frame having an opening and a connection area configured for receiving a connection structure therein; and a connection sensor assembly associated with the frame, the connection sensor assembly comprising: at least one permanent magnet configured for generating a magnetic field within at least a portion of the connection area; at least one magnetometer configured for detecting a presence or an absence of a disturbance in the magnetic field; and a control device comprising at least one processor programmed or configured to: receive connection data from the at least one magnetometer; determine a connection status of the connector based on detecting the presence or the absence of the disturbance in the magnetic field; and perform at least one action based on the connection status.

Clause 2. The connector according to clause 1, wherein detecting the presence of the disturbance in the magnetic field is indicative of a presence of a ferromagnetic material of the connection structure within the connection area, and wherein detecting the absence of the disturbance in the magnetic field is indicative of an absence of the ferromagnetic material of the connection structure within the connection area.

Clause 3. The connector according to clause 1 or 2, wherein the connection status comprises a connected status indicative of a presence of a ferromagnetic material of the connection structure within the connection area and a disconnected status indicative of an absence of the ferromagnetic material of the connection structure within the connection area.

Clause 4. The connector according to any of clauses 1-3, wherein the at least one action includes providing at least one of a visual indication, an audio indication, and a tactile indication based on the connection status.

Clause 5. The connector according to any of clauses 1-4, wherein the at least one action includes providing at least one of a first visual indication, a first audio indication, and a first tactile indication indicative of a presence of a ferromagnetic material of the connection structure within the connection area, or providing at least one of a second visual indication, a second audio indication, and a second tactile indication indicative of an absence of the ferromagnetic material of the connection structure within the connection area.

Clause 6. The connector according to any of clauses 1-5, wherein at least one of the first visual indication, the first audio indication, and the first tactile indication is the same as the second visual indication, the second audio indication, and the second tactile indication.

Clause 7. The connector according to any of clauses 1-6, wherein at least one of the first visual indication, the first audio indication, and the first tactile indication is different from the second visual indication, the second audio indication, and the second tactile indication.

Clause 8. The connector according to any of clauses 1-7, wherein the connection sensor assembly further comprises a communication interface, and wherein the at least one action includes transmitting the connection status to a remote device using the communication interface.

Clause 9. The connector according to any of clauses 1-8, wherein the connection sensor assembly further comprises at least one short-range wireless communication antenna configured for detecting a presence or an absence of an identification element on the connection structure, and wherein at least one processor is further programmed or configured to: receive communication data from the at least short-range wireless communication antenna; and determine the connection status of the connector based on detecting the presence or the absence of the identification element.

Clause 10. The connector according to any of clauses 1-9, wherein detecting the presence of the identification element is indicative of a presence of an approved connection structure, and wherein detecting the absence of the identification element is indicative of an absence of the approved connection structure.

Clause 11. The connector according to any of clauses 1-10, wherein the at least one processor is further programmed or configured for storing the data received from the at least one magnetometer and the at least one short-range wireless communication antenna.

Clause 12. The connector according to any of clauses 1-11, wherein the at least one magnet and the at least one magnetometer are positioned away from a surface of the frame that is configured for contacting the connection structure.

Clause 13. The connector according to any of clauses 1-12, further comprising a gate for selectively enclosing the opening of the frame, wherein the gate is movable between a closed position preventing passage through the opening and into the connection area and an open position permitting passage through the opening and into the connection area.

Clause 14. The connector according to any of clauses 1-13, wherein the gate is biased to the closed position by a biasing member.

Clause 15. The connector according to any of clauses 1-14, further comprising a locking assembly operatively connected to the gate and movable between a first position and a second position, wherein, in the first position, the locking assembly is configured for preventing movement of the gate from the closed position toward the open position, and wherein, in the second position, the locking assembly is configured for permitting movement of the gate from the closed position toward the open position.

Clause 16. A computer-implemented method for detecting connection of a connector to a connection structure, the method comprising: receiving, with a control device comprising at least one processor, connection data gathered by at least one sensor configured for detecting a presence or an absence of an object within a connection area of the connector and; determining, with the control device, a connection status of the connector based on detecting the presence or the absence of the object, and performing, with the control device, at least one action based on the connection status.

Clause 17. The method according to clause 16, wherein detecting the presence of the object is based on detecting a disturbance in a magnetic field within the connection area that is indicative of a presence of a ferromagnetic material of the connection structure within the connection area, and wherein detecting the absence of the object is based on detecting a disturbance in the magnetic field within the connection area that is indicative of an absence of the ferromagnetic material of the connection structure within the connection area.

Clause 18. The method according to clause 16 or 17, wherein performing the at least one action includes providing at least one of a visual indication, an audio indication, and a tactile indication based on the connection status.

Clause 19. The method according to any of clauses 16-18, further comprising: receiving, with the control device, communication data gathered by at least one short-range wireless communication antenna configured for detecting a presence or an absence of an identification element on the connection structure, wherein determining the connection status of the connector is further based on detecting the presence or the absence of the identification element on the connection structure.

Clause 20. A connector for a fall protection compliance system, the connector comprising: a frame having an opening and a connection area configured for receiving a connection structure therein; and a connection sensor assembly associated with the frame, the connection sensor assembly comprising: at least one permanent magnet configured for generating a magnetic field within at least a portion of the connection area; at least one magnetometer configured for detecting a presence or an absence of a disturbance in the magnetic field; at least one short-range wireless communication antenna configured for detecting a presence or an absence of an identification element on the connection structure; and a control device comprising at least one processor programmed or configured to: receive connection data from the at least one magnetometer and communication data from the at least one short-range wireless communication antenna; determine a connection status of the connector based on detecting the presence or the absence of the disturbance in the magnetic field and based on detecting the presence or the absence of the identification element; and perform at least one action based on the connection status, wherein detecting the presence of the disturbance in the magnetic field is indicative of a presence of a ferromagnetic material of the connection structure within the connection area, wherein detecting the absence of the disturbance in the magnetic field is indicative of an absence of the ferromagnetic material of the connection structure within the connection area, wherein detecting the presence of the identification element is indicative of a presence of an approved connection structure, and wherein detecting the absence of the identification element is indicative of an absence of the approved connection structure.

Clause 21. A connector for a fall protection compliance system, the connector comprising: a frame having an opening and a connection area configured for receiving a connection structure therein; and a connection sensor assembly associated with the frame, the connection sensor assembly comprising: at least one short-range wireless communication antenna configured for detecting a presence or an absence of an identification element on the connection structure; and a control device comprising at least one processor programmed or configured to: receive communication data from the at least one short-range wireless communication antenna; determine a connection status of the connector based on detecting the presence or the absence of the identification element; and perform at least one action based on the connection status.

Clause 22. The connector according to clause 21, wherein detecting the presence of the identification element is indicative of a presence of an approved connection structure, and wherein detecting the absence of the identification element is indicative of an absence of the approved connection structure.

Clause 23. The connector according to clause 21 or 22, wherein the connection status comprises a connected status indicative of a presence of an approved connection structure, and a disconnected status indicative of an absence of the approved connection structure.

Clause 24. The connector according to any of clauses 21-23, wherein the at least one action includes providing at least one of a visual indication, an audio indication, and a tactile indication based on the connection status.

Clause 25. The connector according to any of clauses 21-24, wherein the connection sensor assembly further comprises a communication interface, and wherein the at least one action includes transmitting the connection status to a remote device using the communication interface.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. Hence, specific dimensions and other physical characteristics related to the embodiments disclosed herein are not to be considered as limiting. Further, it is to be understood that the disclosure may assume various alternative variations and step sequences, except where expressly specified to the contrary.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which.

Figure 1:
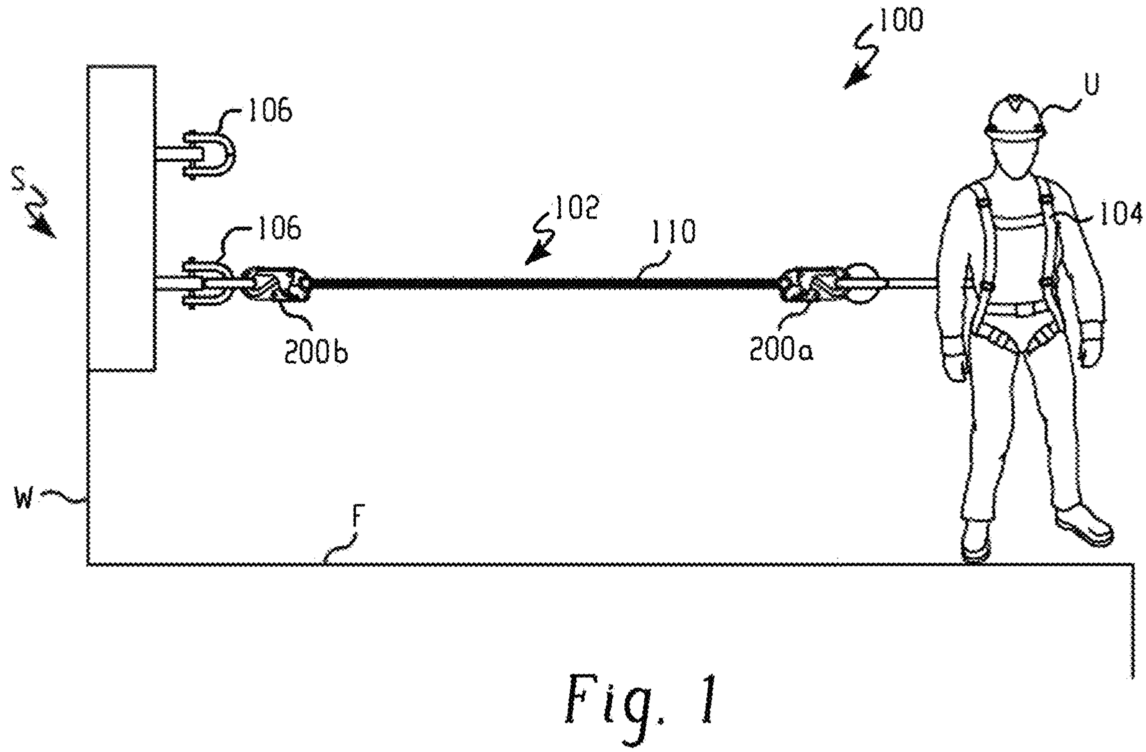
FIG. 1 is an illustration of a fall protection compliance system in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

For purposes of the description hereinafter, the terms “end”, “upper”, “lower”, “right”, “left”, “vertical”, “horizontal”, “top”, “bottom”, “lateral”, “longitudinal” and derivatives thereof shall relate to the disclosure as it is oriented in the drawing figures. However, it is to be understood that the disclosure may assume various alternative variations and step sequences, except where expressly specified to the contrary.

All numbers and ranges used in the specification and claims are to be understood as being modified in all instances by the term “about”. By “about” is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of “1 to 10” should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms “first”, “second”, and the like are not intended to refer to any particular order or chronology, but refer to different conditions, properties, or elements.

The term “at least” is synonymous with “greater than or equal to”.

As used herein, “at least one of” is synonymous with “one or more of”. For example, the phrase “at least one of A, B, and C” means any one of A, B, or C, or any combination of any two or more of A, B, or C. For example, “at least one of A, B, and C” includes one or more of A alone; or one or more B alone; or one or more of C alone; or one or more of A and one or more of B; or one or more of A and one or more of C; or one or more of B and one or more of C; or one or more of all of A, B, and C.

As used herein, the terms “parallel” or “substantially parallel” mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms “perpendicular” or “substantially perpendicular” mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

The terms “comprises”, “comprising”, or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by “comprises . . . a” does not, without more constraints, preclude the existence of other elements or additional elements in the system or method.

The terms “includes”, “including”, or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by “includes . . . a” does not, without more constraints, preclude the existence of other elements or additional elements in the system or method.

The terms “an embodiment”, “embodiment”, “embodiments”, “the embodiment”, “the embodiments”, “one or more embodiments”, “some non-limiting embodiments or aspects”, and “one embodiment” mean “one or more (but not all) embodiments of the invention(s)” unless expressly specified otherwise. A description of an embodiment with several components in communication with each other does not imply that all such components are required. On the contrary, a variety of optional components is described to illustrate the wide variety of possible embodiments of the disclosure.

No aspect, component, element, structure, act, step, function, instruction, and/or the like used herein should be construed as critical or essential unless explicitly described as such. Also, as used herein, the articles “a” and “an” are intended to include one or more items and may be used interchangeably with “one or more” and “at least one.” Furthermore, as used herein, the term “set” is intended to include one or more items (e.g., related items, unrelated items, a combination of related and unrelated items, and/or the like) and may be used interchangeably with “one or more” or “at least one.” Where only one item is intended, the term “one” or similar language is used. Also, as used herein, the terms “has”, “have”, “having”, or the like are intended to be open-ended terms. Further, the phrase “based on” is intended to mean “based at least in partially on” unless explicitly stated otherwise. The term “some non-limiting embodiments or aspects” means “one or more (but not all) embodiments or aspects of the disclosure(s)” unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms “communication”, “communicate”, “send”, and/or “receive” may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "remote device" may refer to one or more computing devices, which may be used by a remote user, such as an industrial hygienist or a project manager, to monitor compliant use of a fall protection compliance system. In some non-limiting embodiments, a remote device may include a computing device configured to communicate with one or more networks and/or facilitate at least one of receiving and sending information from and to a connector, such as, but not limited to, one or more desktop computers, one or more mobile devices, and/or other like devices.

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As discussed herein, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

Various embodiments or aspects of the present disclosure are directed to comprehensive fall protection compliance systems and methods for directly monitoring worker safety while using safety equipment, such as fall protection equipment. In some non-limiting embodiments or aspects, the system may be a passive monitoring system that collects data regarding the direct usage and coupling of fall protection equipment, such as, without limitation, harnesses, lanyards, anchorages, horizontal and vertical lifelines, as well as winches, davits, and other raising and lowering equipment.

In some non-limiting embodiments or aspects, the fall protection compliance system may be configured to detect, such as using one or more electronic sensors, that a connection has been made between a user wearing a fall protection harness or similar safety equipment, and an anchor point. The system may be further configured to indicate the proper connection, disconnection, and usage compliance of the safety equipment regarding an unsafe or safe condition or area. The system may be configured to monitor the connection between the user and the safety equipment and determine whether the worker is securely connected to the safety equipment. In some non-limiting embodiments or aspects, the system may be configured to store information regarding various aspects of the system, such as proper connection of the safety equipment, length of use of the safety equipment, identification of connection to a particular piece of safety equipment. The stored data may have a time and date stamp. In some non-limiting embodiments or aspects, the stored data can be transmitted to a remote device, such as a cell phone or an external monitoring station, and/or stored locally in memory storage for later retrieval.

In some non-limiting embodiments or aspects, the stored data may indicate the worker identification number, the device identification number, current time, total time that the worker is wearing or connected to the safety equipment, and individual periods of use or non-use of the safety equipment. The system may have built-in algorithms and safeties to both indicate that the user is using the equipment in compliance with standards, but also to prevent tampering or obfuscation of the results. This ensures that the user uses the equipment properly and eliminates the need for direct physical inspection of compliance by an industrial hygienist or compliance officer.

With initial reference to FIG. 1, a fall protection compliance system 100 is illustrated in accordance with some non-limiting embodiments or aspects of the present disclosure. The fall protection compliance system 100 includes at least one piece of fall protection safety equipment 102 that is configured for securing a user U wearing a harness 104 to an anchor 106 secured to a wall W, floor F, ceiling, or other component of a structure S. In some non-limiting embodiments or aspects, the fall protection safety equipment 102 may have a first connector 200*a* at its first end and a second connector 200*b* at its second end. The first connector 200*a* may be configured for connecting directly to the harness 104 or another piece of safety equipment, such as an energy absorber, that is directly connected to the harness 104. The second connector 200*b* may be configured for connecting directly to the anchor 106 or to another piece of safety equipment, such as an energy absorber, that is connected directly to the anchor 106. In this manner, the fall protection safety equipment 102 is configured to connect the user U wearing the harness 104 to the anchor 106. The fall protection safety equipment 102, the harness 104, and the anchor 106 together define the fall protection compliance system 100.

In some non-limiting embodiments or aspects, the fall protection safety equipment 102 may be a lanyard 110 having the first connector 200*a* at its first end and the second connector 200*b* at its second end. In other non-limiting embodiments or aspects, the fall protection safety equipment 102 may a line retraction device, such as a self-retracting lanyard (SRL). The SRL may have a safety line that is configured to be unwound (paid out) from a drum when a certain level of tension is applied to the safety line, such as during movement of the user U on the structure S. When such tension is reduced or released, the SRL is configured to slowly rotate in a reverse direction, thereby causing the safety line to retract or rewind onto the drum.

As further described herein, the fall protection safety equipment 102 includes one or more sensors and associated control devices configured to gather data in real-time as the user U engages in activities on the structure S while wearing the fall protection safety equipment 102. For example, the fall protection safety equipment 102 may include one or more sensors configured to detect a connection status of at least one of the first and second connectors 200*a*, 200*b*. In addition, the fall protection safety equipment 102 may include one or more output devices for outputting data that is indicative of the connection status of at least one of the first and second connectors 200*a*, 200*b*. For example, the fall protection safety equipment 102 may include one or more devices to generate at least one of an audible feedback (e.g., one or more speakers), a visual feedback (e.g., one or more displays, light emitting diodes (LEDs), or the like), or a tactile feedback (e.g., a vibration device). In addition, the fall protection safety equipment 102 may be configured to transmit the connection status of at least one of the first and second connectors 200*a*, 200*b* to a remote device.

Figure 2:
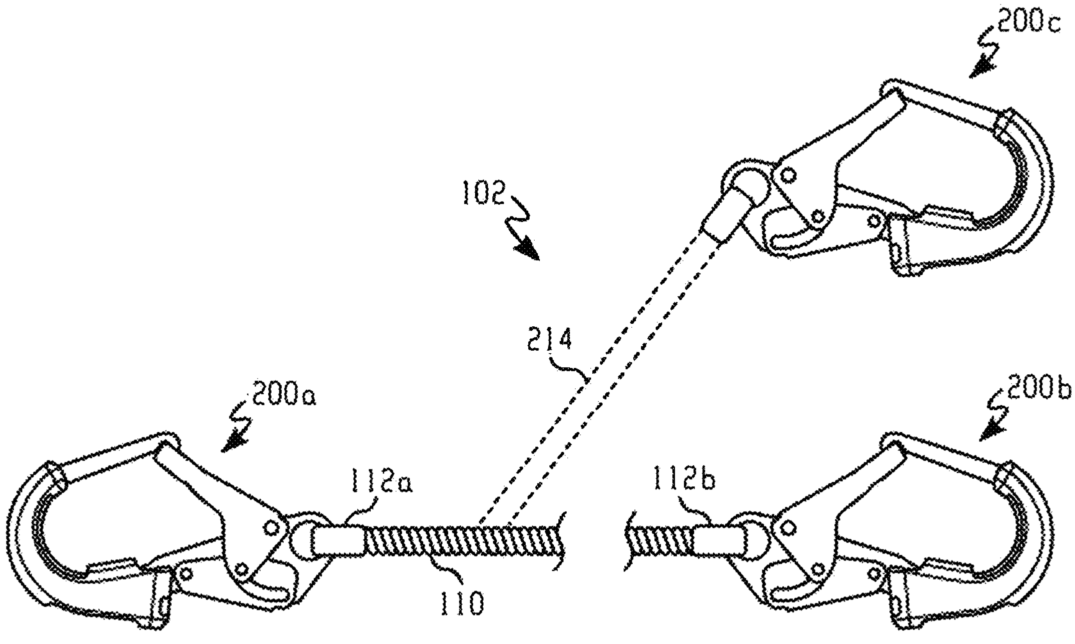
FIG. 2 is a top view of fall protection safety equipment having a connector in accordance with some non-limiting embodiments or aspects of the present disclosure.

With reference to FIG. 2, the fall protection safety equipment 102 is shown separate from the fall protection compliance system 100. The fall protection safety equipment 102 has the first connector 200*a* connected to a first end 112*a* of the lanyard 110 and the second connector 200*b* connected to a second end 112*b* of the lanyard 110. In some non-limiting embodiments or aspects, the fall protection safety equipment 102 may have a third connector 200*c* connected to a separate line 114 that is connected to the lanyard 110 between the first end 112*a* and the second end 112*b*. As discussed herein, the first connector 200*a* may be configured for connecting directly to the harness 104 (shown in FIG. 1) or another piece of safety equipment, such as an energy absorber, that is directly connected to the harness 104. The second connector 200*b* may be configured for connecting directly to the anchor 106 (shown in FIG. 1) or to another piece of safety equipment, such as an energy absorber, that is connected directly to the anchor 106. The third connector 200*c* may be configured for connecting to a second anchor 106 on the structure S. The third connector 200*c* may be connected to the second anchor 106 before the second connector 200*b* is removed from the first anchor 106 to allow the user U to move on the structure S while remaining connected to at least one of the anchors 106. As described herein, at least one of the connectors 200*a*, 200*b*, 200*c* may have one or more sensors configured to detect a connection status that is indicative of whether at least one of the connectors 200*a*, 200*b*, 200*c* is connected to the connection structure, such as the harness 104, the anchor 106, or other connection structure.

Figure 3:
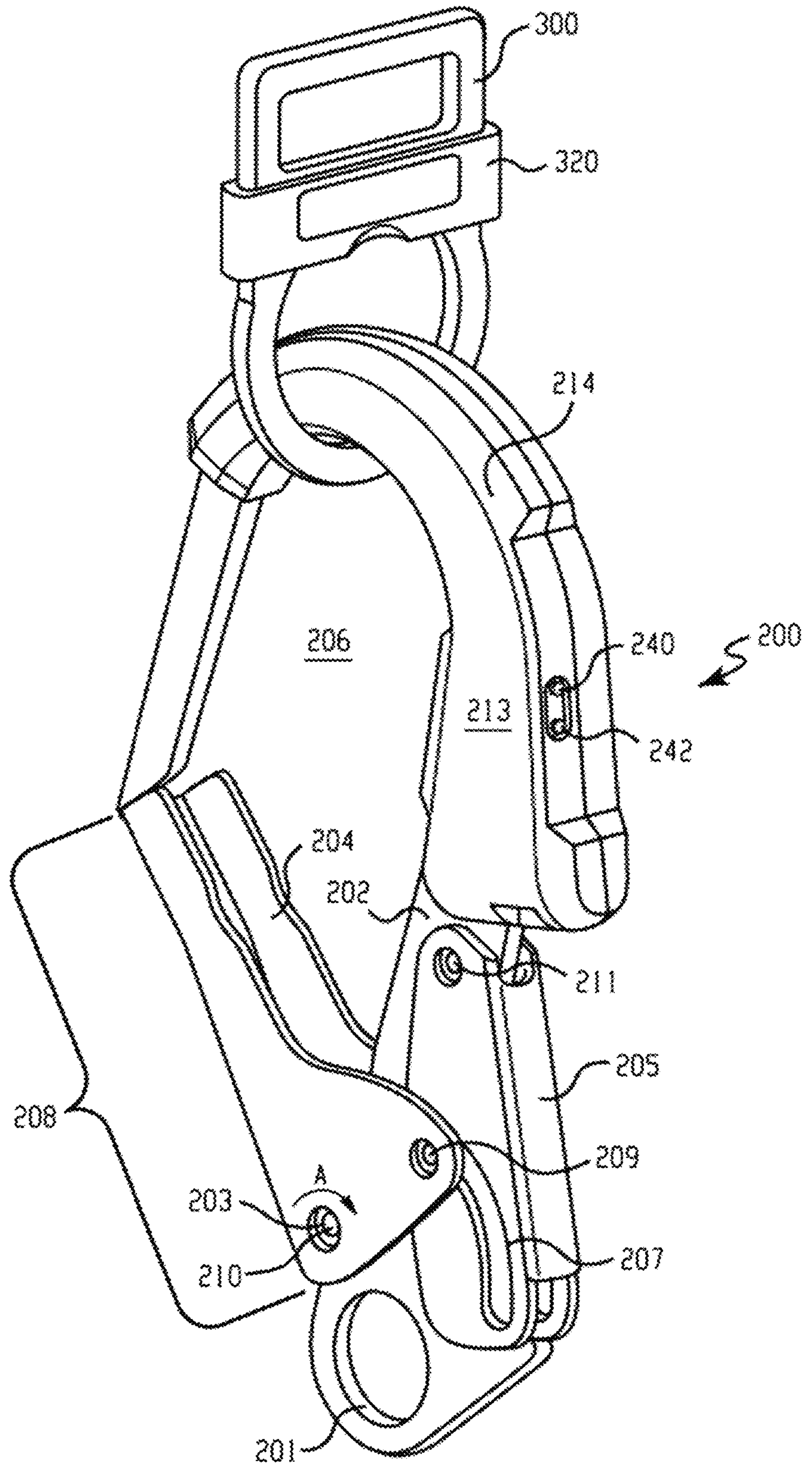
FIG. 3 is a perspective view of one of the connectors shown in FIG. 2 connected to a connection structure.
Figure 4:
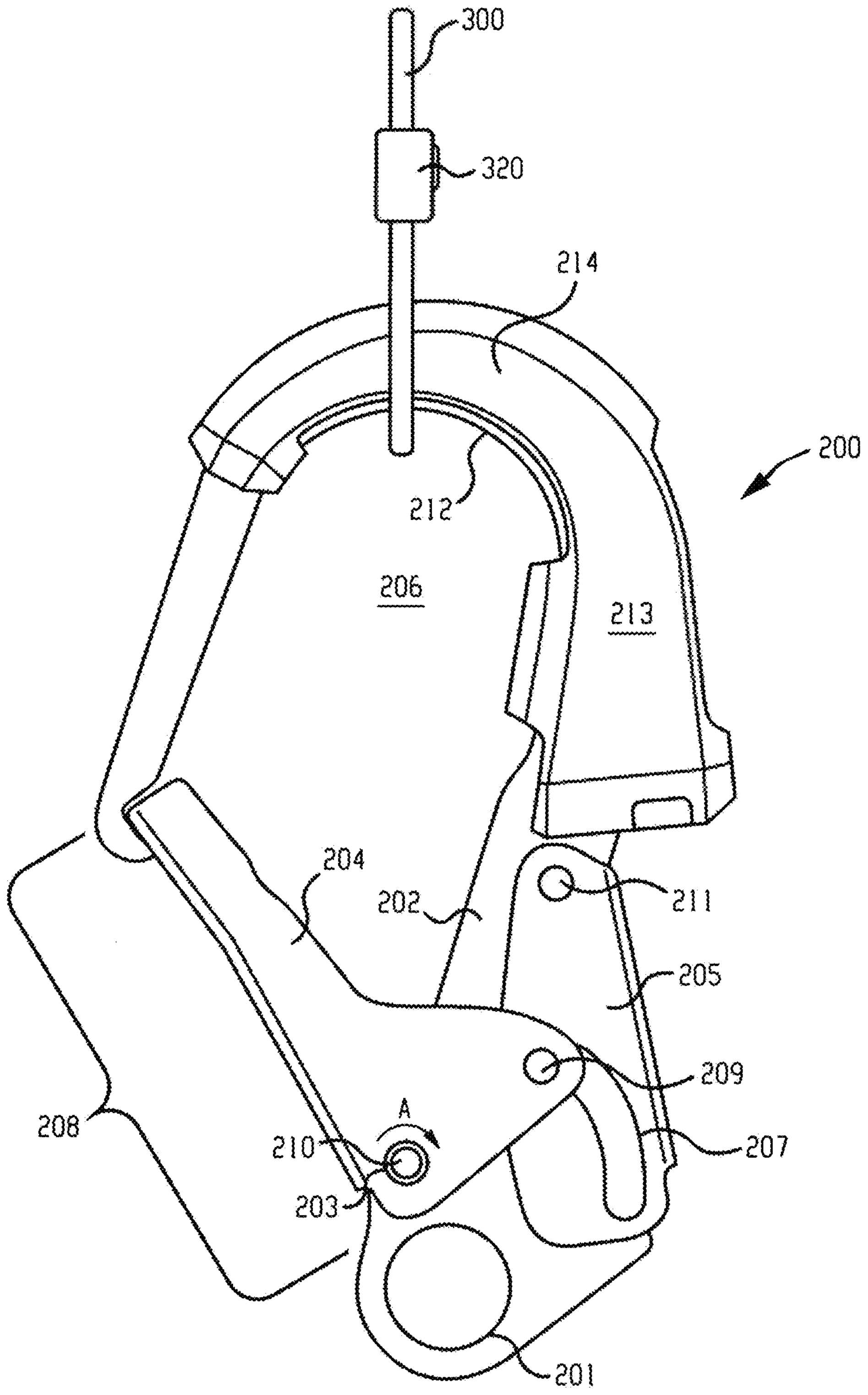
FIG. 4 is a side view of the connector and connection structure shown in FIG. 3.

With reference to FIGS. 3-4, the connector 200 and a connection structure 300 are illustrated in accordance with some non-limiting embodiments or examples of the present disclosure. While FIG. 3 illustrates the connector 200 that is configured as a snap hook, in other non-limiting embodiments or aspects, the connector 200 may be a carabiner or the like. Similarly, while the connection structure 300 is shown as a D-ring, in other non-limiting embodiments or aspects, the connection structure 300 may be a U-bolt or the like. It should be understood that the structures and techniques described herein can be applied to a variety of other devices configured for securing a user U to an anchor 106 as part of a fall protection compliance system 100.

In some non-limiting embodiments or aspects, the connector 200 can be configured for use as an additional component to existing safety equipment, such as by being placed intermediate between the harness 104 and the fall protection safety equipment 102 (shown in FIG. 1), and/or between the anchor 106 and the fall protection safety equipment 102. In such embodiments or aspects, the connector 200 may be positioned intermediate between the D-ring of the harness 104 and the lanyard 110 or other fall protection device 102. In this configuration, the connector 200 may have two connection points to allow connection between the harness 104 and the lanyard 110 such that at least a portion of the connector 200 functions as a load bearing member.

With continued reference to FIGS. 3-4, the connector 200 has a frame 202 configured for connecting the connector 200 to at least a portion of at least one piece of safety equipment, such as the connection structure 300. The frame 202 may have a connection point 201 for connecting the lanyard 110 (shown in FIG. 1) or other piece of fall protection safety equipment to the connector 200. The frame 202 may have a substantially C-shaped structure with an opening 208 extending between two opposed ends of the C-shaped frame 202.

With continued reference to FIGS. 3-4, the connector 200 has a movable gate 204 connected to the frame 202 and movable between a closed position and an open position. In the closed position, such as shown in FIG. 3, the movable gate 204 encloses a connection area 206 to prevent passage of the connection structure 300 or other object through the opening 208 on the frame 202. The movable gate 204 contacts the frame 202 such that a continuous loop encloses the connection area 206 and prevents movement of the connecting structure 300 or other objection into or from the connection area 206. The movable gate 204 may be pivotally or slidably movable to the open position, such as by rotating about a pivot point 210 in a direction of arrow A. With the movable gate 204 in the open position, the opening 208 on the frame 202 is unobstructed to allow passage of the connection structure 300 or other object into and out of the connection area 206.

In some non-limiting embodiments or aspects, the movable gate 204 may be biased to the closed position. For example, a biasing member, such as a spring 203, may be provided to bias the movable gate 204 to the closed position. In some non-limiting embodiments or aspects, one or more sensors may be provided for detecting the open and/or closed position of the movable gate 204, and/or a movement of the movable gate 204 toward or away from the open/closed position. The movable gate 204 may have a locking assembly 205 for maintaining the movable gate 204 in the closed position and/or permitting movement of the movable gate 204 in a direction from the closed position toward the open position. The locking assembly 205 may be operatively connected to the gate 204 and movable between a first position and a second position, wherein, in the first position, the locking assembly 205 is configured for preventing movement of the gate 204 from the closed position toward the open position, and wherein, in the second position, the locking assembly 205 is configured for permitting movement of the gate 204 from the closed position toward the open position. For example, movement of the movable gate 204 from the closed position may be prevented unless the locking assembly 205 is disengaged (i.e., moved from the first position toward the second position). In this manner, inadvertent opening of the movable gate 204 can be prevented. The locking assembly 205 may be connected to the movable gate 204 by way of a channel 207 that slidably receives a pin 209 of the movable gate 204. The locking assembly 205 may be pivotally movable about a second pivot point 211. When a user operates the locking assembly 205 (e.g., the user squeezes the locking assembly 205 against the frame 202), the locking assembly 205 pivotally moves about the second pivot point 211 to allow the pin 209 to move within the channel 207, which thereby permits movement of the movable gate 204 from the closed position toward the open position.

Figure 5:
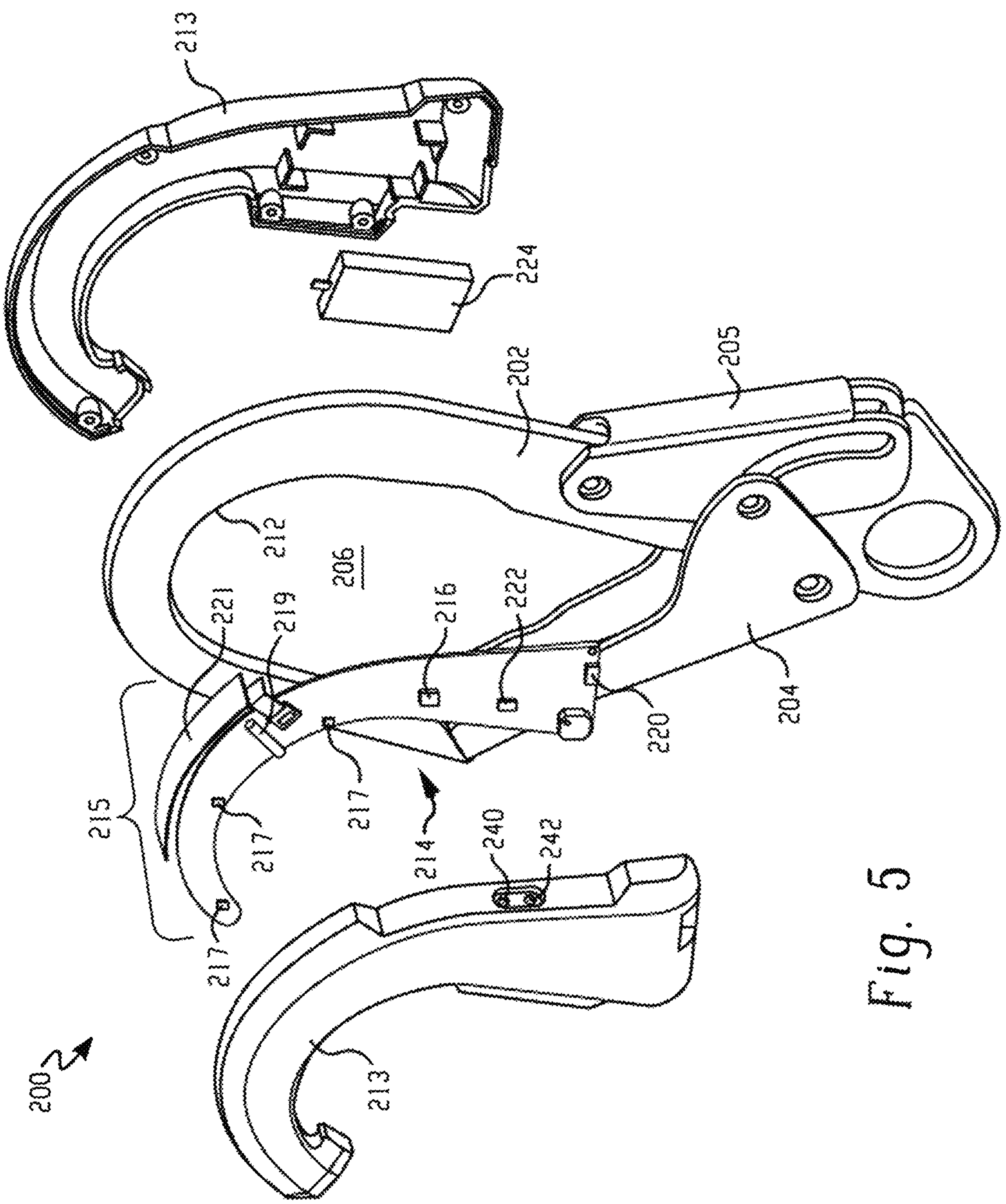
FIG. 5 is an exploded perspective view of the connector shown in FIG. 4.

With reference to FIG. 5, and with continued reference to FIGS. 3-4, the connector 200 has a connection sensor assembly 214 configured for determining a connection status of the connector 200. A connection status generally refers to a determination, using the connection sensor assembly 214, as to whether the connector 200 is connected to a connection structure 300 or disconnected from the connection structure 300. For example, the connection status may indicate that the connector 200 is connected to the connection structure 300, such as when the connection sensor assembly 214 detects the presence of a ferromagnetic material of the connection structure within the connection area 206 and/or detects a presence of an identification element associated with the connection structure 300, as described herein. Alternatively, the connection status may indicate that the connector 200 is disconnected from the connection structure 300, such as when the connection sensor assembly 214 detects an absence of a ferromagnetic material within the connection area 206 and/or detects an absence of an identification element 320 associated with the connection structure 300, as described herein, as described herein.

With continued reference to FIG. 5, the connection sensor assembly 214 is enclosed within a housing 213 connected to the frame 202 of the connector 200. In some non-limiting embodiments or aspects, the housing 213 may have a pair of housing sides that connect to each other to enclose the components of the connection sensor assembly 214. The connection sensor assembly 214 may be configured to detect whether the connector 200 is connected to safety equipment, such as a component of a fall protection compliance system 100. In some non-limiting embodiments or aspects, the connection sensor assembly 214 may be further configured to detect a presence of an identification element associated with the connection structure 300. In some non-limiting embodiments or aspects, the connection sensor assembly 214 may be further configured to detect movement of the connector 200, such as due to movement of the user U to which the connector 200 is directly or indirectly attached. The connection sensor assembly 214 may have one or more sensors, including one or more accelerometers, gyroscopes, pressure sensors, magnetic sensors, contact switches, RFID, NFC, and other radio-based proximity detectors, as discussed herein.

With continued reference to FIG. 5, the connection sensor assembly 214 has one or more sensors 215 and a control device 216 operatively connected to the one or more sensors 215 to receive data from the one or more sensors 215 regarding the connection status of the connector 200. The plurality of sensors 215 may be disposed on a side of the frame 202 or on an inner surface 212 facing the connection area 206. In some non-limiting embodiments or aspects, the inner surface 212 may be a surface of the frame 202 that is configured for contacting the connection structure 300 (shown in FIG. 4) when the connector 200 is connected to the connection structure 300.

In some non-limiting embodiments or aspects, the one or more sensors 215 may include at least one magnetometer 217. In some non-limiting embodiments or aspects, a plurality of magnetometers 217 may be spaced apart in an arcuate arrangement that corresponds to an arcuate shape of the frame 202. The magnetometers 217 may be disposed in an area of the frame 202 that corresponds to a probable location where the connection structure 300 will be located when the connection structure 300 is disposed within the connection area 206 of the connector 200. At least one permanent magnet, such as a rare earth magnet 219, may be associated with at least one magnetometer 217, such as by being disposed between a plurality of magnetometers 217. The rare earth magnet 219 generates a pre-defined magnetic field within at least a portion of the connection area 206. When a ferromagnetic material, such as the ferromagnetic metal material of the connection structure 300 or other ferromagnetic object, is inserted into the connection area 206, the pre-defined magnetic field generated by the rare earth magnet 219 is disturbed by the presence of such a ferromagnetic material. By measuring the disturbance of the pre-defined magnetic field, the connection sensor assembly 214 is configured to detect the connection status of the connector 200, such as whether the connection structure 300 is disposed in the connection area 206 of the connector 200.

With continued reference to FIG. 5, the one or more sensors 215 may include at least one short-range wireless communication antenna 221 configured for detecting a presence or an absence of an identification element 320 on the connection structure 300. In some non-limiting embodiments or aspects, the at least one short-range wireless communication antenna 221 may be an RFID antenna and the identification element 320 may be an RFID tag. In some non-limiting embodiments or aspects, the at least one short-range wireless communication antenna 221 may be configured to interact with the identification element 320 (shown in FIGS. 6A-6B) attached to the connection structure 300. In this manner, when the connection structure 300 having the identification element 320 is connected to the connector 200, the at least one short-range wireless communication antenna 221 detects the presence of the identification tag 320 on the connection structure 300, thereby indicating that the connector 300 is connected to an approved connection structure 300. The at least one short-range wireless communication antenna 221 may be configured as a flex circuit positioned on an upper arcuate portion of the housing 213. In this manner, the at least one short-range wireless communication antenna 221 is positioned closest to a probable location of the identification element 320 when the connection structure 300 is disposed within the connection area 206 of the connector 200.

In various non-limiting embodiments or aspects, sensor detection intervals can be optimized with low duty cycles in order to extend battery life. In this manner, the one or more sensors 215 can be turned on, come to steady state, take a record or data point, and then turn off using a particular cycle. If, for example, one or more sensors 215 can complete its entire cycle within only 100 milliseconds, the connector 200 may have a duty cycle of 1% while generating a data point once every 10 seconds. Depending on the type of sensor used for any of the data acquisition requirements, the sensor data acquisition cycle could be longer or shorter.

The connection sensor assembly 214 may be in a standby or sleep mode prior to connection of the connection structure 300 in order to conserve battery life. In some non-limiting embodiments or aspects, the connection sensor assembly 214 may be activated from the standby or sleep mode by movement of the movable gate 204 and/or the locking assembly 205 from the closed position to the open position. In some non-limiting embodiments or aspects, the connection sensor assembly 214 may be activated from the standby or sleep mode by detecting movement of the connector 200, such as using a gyroscope or an accelerometer. In some non-limiting embodiments or aspects, the connection sensor assembly 214 may be activated from the standby or sleep mode after an initial connection to a connection structure 300 is made. In some non-limiting embodiments or aspects, the connection sensor assembly 214 may be activated from the standby mode by pressing a button, such as a button on the housing 213 of the connector 200. In some non-limiting embodiments or aspects, the connection sensor assembly 214 may be activated from the standby or sleep mode by the user being physically present within a work zone where operation of the connector 200 is desired. For example, the zone may have weight sensors and/or light bar sensors that, once activated due to the user's weight or due to the light beam being broken by the user, an activation signal is sent to the connection sensor assembly 214. The connection sensor assembly 214 may be activated if the user is detected within a predetermined distance of a connection structure where the use of the connector 200 may be required. In further examples, the user may scan into the work area, such as using an RFID tag, and/or the user's presence may be sensed, for example using a sonar or other sensing device, in order to activate the connection sensor assembly 214. In some non-limiting embodiments or aspects, the connection sensor assembly 214 may be activated from the standby or sleep mode when the connector 200 is unplugged from a power source or a home station, such as when the connector 200 is being recharged. Plugging the connector back to the power source or the home station may cause the connection sensor assembly 214 to enter the standby or sleep mode.

Once activated from the standby or sleep mode, the connection sensor assembly 214 may be configured to detect whether a ferromagnetic material, such as the ferromagnetic material of the connection structure 300 is disposed within the connection area 206 of the connector 200 and/or to detect the presence or absence of an identification element associated with the connection structure 300.

In some non-limiting embodiments or aspects, the connector 200 may have a communication interface 220 for communicating information regarding the connection status of the connector 200. In some non-limiting embodiments or aspects, the communication interface 220 may be at least one of a visual, audio, vibration, and tactile indicator on the connector 200 configured for indicating the connection status of the connector 200. For example, the communication interface 220 may be one or more lights 240 that indicate a connected or disconnected status of the connector. The one or more lights 240 may have a first visual indication, such as a green light, indicative of a presence of a ferromagnetic material of the connection structure 300 within the connection area 206 and/or a presence of an identification element 320 on the connection structure 300, and a second visual indication, such as a red light, indicative of an absence of the ferromagnetic material of the connection structure 300 within the connection area 206 and/or an absence of an identification element 320 on the connection structure 300. The first visual indication may be the same or different from the second visual indication.

In some non-limiting embodiments or aspects, the communication interface 220 may be one or more speakers 242 or other audio devices configured to provide a first audio indication, such as a first tone, indicative of a presence of a ferromagnetic material of the connection structure 300 within the connection area 206 and/or a presence of an identification element 320 on the connection structure 300, and a second audio indication, such as a second tone different from the first tone, indicative of an absence of the ferromagnetic material of the connection structure 300 within the connection area 206 and/or an absence of an identification element 320 on the connection structure 300. The first audio indication may be the same or different from the second audio indication.

In some non-limiting embodiments or aspects, the communication interface 220 may be one or more vibration devices configured to provide a first tactile indication, such as a first vibration, indicative of a presence of a ferromagnetic material of the connection structure 300 within the connection area 206 and/or a presence of an identification element 320 on the connection structure 300, and a second tactile indication, such as a second vibration different from the first vibration, indicative of an absence of the ferromagnetic material of the connection structure 300 within the connection area 206 and/or an absence of an identification element 320 on the connection structure 300. The first tactile indication may be the same or different from the second tactile indication.

The communication interface 220 may include a transceiver-like component (e.g., a transceiver, a separate receiver and transmitter, etc.) that enables the control device 216 to communicate with other devices, such as via a wired connection, a wireless connection, or a combination of wired and wireless connections. The communication interface 220 may permit the control device 216 to receive information from another device and/or provide information to another device. For example, the communication interface 220 may include an Ethernet interface, an optical interface, a coaxial interface, an infrared interface, a radio frequency (RF) interface, a universal serial bus (USB) interface, a Wi-Fi® interface, low-energy Bluetooth® interface, a cellular network interface, and/or the like.

At any given change of connection status of the connector 200, a notification may be generated and communicated to the user via the communication interface 220 regarding the current connection state of the connector 200. These notifications can be segregated into several different categories. For example a green light and a short beep may indicate that the connector 200 is connected to an approved connection structure 300 (i.e., a ferromagnetic connection structure 300 having an identification tag 320), while a long tone and a red light may be used to indicate that the connector 200 is not connected to the connection structure 300 and/or that it is connected to a ferromagnetic connection structure 300 that does not have an identification element 320. Other notifications can be generated using various combinations of communication devices associated with the communication interface 220.

In some non-limiting embodiments or aspects, the communication interface 220 may have a transmitter 222 for wirelessly transmitting data regarding the status of the connector 200 to a remote device 250 (shown in FIG. 10), such as a cell phone or a computer terminal, and/or receiving data from the remote device 250 using a wireless communication protocol. Each of the one or more sensors 215 is configured to communicate data, such as sensed motions, events and conditions, via wireless communications. The transmitter 222 may be a short range or long range radio, low-energy Bluetooth® (BLE), near-field communication (NFC), or other transmitter configured to communicate data from the connector 200 continuously or periodically. The connector 200 can be interrogated using short range radio communications, standard networking protocols, direct connection of a port, or the charging connection.

Data recorded by the connector 200 may be transmitted for download by the remote device 250. The transmitted data may include, for example, the time-stamped transitions between all device states, sensor data, and device health status. Once data is downloaded, it can be reviewed by the compliance manager, industrial hygienist or other supervisor personnel. Data may be password protected so that it cannot be overwritten or deleted without being recorded to a permanent record.

In some non-limiting embodiments or aspects, time and date stamps, along with the unit identification number can be transmitted to the remote device 250. In this manner, if the user is in an area where full compliance is expected (both conditions met), but at least one of the conditions is not met, a safety officer can be dispatched to physically inspect the user to determine the cause for non-compliance. In the event of a fall, the connector 200 can be configured to transmit this event to the remote device 250. In some non-limiting embodiments or aspects, the connector 200 may be configured to transmit a distress signal, such as by placing a call to emergency services, in an event that the user is in distress based on the data received from the one or more sensors 215. In some non-limiting embodiments or aspects, the user can activate the connector 200, such as by pushing a button thereon, to transmit an alert that the user requires assistance, such as in an emergency situation.

The connector 200 may be configured to save data having predetermined characteristics, such as when sensor readings exceed a predetermined threshold, or when the one or more sensors 215 detect or fail to detect a condition. In some non-limiting embodiments or aspects, the connector 200 may be configured to save data when both conditions of compliant use of the connector 200 are met, such as when a proper connection is made. In an event that the connector 200 is disconnected from the connection structure 300, the connector 200 may store data regarding such event(s).

In some non-limiting embodiments or aspects, the function of determining compliant use of the connector 200 can be performed externally, such as by the application software used by the remote device 250. In this manner, the information recorded by the connector 200 may be downloaded and evaluated externally to confirm compliance. This function can be carried out on site, remotely using an off-site server or controller, or remotely by reviewing reports submitted by local safety compliance, industrial hygienists, or other safety personnel.

In some non-limiting embodiments or aspects, the connector 200 may be configured for wireless communication prior to issuance to the worker. For example, the connector 200 may be configured to the user, the safety equipment with which the connector 200 is to be used, the work site, area, and/or other data of importance to the safety officer or industrial hygienist. This may be done using a protocol to protect overwriting or editing the data.

With reference to FIG. 5, the control device 216 is operatively connected to the one or more sensors 215 to receive data from the one or more sensors 215 regarding the connection status of the connector 200. A battery 224 may be provided for powering the components of the connector 200. In some non-limiting embodiments or aspects, the battery 224 may be a rechargeable lithium polymer battery pack.

The control device 216 may be configured to use data from at least one of the plurality of sensors 215, such as at least one magnetometer 217 and/or the at least one short-range wireless communication antenna 221, to determine the connection status of the connector 200. For example, the control device 216 may determine that the connector 200 has been connected to the connection structure 300 based on a number of ordered operations, such as by receiving data indicating movement of the movable gate 204 from the closed position to the open position. The control device 216 may further receive data from the one or more magnetometers 217 indicating that the connection structure 300 is disposed within the connection area 206. The control device 216 may further receive data from the at least one short-range wireless communication antenna 221 indicating that the identification element 320 of the connection structure 300 is disposed in proximity of the connector 200.

After determining that the connector 200 is connected to the connection structure 300, such as by detecting the presence of the ferromagnetic material of the connection structure 300 within the connection area 206 of the connector 200 and/or detecting the presence of the identification element 320 of the connection structure 300 in proximity of the at least one short-range wireless communication antenna 221 of the connector 200, the control device 216 may be configured to indicate that a proper connection has been made, such as by generating an audible, visual, or a tactile alert. For example, if the connector 200 is connected to the connection structure 300, such as by detecting the presence of the ferromagnetic material of the connection structure 300 within the connection area 206 of the connector 200, and the at least one short-range wireless communication antenna 221 detects the presence of the identification element 320 that is an expected identification element (i.e., the identification element 320 corresponding to the connection structure 300 to which the connector 200 is supposed to be connected to), the control device 216 may be configured to actuate the communication interface 220 to display a first light (such as a green status light), and/or to emit a first sound, and/or to generate a first tactile response.

If the control device 216 determines that the connector 200 is not connected to the connection structure 300, such as by failing to detect the presence of the ferromagnetic material of the connection structure 300 within the connection area 206 of the connector 200 and/or failing to detect the presence of the identification element 320 of the connection structure 300 in proximity of the at least one short-range wireless communication antenna 221 of the connector 200, the control device 216 may be configured to indicate that an improper connection has been made, such as by generating an audible, visual, or a tactile alert. For example, if the connector 200 is not connected to a connection structure or is connected to a ferromagnetic material that is not an approved connection structure 300, and/or if the at least one short-range wireless communication antenna 221 fails to detect the presence of the identification element 320 or if the at least one short-range wireless communication antenna 221 detects an unexpected identification element (i.e., the identification element 320 corresponding to the connection structure 300 to which the connector 200 is not supposed to be connected to), the control device 216 may be configured to actuate the communication interface 220 to display a second light (such as a red status light), and/or to emit a second sound, and/or to generate a second tactile response, wherein the second light, the second sound, and the second tactile response are different from the first light, the first sound, and the first tactile response, respectively.

Figure 6A:
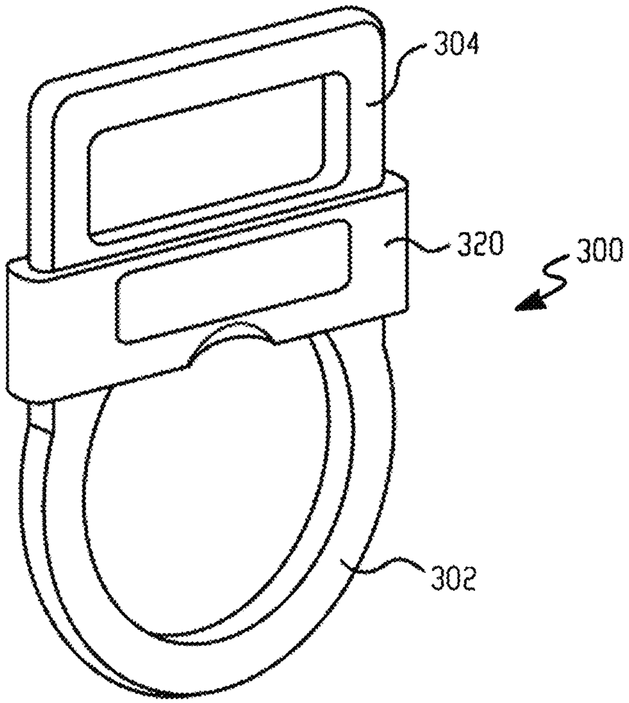
FIG. 6A is a perspective view of a connection structure in accordance with some non-limiting embodiments or aspects of the present disclosure.
Figure 6B:
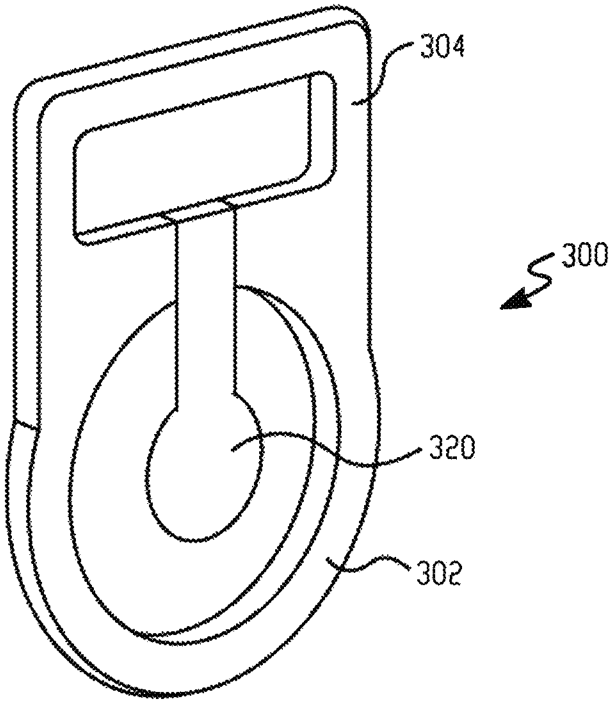
FIG. 6B is a perspective view of a connection structure in accordance with some non-limiting embodiments or aspects of the present disclosure.

With reference to FIGS. 6A-6B, in some non-limiting embodiments or aspects, the connection structure 300 may be a D-ring connected to an anchor or a harness. The connection structure 300 may be made from a ferromagnetic material and the connector 200 may be configured to detect whether a connection is made with the connection structure 300, such as by detecting a presence of a magnetic field, as described herein.

With continued reference to FIGS. 6A-6B, the connection structure 300 has a connection loop 302 that is configured for being received within the connection area 206 of the connector 200 when the movable gate 204 is in the open position. The connection structure 300 further has an anchor point 304 configured as a separate loop for connecting to an anchor. The identification element 320 may be connected to at least a portion of the connection structure 300. In some non-limiting embodiments or aspects, such as shown in FIG. 6A, the identification element 320 is connected proximate to the anchor point 304 and away from the connection loop 302 in order to prevent damage to the identification element 320 due to contact with the frame 202 of the connector 200. In some non-limiting embodiments or aspects, such as shown in FIG. 6B, the identification element 320 may be provided on a deflectable element 322 that is positioned within the connection loop 302. In this manner, connection of the connector 200 to the connection loop 302 deflects the deflectable element 322 such that the identification element 320 is positioned proximate to the connection sensor assembly 214. For example, the identification element 320 may directly contact at least a portion of the connection sensor assembly 214, such as by contacting the housing 213 of the connection sensor assembly 214.

Figure 7:
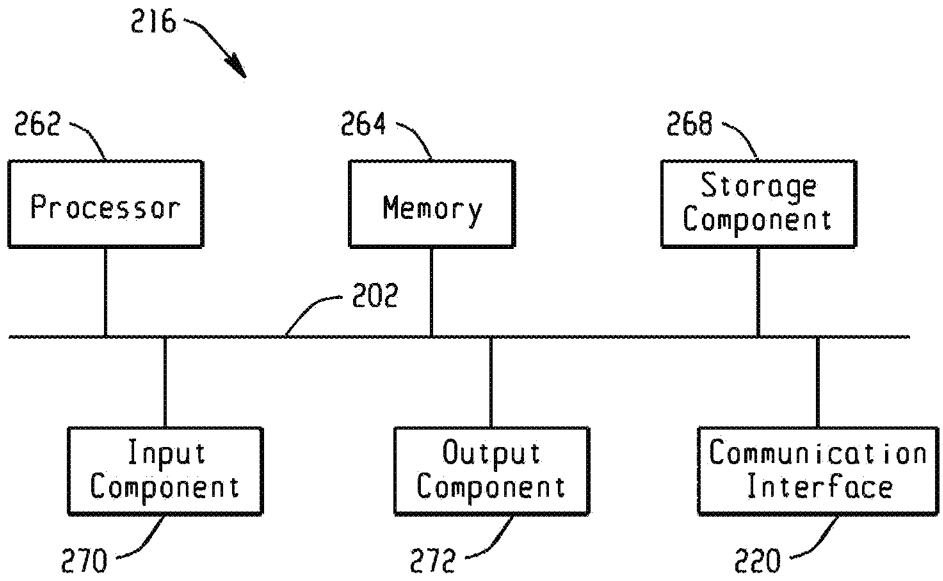
FIG. 7 is an illustration of a fall protection compliance system in accordance with some non-limiting embodiments or aspects of the present disclosure.

Referring now to FIG. 7, illustrated is a diagram of example components of the control device 216. As shown in FIG. 7, control device 216 may include a bus 260, at least one processor 262, memory 264, storage component 268, input component 270, output component 272, and communication interface 220.

Bus 260 may include a component that permits communication among the components of the control device 216. In some non-limiting embodiments or aspects, processor 262 may be implemented in hardware, firmware, or a combination of hardware and software. For example, processor 262 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 264 may include random access memory (RAM), read-only memory (ROM), and/or another type of dynamic or static storage device (e.g., flash memory, magnetic memory, optical memory, etc.) that stores information and/or instructions for use by processor 262.

The storage component 268 may store information and/or software related to the operation and use of the control device 216. For example, the storage component 268 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

The input component 270 may include a component that permits the control device 216 to receive information, such as via user input (e.g., a touchscreen display, a keyboard, a keypad, a mouse, a button, a switch, a microphone, a camera, etc.). Additionally or alternatively, input component 270 may include a sensor for sensing information (e.g., a global positioning system (GPS) component, an accelerometer, a gyroscope, an actuator, etc.). Output component 272 may include a component that provides output information from the control device 216 (e.g., a display, a speaker, one or more LEDs, etc.).

The control device 216 may perform one or more processes described herein. The control device 216 may perform these processes based on the processor 262 executing software instructions stored by a computer-readable medium, such as the memory 264 and/or the storage component 268. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into the memory 264 and/or the storage component 268 from another computer-readable medium or from another device via the communication interface 220. When executed, software instructions stored in the memory 264 and/or the storage component 268 may cause the processor 262 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The memory 264 and/or the storage component 268 may include data storage or one or more data structures (e.g., a database, and/or the like). The control device 216 may be capable of receiving information from, storing information in, communicating information to, or searching information stored in the data storage or one or more data structures in the memory 264 and/or the storage component 268. For example, the information may include input data, output data, or any combination thereof.

The number and arrangement of components shown in FIG. 7 are provided as an example. In some non-limiting embodiments or aspects, the control device 216 may include additional components, fewer components, different components, or differently arranged components than those shown in FIG. 7. Additionally or alternatively, a set of components (e.g., one or more components) of the control device 216 may perform one or more functions described as being performed by another set of components of the control device 216.

Figure 8:
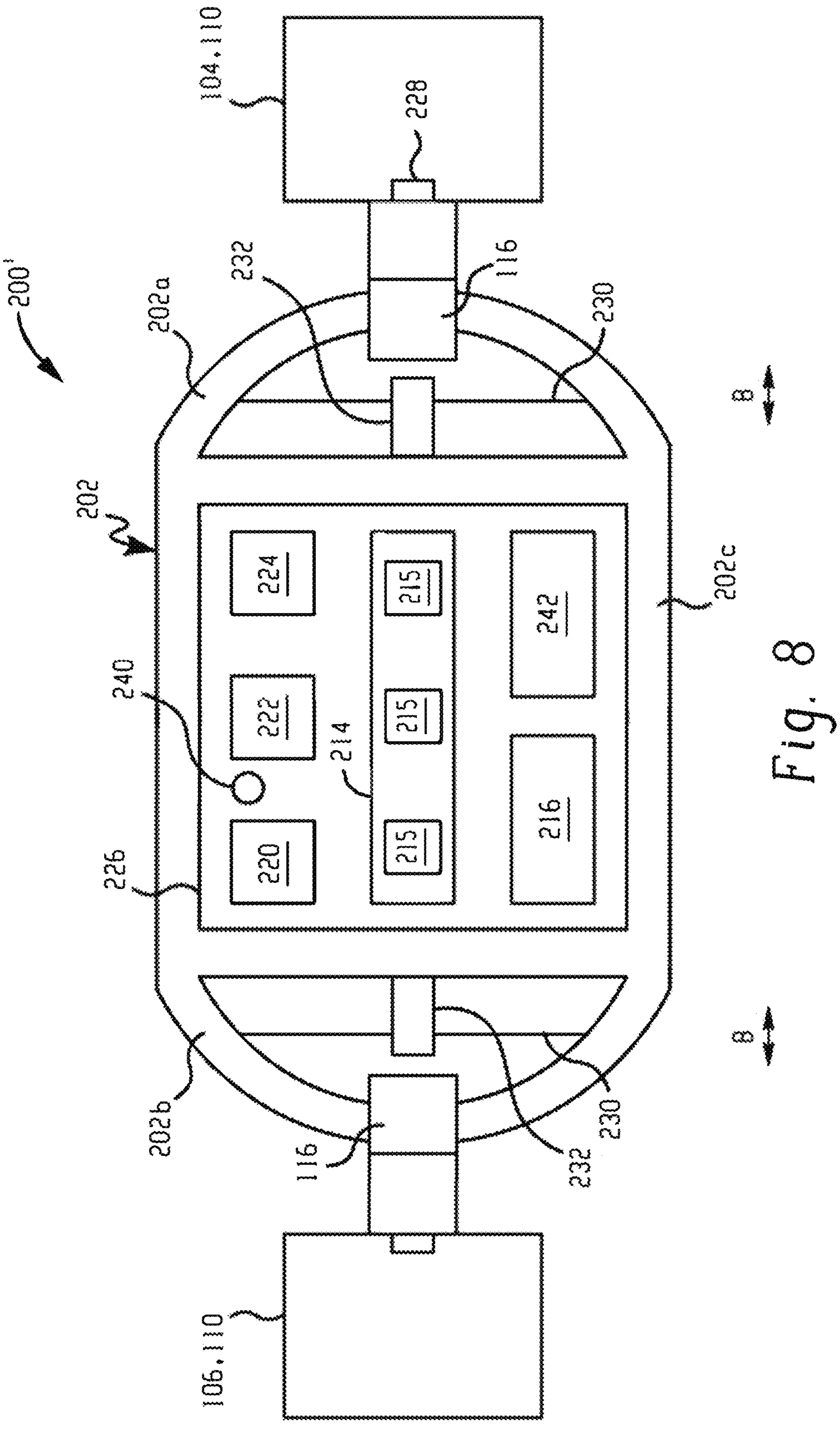
FIG. 8 is an illustration of a fall protection compliance system in accordance with some non-limiting embodiments or aspects of the present disclosure.
Figure 9:
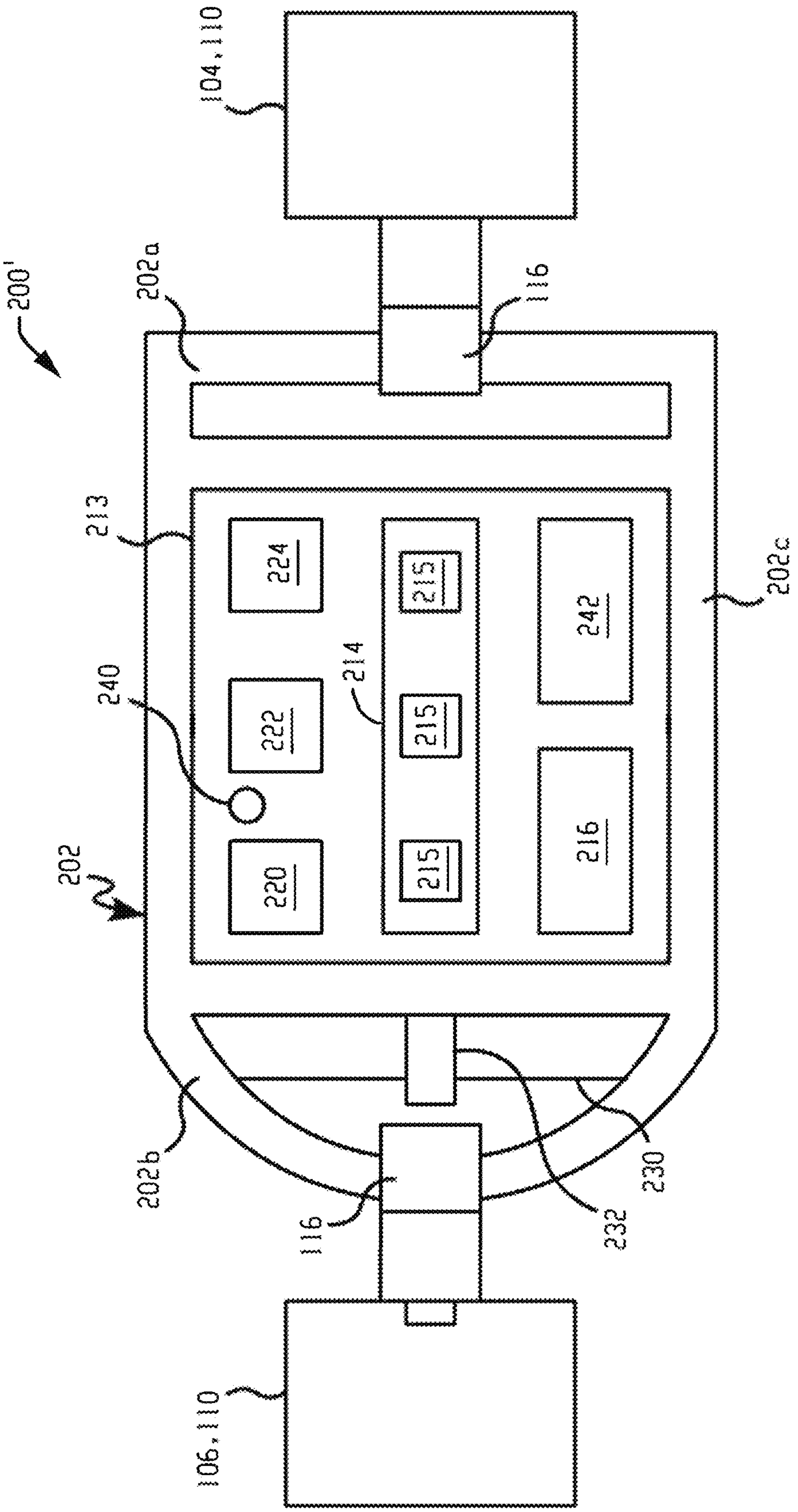
FIG. 9 is a diagram of some non-limiting embodiments or aspects of a fall protection compliance system.

With reference to FIGS. 8-9, a connector 200' is shown in accordance with some non-limiting embodiments or aspects of the present disclosure. The components of the connector 200' shown in FIGS. 8-9 are substantially similar or identical to the components of the connector 200 described herein with reference to FIGS. 3-5. Reference numerals in FIGS. 8-9 are used to illustrate identical components of the corresponding reference numerals in FIGS. 3-5. As the previous discussion regarding the connector 200 generally shown in FIGS. 3-5 is applicable to the connector 200' shown in FIGS. 8-9, only the relative differences between the two connectors are discussed hereinafter.

With reference to FIG. 8, the frame 202 has a first end 202*a* configured for connecting to a first piece of safety equipment, such as a safety harness 104 or a lanyard 110, and a second end 202*b* configured for connecting to a second piece of safety equipment, such as the lanyard 110 or anchor 106 (shown in FIG. 1). In some non-limiting embodiments or aspects, the connector 200' is configured to be attached directly to the front/rear portion of safety harness 104 by way of a ventral/dorsal D-ring. The first and second ends 202*a*, 202*b* of the frame 202 may be configured as D-rings (FIG. 8) to allow connection to components of a fall protection assembly via a connection element 116, such as a carabiner or a snap hook (not shown). In other embodiments or aspects, such as shown in FIG. 9, one of the first and second ends 202*a*, 202*b* may be a D-ring, while the other of the first and second ends 202*a*, 202*b* may be a slot configured for receiving, for example, a strap of the safety harness 104, to allow the connector 200' to be directly integrated with the safety harness 104.

With continued reference to FIGS. 8-9, the frame 202 of the connector 200' may be made from metal. The frame 202 may be a forging or casting that has a central section 202*c* for mounting the components of the connector 200' that are covered by the housing 213 enclosing additional components of the connector 200'. In some non-limiting embodiments or aspects, the housing 213 may be a cover formed from an epoxy or other fluid that hardens so that the components within the housing 213 cannot be damaged by normal usage and handling. In other embodiments or aspects, the housing 213 is a rigid cover that is removably or non-removably connected to the frame 202. When the frame 202 is configured for use as a load-bearing component, the entire frame 202 may be configured to withstand a minimum force of 5000 lbs or 22 kN of force for repeated drop test.

With continued reference to FIGS. 8-9, the sensor assembly 214 may be configured to detect whether the connector 200' is connected to safety equipment, such as a component of a fall protection assembly. In some non-limiting embodiments or aspects, the one or more sensors 215 may be configured to detect whether the first end 202*a* of the frame 202 of the connector 200' is connected to the D-ring 108 of the harness 104 and whether the second end 202*b* of the frame 202 is connected to the lanyard 110. Connection between the connector 200' and a component of the fall protection assembly, such as the harness 104 or the lanyard 110, may be made by way of loops, D-rings, carabiners, locking snap hooks, or other connection mechanisms. With each of these connection mechanisms, the one or more sensors 215 of the connector 200' is configured to detect whether a proper connection is made between these components and the first and second ends 202*a*, 202*b* of the frame 202.

In some non-limiting embodiments or aspects, the one or more sensors 215 is a Hall effect sensor configured for detecting whether the connector 200' is connected to a piece of safety equipment. The Hall Effect sensor may be mounted flush with an outside surface of the housing 213. The Hall Effect sensor may be surrounded by or positioned proximate to a magnetic surface. This magnetic surface may be configured to interact with a magnet 228 that is attached to a portion of a fall protection assembly, such as the safety harness 104 and the lanyard 110. In some non-limiting embodiments or aspects, the separate magnets 228 may be permanently secured to the lanyard 110 and the harness 104 by way of a cable and grommet, or by way of a riveted connection.

When the user connects the D-ring of the safety harness 104 to the lanyard 110 or other device, the connector 200' is disposed therebetween such that the magnet 228, either automatically or with additional guidance from the user, aligns and connects to the magnetic surface of the Hall effect sensor. This action changes the state of the Hall Effect sensor and indicates that the safety harness 104 is connected to the lanyard 110 via the connector 200'. The length of the cable connected to the magnet 228 is only as long as the distance between the Hall Effect sensor on the connector 200' and its cabled anchor point on the lanyard 110. The cable is sufficiently strong as to align with the connector 200', but flexible enough to bend as the connector 200' is in use and the magnet is strong enough to stay attached under normal motion of the worker throughout the work day. The Hall Effect sensor may also be incorporated with the connection sensor assembly 214 described herein with reference to FIGS. 3-5.

In some non-limiting embodiments or aspects, the one or more sensors 215 may be a strain gauge configured to detect connection of the safety harness 104 to the lanyard 110 or other safety equipment by way of pull strain at the connection interface of these components. One end of the strain gauge may be connected to a fixed anchor point or on the harness 104, while the other end of the strain gauge may be connected to the lanyard 110. In this manner, the connection of the lanyard 110 to the harness 104 is detected due to a strain reading on the strain gauge of the connector 200'. The strain gauge may also be incorporated with the connection sensor assembly 214 described herein with reference to FIGS. 3-5.

In some non-limiting embodiments or aspects, the one or more sensors 215 may be a contact switch configured to detect connection of the safety harness 104 to the lanyard 110 or other fall protection device. The contact switch may have a shield or arm that prevents a carabiner or other device to connect to the D-ring of the harness 104 or the connector 200' without tripping the switch. The switch may be part of an assembly including an arm that partially covers the area within the D-ring. When the connector 200' connects to the D-ring of the harness 104, the arm or shield is moved away from its home position, thereby causing the switch to open or close depending on its configuration to indicate that a connection has been made between the D-ring of the harness 104 and the connector 200'. A similar connection mechanism may exist between the lanyard 110 or other fall protection device and the connector 200'. The contact switch may also be incorporated with the connection sensor assembly 214 described herein with reference to FIGS. 3-5.

In some non-limiting embodiments or aspects, the one or more sensors 215 may be configured to detect movement of the connector 200', such as due to movement of the worker. In such embodiments or aspects, the one or more sensors 215 may be a gyroscope and/or an accelerometer. The gyroscope and/or accelerometer may also be incorporated with the connection sensor assembly 214 described herein with reference to FIGS. 3-5.

In further embodiments or aspects, the one or more sensors 215 may include a gyroscope, an accelerometer, and a Hall Effect sensor. In this configuration, the gyroscope and accelerometer are configured for detecting a near zero acceleration event (fall), a high acceleration event (fall arrest), motion or lack of motion, and worker orientation. The accelerometer may be configured to detect motion even if the worker is in a relatively static position such as when the worker is seated, kneeling, or in a prostrate position. The Hall Effect sensor may detect whether the connector 200' is connected to or disconnected from the fall protection assembly, as described herein. For example, in an event of a fall from an elevated surface, the unit connector 200' may be configured to record the time and date of the event, along with the orientation and motion of the worker prior to, during, and after the fall event. In this way, specific alarms can be configured, broadcast, and recorded, regarding the state of the worker as being in distress or being able to recover from a possible fall event. If the accelerometers or gyroscopes show accelerations other than that of just gravity (e.g. the unit is NOT at rest, but is moving) then a second condition of compliant use of the connector 200' is met. In any embodiment or aspect where the one or more sensors includes an accelerometer or a gyroscope, data from these sensors can be used to show a pattern of use or behavior regarding the device over time. In embodiments or aspects where the connector 200' has a gyroscope, the initial orientation of the gyroscope can be determined and saved as a baseline orientation. Deviation in orientation from this baseline orientation can be used for generating an alert that the user may have fallen or is in a situation where assistance may be required. The combined gyroscope, an accelerometer, and a Hall Effect sensor may also be incorporated with the connection sensor assembly 214 described herein with reference to FIGS. 3-5.

In some non-limiting embodiments or aspects, the loop-shaped first and second ends 202*a*, 202*b* of the connector 200' may have a retractable cover panel 230 movable between a retracted position and an extended position. In the retracted position, the loop-shaped ends 202*a*, 202*b* are open to allow connection of the connector 200' to another device, such as the D-ring of the harness 104 or the lanyard 110. In the extended position, the loop-shaped ends 202*a*, 202*b* are covered to prevent connection of such devices to the connector 200'. The retractable panel 230 may be configured to be automatically moved from the extended position to the retracted position when a D-ring, carabiner or other connector used in fall protection applications is attached to either end 202*a*, 202*b*.

The retractable panel 230 may be connected to a sensor, such as a mechanical, electrical, or an optical sensor, that is configured to detect the position of the cover panel 230, such as the retracted position, the extended position, or an intermediate position between the extended position and the retracted position. In some non-limiting embodiments or aspects, connection of the D-ring, carabiner or other connector used in fall protection applications to the connector 200' may move the panel 230 from the extended to the fully retracted position in a direction of arrow B in FIG. 8, thereby indicating a proper connection. The panel 230 may be biased to the extended position by a biasing mechanism, such as a spring. If the panel 230 is moved to the intermediate position, this may indicate that an improper connection is made or that an improper connector is connected to the connector 200'. The connector 200' may be configured to detect whether a connection has been made to one or both of the ends 202*a*, 202*b* of the frame 202 based on a position of the panel 230. If the connector 200' detects that both ends 202*a*, 202*b* are connected to a respective connector, this information may indicate a first condition of compliant use of the connector 200'.

In some non-limiting embodiments or aspects, a deflectable element 232, such as a paddle, may be disposed within an open area of the first and second ends 202*a*, 202*b* of the frame 202 of the connector 200'. The deflectable element 232 may be configured to pivot around the axis that is perpendicular to the housing 213 between an undeflected, or closed position and a deflected, or open position. The deflectable element 232 may be biased to the closed position by a biasing mechanism, such as a spring. The deflectable element 232 may interact directly or indirectly with a switch, such as a contact, optical, magnetic or other type of switch. In some non-limiting embodiments or aspects, the switch may be a non-contact type such that the housing 213 can be completely sealed from the surrounding environment. When a connection is made to the first or second end 202*a* 202*b* of the frame 202, the deflectable element 232 is moved from its initial position to a second, deflected position. The connector 200' may be configured to detect whether a connection has been made to one or both of the ends 202*a*, 202*b* of the frame 202 based on a position of the deflectable element 232. If the connector 200' detects that both ends 202*a*, 202*b* are connected to a respective connector, this information may indicate a first condition of compliant use of the fall protection assembly.

The connector 200' may be configured to store data received from one or more sensors 215, along with time, date, and/or location data associated with data received from one or more sensors 215. The connector 200' may have an acquisition mode wherein data received by one or more sensors 215 is stored in system memory along with a time, date, and/or location stamp. When in the acquisition mode, the connector 200' may store any conditional change of the one or more sensors 215, along with a time, date, and/or location stamp. For example, turning the connector 200' on and placing it in the acquisition mode may save in the system memory an initial time, date, and/or location stamp. Connection of one end 202*a*, 202*b* of the frame 202 to a connector generates a conditional change in the one or more sensors 215, which is saved in the system memory along with the time, date, and/or location stamp associated with such conditional change. Similarly, if the connector 200' is in motion due to movement of the worker, such conditional change may be saved in the system memory along with the time, date, and/or location stamp associated with such conditional change. Data recorded to system memory can be organized in any manner of logs or intervals from minutes, hours, shifts, days, weeks, or similar.

Figure 10:
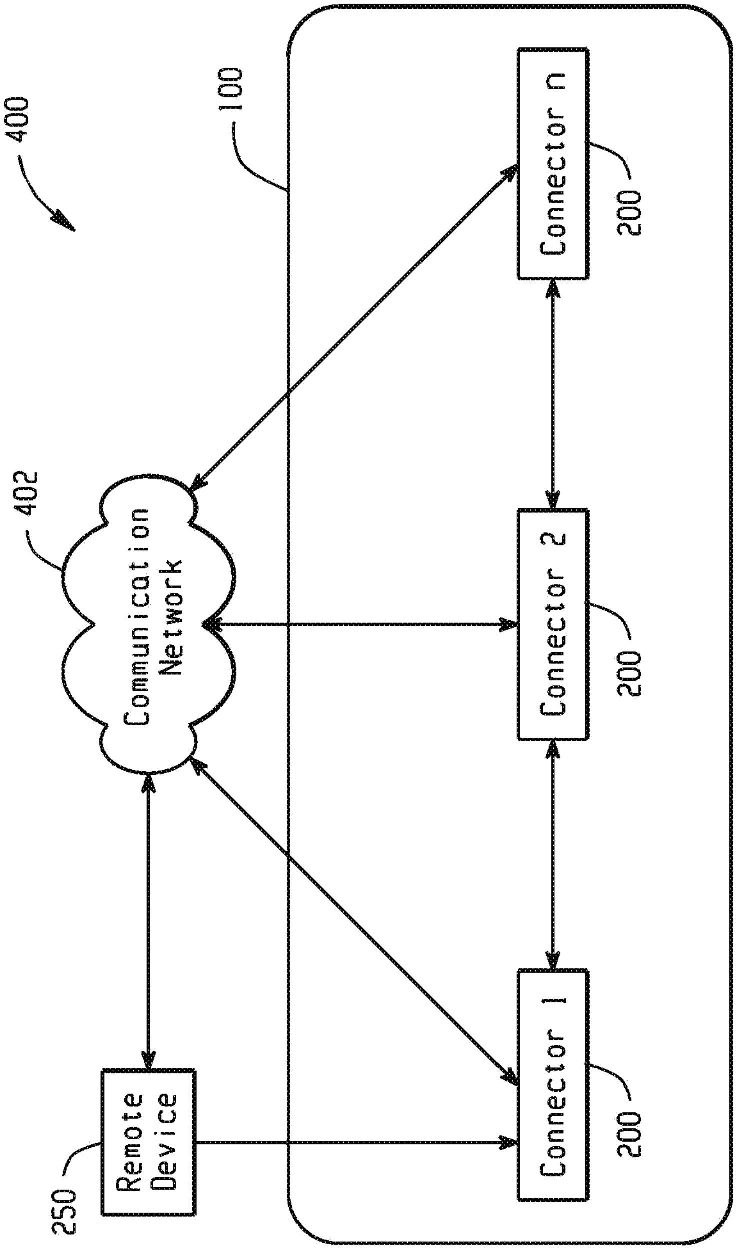
FIG. 10 is a diagram of components of a connection sensor assembly in accordance with some non-limiting embodiments or aspects of the present disclosure.

Referring now to FIG. 10, FIG. 10 is a diagram of an example environment 400 in which the fall protection compliance system 100 described herein may be implemented. As shown in FIG. 10, environment 400 includes the fall protection compliance system 100, which may include a plurality of connectors 200, various pieces of safety equipment, such as lanyards, to which the connectors 200 may be connected, a plurality of anchors having one or more connection structures 300 with identification elements 320. In some non-limiting embodiments or aspects, the environment 400 may correspond to a construction site where a plurality of users may be assigned to work. The environment 400 may further include a communication network 402, and one or more remote devices 250 configured to communicate via one-way or two-way communication with the connectors 200 of the fall protection compliance system 100 using the communication network 402. In some non-limiting embodiments or aspects, the plurality of connectors 200 may be configured to communicate with each other using the communication network 402. The remote device(s) 250 and the connectors 200 may interconnect (e.g., establish a connection to communicate, and/or the like) via wired connections, wireless connections, or a combination of wired and wireless connections using the communication network 402.

In some non-limiting embodiments or aspects, the environment 400 allows authorized users to perform preventive occupational health and safety actions and manage inspections and maintenance of safety equipment. Each remote device 250 may be configured to transmit and/or receive data to and/or from the connectors 200 of the fall protection compliance system 100 via a short-range wireless communication connection (e.g., an NFC communication connection, an RFID communication connection, a Bluetooth® communication connection, and/or the like). In some non-limiting embodiments or aspects, the remote device 250 may be associated with a user (e.g., a safety manager).

Communication network 402 may include one or more wired and/or wireless networks. For example, the communication network 402 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a short-range wireless communication network (e.g., an NFC communication network, an RFID communication network, a Bluetooth® communication network, and/or the like), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 10 are provided as an example. There may be additional systems and/or devices, fewer systems and/or devices, different systems and/or devices, or differently arranged systems and/or devices than those shown in FIG. 10. Furthermore, two or more systems and/or devices shown in FIG. 10 may be implemented within a single system or a single device, or a single system or a single device shown in FIG. 10 may be implemented as multiple, distributed systems or devices. Additionally, or alternatively, a set of systems or a set of devices (e.g., one or more systems, one or more devices) of the environment 400 may perform one or more functions described as being performed by another set of systems or another set of devices of the environment 400.

Figure 11:
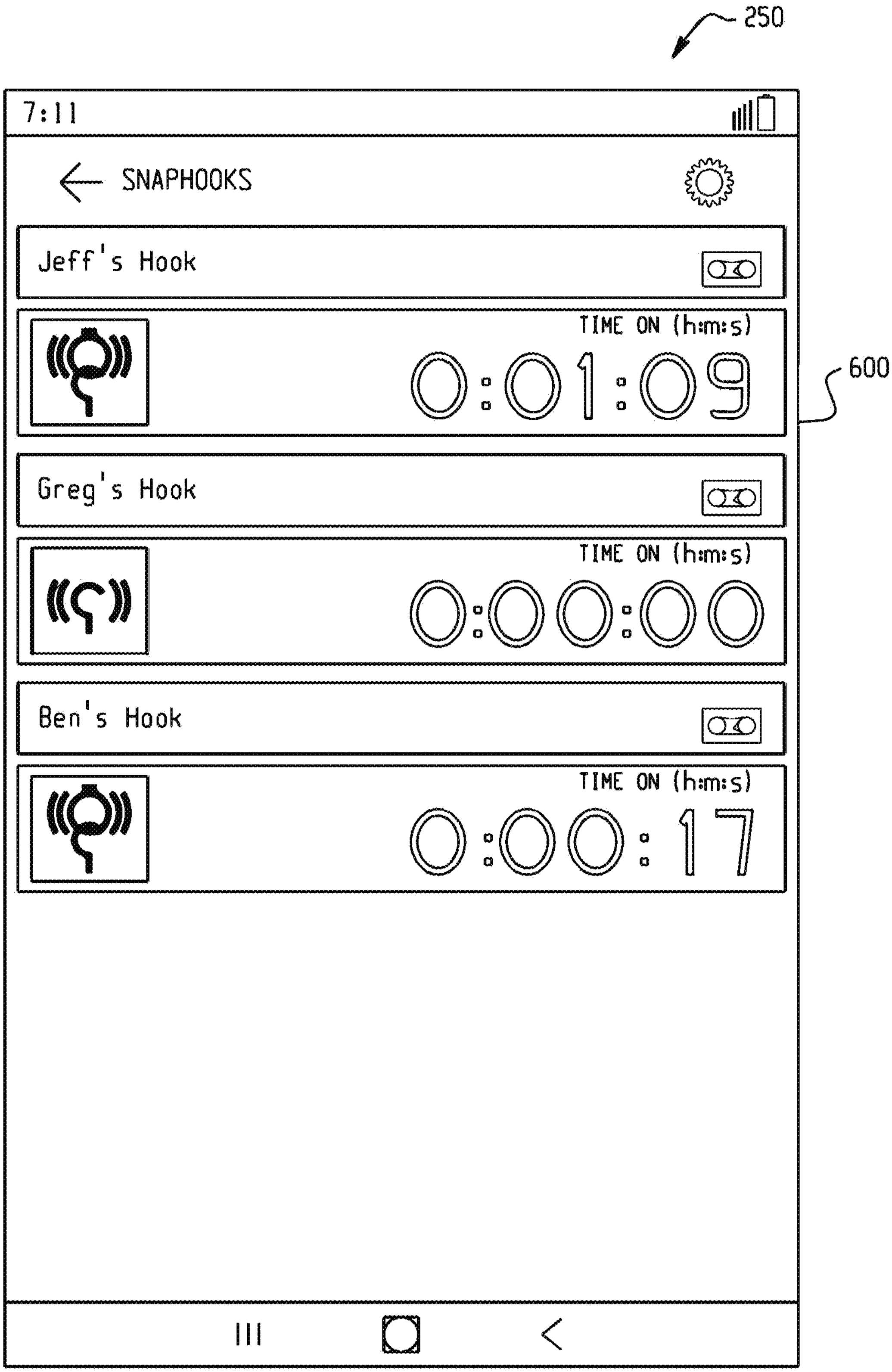
FIG. 11 is an illustration of a graphical user interface for use with a fall protection compliance system in accordance with some non-limiting embodiments or aspects of the present disclosure.
Figure 12:
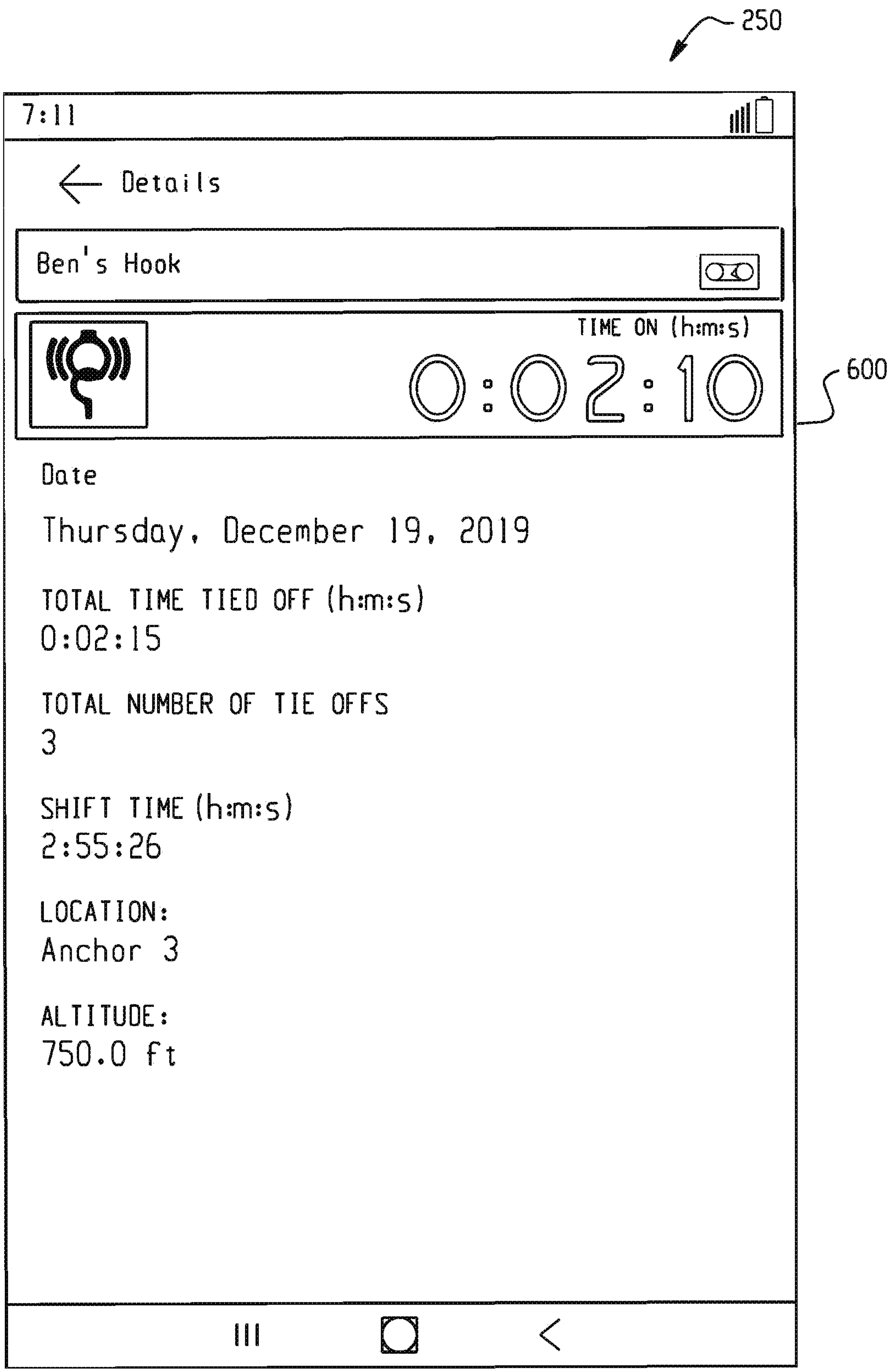
FIG. 12 is an illustration of a graphical user interface for use with a fall protection compliance system in accordance with some non-limiting embodiments or aspects of the present disclosure.

With reference to FIGS. 11-12, data received by the remote device 250 may be displayed on a graphical user display 600 for review by the compliance manager, industrial hygienist or other supervisor personnel. The received data may include, for example, the time-stamped transitions between all device states, sensor data, and device health status. For example, as shown in FIG. 11, the display 600 may include information regarding the connection status of each connector that is part of the fall protection compliance system 100. In some non-limiting embodiments or aspects, such as shown in FIG. 12, the display 600 may include information regarding the user's name or the connector name, battery life, time of current connection, current date and time, total time tied off (accumulated since the connector was turned on), total number of times the connector has been tied off, total time (accumulated since the device was turned on), location of specific connecting structure that the connector is connected to (dictated by the RFID tag), altitude (dictated by an altimeter on the device board), and any combination thereof.

Figure 13:
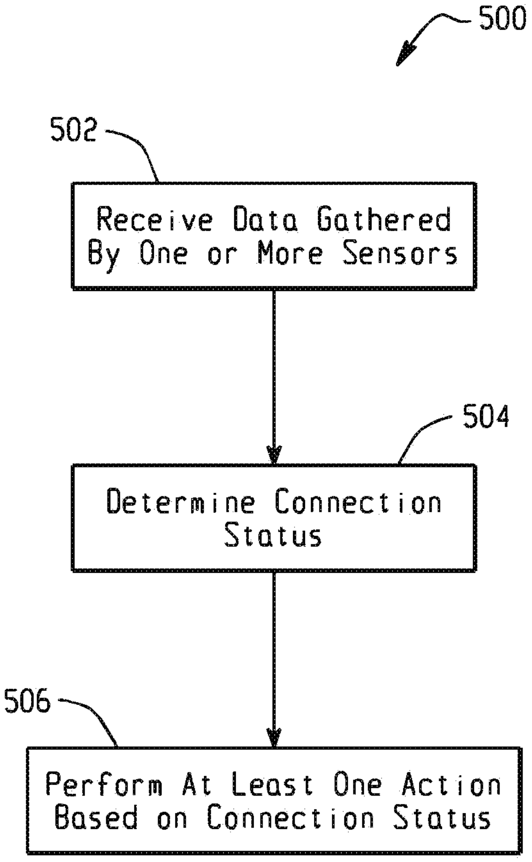
FIG. 13 is a flowchart of a process for detecting connection of a connector of a fall protection compliance system to a connection structure in accordance with some non-limiting embodiments or aspects of the present disclosure.

Referring now to FIG. 13, FIG. 13 is a flowchart of a non-limiting embodiment or aspect of a process 500 for determining a connection status of a connector 200. In some non-limiting embodiments or aspects, one or more of the functions described with respect to process 500 may be performed (e.g., completely, partially, etc.) by the connector 200. In some non-limiting embodiments or aspects, one or more of the steps of process 500 may be performed (e.g., completely, partially, and/or the like) by another device or a group of devices separate from the connector 200, such as the remote device 250.

With continued reference to FIG. 13, at step 502, the process 500 may include receiving, with the control device 216, data gathered by one or more sensors 215. For example, in some non-limiting embodiments or aspects, the process 500 may include receiving connection data gathered by the at least one magnetometer 217. Detecting the presence of the disturbance in the magnetic field may be indicative of a presence of a ferromagnetic material of the connection structure 300 within the connection area 206 of the connector 200. Conversely, detecting the absence of the disturbance in the magnetic field may be indicative of an absence of the ferromagnetic material of the connection structure 300 within the connection area 206 of the connector 200. As described herein, the at least one magnetometer 217 is configured to detect a presence or an absence of a disturbance in a pre-defined magnetic field within the connection area 206 generated by the permanent magnet. The connection data may include, for example, a signal that corresponds to the characteristics of a magnetic field detected by the at least one magnetometer 217.

With continued reference to FIG. 13, at step 502, the process 500 may further include receiving, with the control device 216, communication data gathered by the at least one short-range wireless communication antenna 221. Detecting the presence of the identification element 320 may be indicative of a presence of an approved connection structure 300. Conversely, detecting the absence of the identification element 320 (i.e., not detecting the identification element 320) may be indicative of an absence of the approved connection structure 300. As described herein, the at least one short-range wireless communication antenna 221 is configured to detect a presence or an absence of an identification element 320 that is connected to the connection structure 300. The communication data may include, for example, a signal that is indicative of whether the identification element 320 is within the detection range of the at least one short-range wireless communication antenna 221.

With continued reference to FIG. 13, at step 504, the process 500 may include determining, with the control device 216, a connection status of the connector 200 based on detecting the presence or the absence of the disturbance in the magnetic field via the at least one magnetometer 217. For example, by detecting the presence of the disturbance in the magnetic field via the at least one magnetometer 217, the control device 216 may correlate such disturbance to be indicative of a presence of a ferromagnetic material of the connection structure 300 within the connection area 206 of the connector 200. Conversely, by detecting the absence of the disturbance in the magnetic field via the at least one magnetometer 217, the control device 216 may correlate such absence of the disturbance to an absence of the ferromagnetic material of the connection structure 300 within the connection area 206 of the connector 200.

With continued reference to FIG. 13, at step 504, the process 500 may further include determining, with the control device 216, a connection status of the connector 200 based on detecting the presence or the absence of the identification element 320 on the connection structure 300 via the at least one short-range wireless communication antenna 221. For example, by detecting the presence of the identification element 320 via the at least one short-range wireless communication antenna 221, the control device 216 may correlate such presence to be indicative of a presence of an approved connection structure 300. Conversely, by detecting the absence of the identification element 320 (i.e., not detecting the identification element 320) via the at least one short-range wireless communication antenna 221, the control device 216 may correlate such absence to be indicative of an absence of the approved connection structure 300.

With continued reference to FIG. 13, at step 506, the process 500 may include performing, with the control device 216, at least one action based on the connection status. For example, the control device 216 may provide a first visual, audio, and/or tactile indication that is indicative of a presence of a ferromagnetic material of the connection structure 300 within the connection area 206 and/or a presence of an identification element 320 on the connection structure 300. Conversely, the control device 216 may provide a second visual, audio, and/or tactile indication that is indicative of an absence of the ferromagnetic material of the connection structure 300 within the connection area 206 and/or an absence of an identification element 320 on the connection structure 300. In further examples, the control device 216 may be configured to transmit the connection status to a remote device 250 via the communication network 402.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

Figure 14:
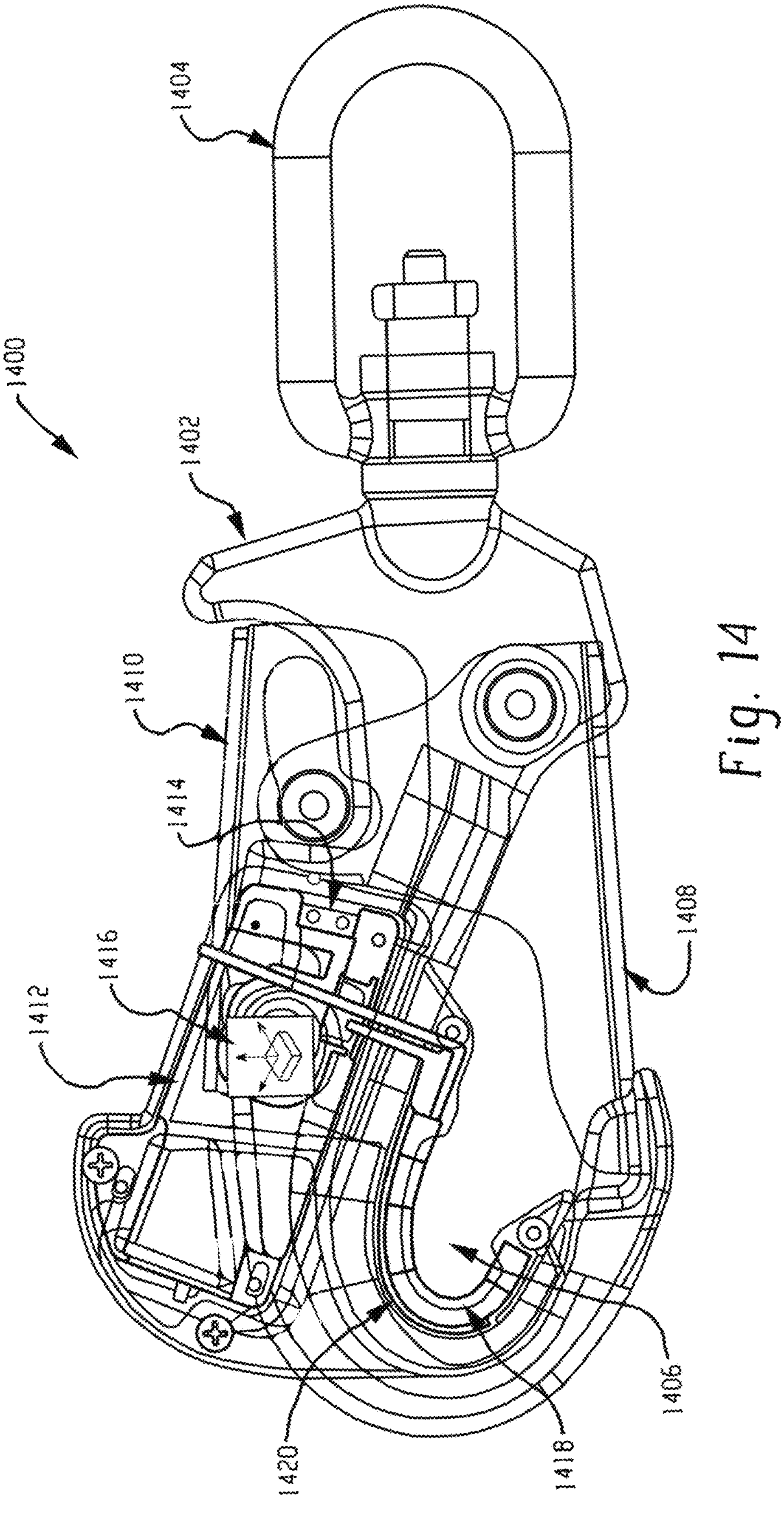
FIG. 14 is a diagram depicting a hook connection structure having a plurality of sensors provided thereon.

As noted above, a connection structure as described herein can take a variety of forms. FIG. 14 is a diagram depicting a hook connection structure 1400 having a plurality of sensors provided thereon. The connection structure includes a hook portion 1402, the hook portion 1402 being connected to a connection point 1404 for connecting the connection structure 1400 to an external structure, such as a line that is connected to a rigid structure, a line that is connected to a user (e.g., a harness the user is wearing), or directly to a user, such as via a harness. The hook portion 1402 includes a base, hook shaped structure that includes an end portion 1406 for receiving an anchor structure (not shown in FIG. 14). As described above, that anchor structure may be directly connected to a rigid structure (e.g., via a hook, a ring, a carabiner, a line loop), indirectly to a rigid structure via an intervening structure (e.g., a line, an energy absorber, additional hooks or other connectors), or to a user directly or indirectly. The hook portion 1402 further includes a movable gate 1408 for completing a closed loop that prevents an anchor structure captured therein from disengaging from the hook portion 1402. As described above, the movable gate 1408 may be biased toward the closed position as depicted in FIG. 14 or otherwise secured (e.g., via a gate lock 1410, via a threaded bolt) such that the possibility of accidental breaking of the closed loop provided by the hook portion 1402 is mitigated.

The hook connection structure 1400 of FIG. 14 includes certain electronics and sensors for monitoring a state of connection of the connection structure 1400. The hook portion 1402 is equipped with electronics 1412 for receiving sensor signals from a set of sensors 1414, 1416, 1418, 1420, storing data associated with those sensor signals for later access, and for transmitting that stored data to an external entity, such as via a wired or wireless connection. In embodiments, the electronics 1412 may further include a battery (not shown) for powering the electronics 1412 and sensors and functionality for providing status and alarm information (e.g., lights, a speaker). In the example of FIG. 14, the hook portion 1402 includes an interlock switch 1414 for monitoring the status of the movable gate 1408. In embodiments, detection of movement of the gate 1408 via switch 1414 can be used as a wakeup signal instructing the electronics 1412 to begin actively collecting data from the attached sensors. In embodiments, a lack of sensor activity for more than a timeout period of time (e.g., minutes, a half hour, an hour, hours) may be interpreted as indicating that the connection structure 1400 is not in use and as a command to put the connection structure 1400 into a low power or sleep state to prolong battery life. Data regarding the position of the movable gate 1408 acquired via the switch 1414 may be monitored and stored by the electronics 1412 (e.g., open status and associated time stamp, closed status and associated time stamp). An alarm condition may be noted and acted upon (e.g., with an audible alarm) when the hook structure 1402 is in an abnormal state, such as when the switch 1414 indicates that the movable gate 1408 is in the open position for a prolonged period of time (e.g., more than 10 seconds, more than a minute), which may indicate that a user is not properly connected (e.g., a line or other anchor structure is pinned between the movable gate 1408 and the hook portion 1402).

The hook structure 1402 may further be equipped with one or more accelerometers 1416, 1418. In the example of FIG. 14, a first accelerometer 1416 provides data regarding three dimensional relative motion of the connection structure 1400. The first accelerometer 1416 provides data regarding movement in one or more of an x, y, and z direction. The accelerometer 1416 data can be stored (e.g., via periodic, timestamped sampling on a microsecond, millisecond, second, minute basis) and transmitted from the hook portion 1402. That data may be interpreted by the electronics 1412 or remotely interpreted for indications of events such as a fall event and a fall arrest event. Alarms may be issued upon detection of such events. Data from the accelerometer 1416 may further be used to detect compliant continued connection of the connection structure to an anchor structure, alone or in combination with data from the other sensors. For example, changes to the accelerometer data may indicate that a user is currently properly connected, as opposed to a user who has clipped the connection structure 1400 to an anchor structure, where the connection structure 1400 is not actually connected to a user's harness (e.g., the connection structure 1400 is in a dead hang configuration). Further, a signature of data from the accelerometer 1416 may be used to indicate anomalous conditions. For example, accelerometer data that is periodic in nature could be interpreted to indicate an improper connection (e.g., a dead hanging connection structure swinging in a windy environment). An alarm may be issued if the electronics 1412 identify an improper connection. Further, such an improper connection could be later identified (e.g., after wireless transmission of data), such that corrective action can be taken (e.g., further training of the user, reprimand).

The example of FIG. 14 further includes a second accelerometer 1418 in the form of a piezo sensor. The example piezo sensor 1418 provides a charge and associated voltage when mechanical stress is applied to its structure. In the example of FIG. 14, the piezo sensor 1418 comprises an insulated wire that is positioned along an inside edge of the end portion 1406 where the piezo sensor 1408 and/or surrounding structure (as described further below) mechanically interacts with an anchor structure positioned within the end portion 1406 of the hook portion 1402. A voltage signal generated by the piezo sensor 1406 accelerometer is received by the electronics 1412 for storage as data, interpreted for detection of events, or transmission to an external entity such as a remote server. In embodiments, piezo sensor 1418 data can be used to detect events, alone or in combination with other sensor data. For example, a lack of a signal from the piezo sensor 1418 could indicate that a user is not currently connected properly to an anchor structure because of the lack of relative movement and contact of the connection structure 1400 relative to the anchor structure. Data from the piezo sensor 1418 can further be interpreted to indicate active events such as a fall, a fall arrest, or movement along a line. For example, the electronics 1412 or an external reviewing processor can be trained to recognize signatures in the piezo data indicative of event data. For example, a sudden halt of a piezo signal may indicate a free fall condition. A sudden spike could indicate a fall arrest condition. A periodic signal could indicate a user movement event (e.g., indicating the connection structure 1400 scraping across a horizontal line anchor structure). Alarms may be issued or future corrective action taken based on the detection of events locally at the electronics 1412 or remotely after data transmission.

The hook portion 1402 of FIG. 14 further includes a pressure switch 1420 that collects data regarding the existence and/or amount of pressure experienced at the sensor, such as through a force applied by the anchor structure interacting with the hook portion 1402. For example, the pressure switch 1420 may be positioned next to a spring surrounding the piezo sensor 1418, as described further below. Metallic contact between the spring and the pressure switch (e.g., when the anchor structure presses the spring against the end portion 1406) may provide a conductive path enabling transmission of a signal to the electronics 1412. The pressure switch may be used alone or in combination with other sensor data to indicate events. For example, an active pressure switch signal may indicate that the anchor structure is actively pressing against the end portion 1406 of the connection structure 1400, indicating that a user is currently supported by the connection structure 1400. This may be indicative of a proper connection on its own. In other examples, in combination with data indicating sudden movement (e.g., from accelerometers 1416, 1418), an active pressure switch 1420 signal could be indicative of a fall arrest condition, where appropriate alarms or other corrective action can then be taken.

As noted above, each of the sensors 1414, 1416, 1418, 1420 provide data that provides some indication on whether a user utilizing the connection structure 1400 is continually connected to the anchor structure. In embodiments, the electronics 1412 on the connection structure 1400 are configured to determine based on data from one or more of the sensors whether a user is currently properly connected to the anchor structure. The electronics 1412 are configured to store data associated with that sensed continued connection of the connection structure 1400 to the anchor structure (e.g., a Boolean yes/no connection signal, a likelihood of proper connection value, a connection type value (e.g., no connection, connection with active movement, connection with limited movement)). That data can be output from the connection structure to an external entity for monitoring compliance, and in embodiments can be used to issue an alarm (e.g., an audible alarm when a lack of connectivity is detected to prompt a user to reconnect).

Figure 15:
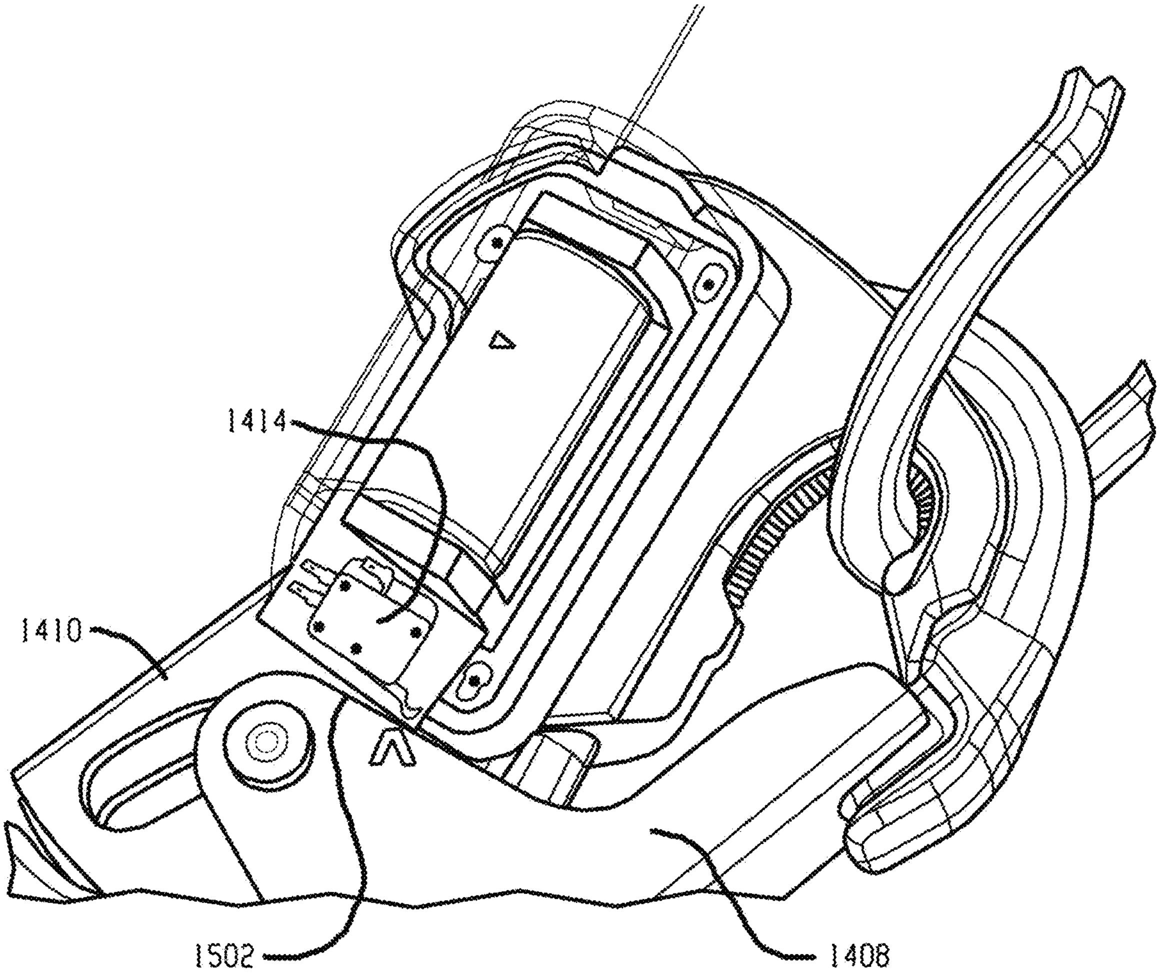
FIG. 15 is a diagram depicting an example configuration of an interlock switch configured to monitor a position of a movable gate of a hook connection structure.

FIG. 15 is a diagram depicting an example configuration of an interlock switch configured to monitor a position of a movable gate of a hook connection structure. As described above, a hook connection structure includes a moveable gate 1408 that enables interfacing of the connection structure with an anchor structure. In embodiments, the movable gate 1408 may be held in place by a gate lock 1410 to prevent unintentional movement of the movable gate 1408. An interlock switch 1414 is configured to monitor the position of the movable gate 1408 to enable capture of data regarding whether and at what times the movable gate 1408 is in the open and closed position, such as in an event log data structure.

As noted above, a fall protection compliance system may monitor continued connection of the connection structure to the anchor structure over a period of time and to output a signal indicating that continued connection, such as logic embedded in electronics associated with the connection structure. In one embodiment, the logic dictates that a connection or disconnection event will be preceded by a signal from the gate switch 1414. A user depresses gate lock 1410 while simultaneously moving the movable gate 1408 to transition the movable gate 1408 to the open position. This allows the user to connect or disconnect the connection structure from the anchor structure. When the movable gate 1408 is moved to the open position, an edge 1502 of the movable gate structure contacts a lever on the interlock switch 1414, actuating the switch. As noted above, a signal from the switch 1414 indicating a move to the open position can act as a wakeup signal for the electronics of the connection structure, such that the electronics begin to actively seek to detect an initial and ongoing connection of the connection structure with the anchor structure. An open gate signal, followed by a closed gate signal, in combination with signals from the other sensors (e.g., an accelerometer, a piezo sensor, a pressure switch) can be deemed an indicator that a connection has been established. Further signals from those other sensors can indicate continued connection. A subsequent open gate signal from the gate switch 1414 could be indicative of a disconnect event. For example, a subsequent open gate switch followed by limited or no further signals from other sensors could be interpreted by the electronics as a disconnect event for storage in a memory, log file, or transmission to an external entity.

Figure 16:
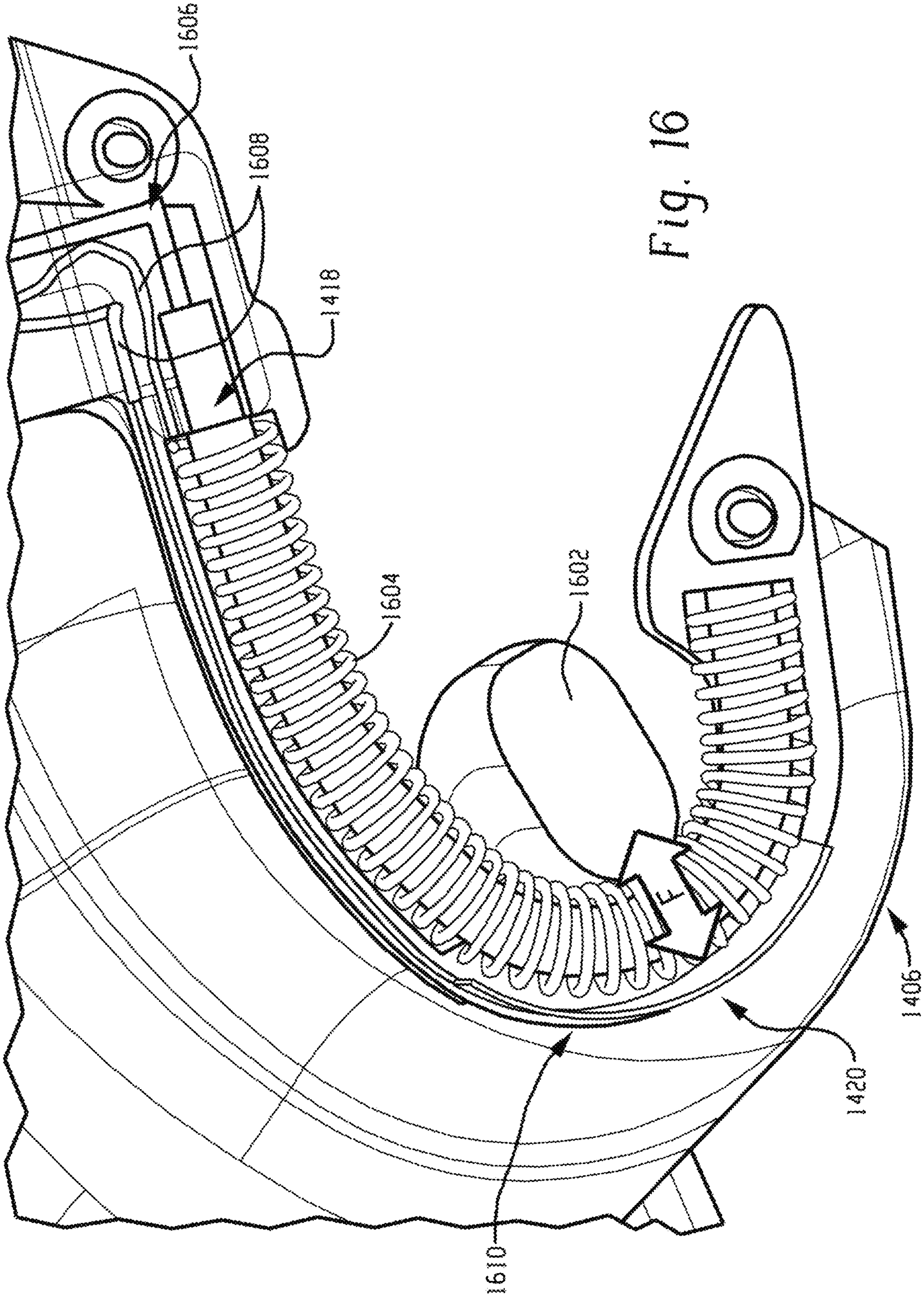
FIG. 16 is a diagram depicting an example configuration of a piezo sensor and a pressure switch.

FIG. 16 is a diagram depicting an example configuration of a piezo sensor and a pressure switch. FIG. 16 depicts a hook connection structure having an end portion 1406 that is interfaced with an anchor structure 1602, where a cross section of that anchor structure (e.g., a ring, a carabiner) is depicted in FIG. 16. The example of FIG. 16 includes a piezo sensor 1418 and a pressure switch 1420. The piezo sensor 1418 takes the form of an insulated piezo cable positioned within a protective metallic spring 1604. A voltage is induced in the piezo cable 1418 when that cable is deformed, experiences movement or experiences shock, such as by contact of the anchor structure 1602. As described further herein, the piezo sensor 1418 may be positioned within a deformable portion of the end portion 1406 such that relative movement of the piezo sensor 1418 and surrounding protective spring 1604 is possible in relation to the anchor structure 1602. The induced voltage in the piezo sensor is transmitted via a wire 1606 to the electronics of the connection structure, for sensing of a status of the connection structure. FIG. 16 further includes a pressure switch 1420. In the example of FIG. 16, the pressure switch is formed from the combination of the metallic contact plate 1610 and the protective metallic spring 1604. The bend in the spring induces compression on the spring side towards 1602 and tension on the opposite side towards 1420. The compression/tension is such that a Force F is required to stretch and move the spring towards the metallic contact plate 1420. In operation, presence of the anchor structure 1602 in the end portion 1406 can impart a force on the protective metallic spring 1604 toward the end portion 1406. That force can move the protective metallic spring toward the metallic contact plate 1610 such that metallic contact is made between the two. When metallic contact is made, an electrically conductive circuit is formed which transits over the wire pair 1606 to the electronics 1412 which detects the conductive path formed between the wire pair 1606 thus sensing a connection status of the connection structure.

Figure 17:
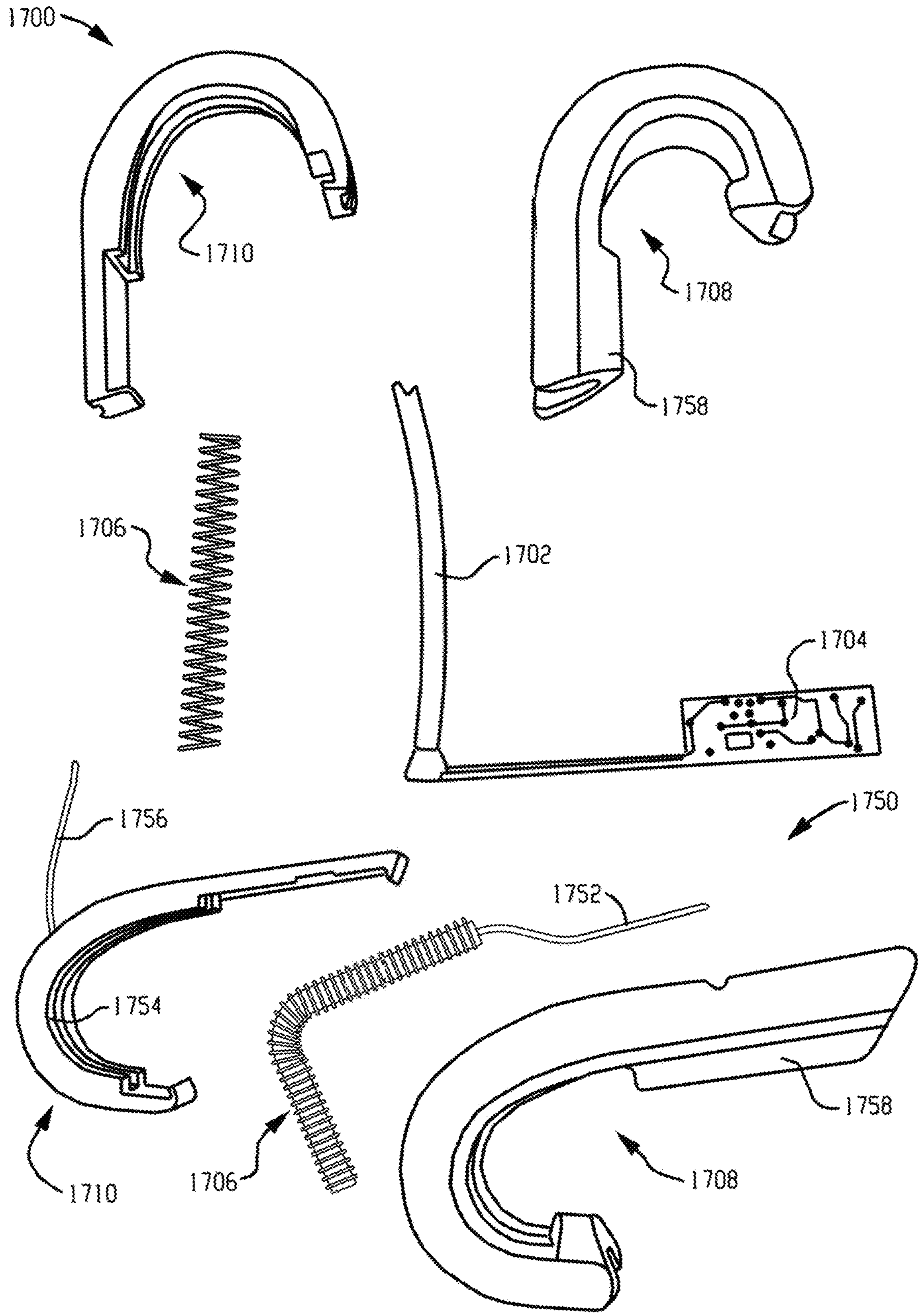
FIG. 17 is a diagram depicting an example configuration of a piezo sensor and a pressure switch.

FIG. 17 is a diagram depicting an example configuration of a piezo sensor and a pressure switch. The piezo sensor, depicted at 1700, comprises a piezo coaxial type of cable 1702. The piezo cable 1702 is connect to electronics 1704 of the connection structure, such that a voltage induced in the piezo cable 1702 via deformation, movement, or shock is transmitted to the electronics 1704 for use in detecting connection status of the connection structure. The piezo cable 1702 is positioned within the protective spring 1706. The piezo cable 1702 and surrounding protective spring 1706 (when assembled) are positioned between an inner deformable structure 1708 and an outer deformable structure 1710. In embodiments, the deformable structures 1708, 1710 are made from non-conductive material, such as ABS or nylon plastic such that they provide structure for the conductive wire 1702 and protective spring 1704 to sit within while not interfering with communication of data signals.

A pressure switch is depicted at 1750. There, the protective spring 1706 having the piezo sensor piezo cable therein (connection of the piezo cable to the electronics 1704 not shown) is set for positioning between the inner 1708 and outer 1710 deformable structures. The pressure switch depiction at 1750 illustrates the protective spring 1706 being connected to a first wire 1752 that connects to the electronics of the connection structure. A contact plate 1754 is positioned within the outer deformable structure 1710, with the contact plate 1754 being connected to a second wire 1756 that connects to the electronics of the connection structure. In operation, when an anchor structure is within the end portion of the connection structure, the anchor structure can impart a force on the inner deformable structure 1708. That force pushes the protective spring 1706 such that it makes contact with the contact plate 1754. This completes a circuit through wire 1752, protective spring 1706, contact plate 1754, and wire 1756 to the electronics, providing a signal indicating pressure being applied at the pressure switch. In another embodiment the positions of the contact plate and protective spring relative to the anchor structure may be reversed such that as the anchor structure imparts a force on the inner deformable structure, and the contact plate makes contact with the protective spring. In examples, the shape of the deformable structures may be augmented to provide desired characteristics of sensor output signals. For example, a fulcrum structure 1758 can be implemented on the inner deformable structure 1718 such that an output of the piezo sensor 1700 and/or pressure sensor 1750 provides a recognizable signature under certain operational scenarios.

Figure 18:
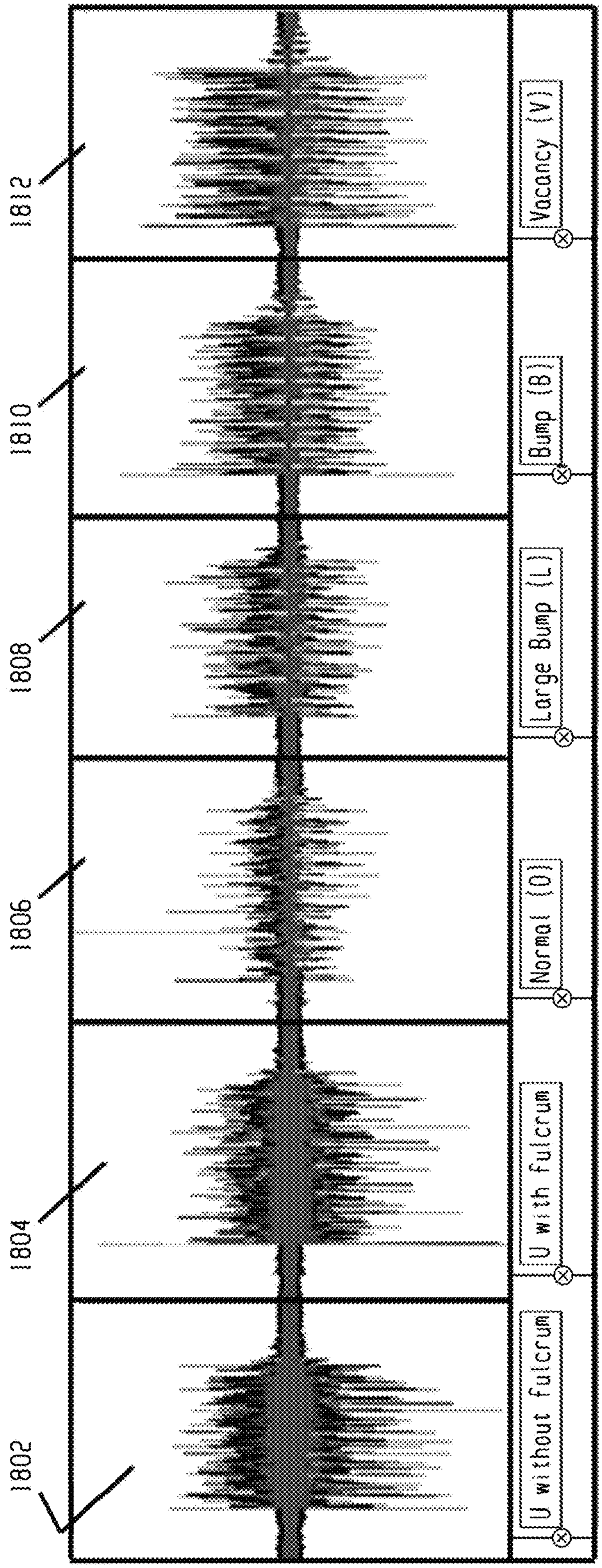
FIG. 18 is a diagram depicting example piezo sensor outputs when a connection structure is provided in different operating conditions.

As noted above, signals from the various sensors that may be integrated with the connection structure can be used to identify connection of the connection structure to an anchor structure. In addition to a Boolean connected/not connected detection, a connection structure or external processor analyzing signals therefrom may detect more refined indications of connection status and events. For examples, signatures of different known connection statuses (e.g., not connected, a stationary (sitting, standing, kneeling) connected user, a moving connected user, a connection structure not connected to a user) can be compared to current output from one or more sensors to provide an indication of a type of current connection. FIG. 18 is a diagram depicting example piezo sensor outputs when a connection structure is provided in different operating conditions. Training of an analyzing processor (e.g., an external processor, a processor embedded in the connection structure electronics), such as via machine learning, can enable detection of operational states of the connection structure. For example, repeated training of a system using tagged data indicative of a fall condition can enable a processor to detect a fall condition during live use. Similarly, a fall arrest, connected stationary user, a connected moving user, and anomaly conditions can be trained and detected.

In the example of FIG. 18, a first signature 1802 from a piezo sensor without a fulcrum indicating a fall condition is depicted. A second signature 1804 is from a piezo sensor having a fulcrum (see FIG. 17 at 1758) indicating a fall condition is depicted (e.g., a force greater than 1000 pounds). A third signature 1806 indicates a connected, stationary user. A fourth signature 1808 indicates a connected user experiencing a large bump condition (e.g., a force between 500 pounds and 1000 pounds). A fifth signature 1810 indicates a connected user experiencing a small bump condition (e.g., a force between 100 pounds and 500 pounds). A sixth signature 1812 indicates a disconnection condition, where a user disconnects an anchor structure from the connection structure.

Figure 19:
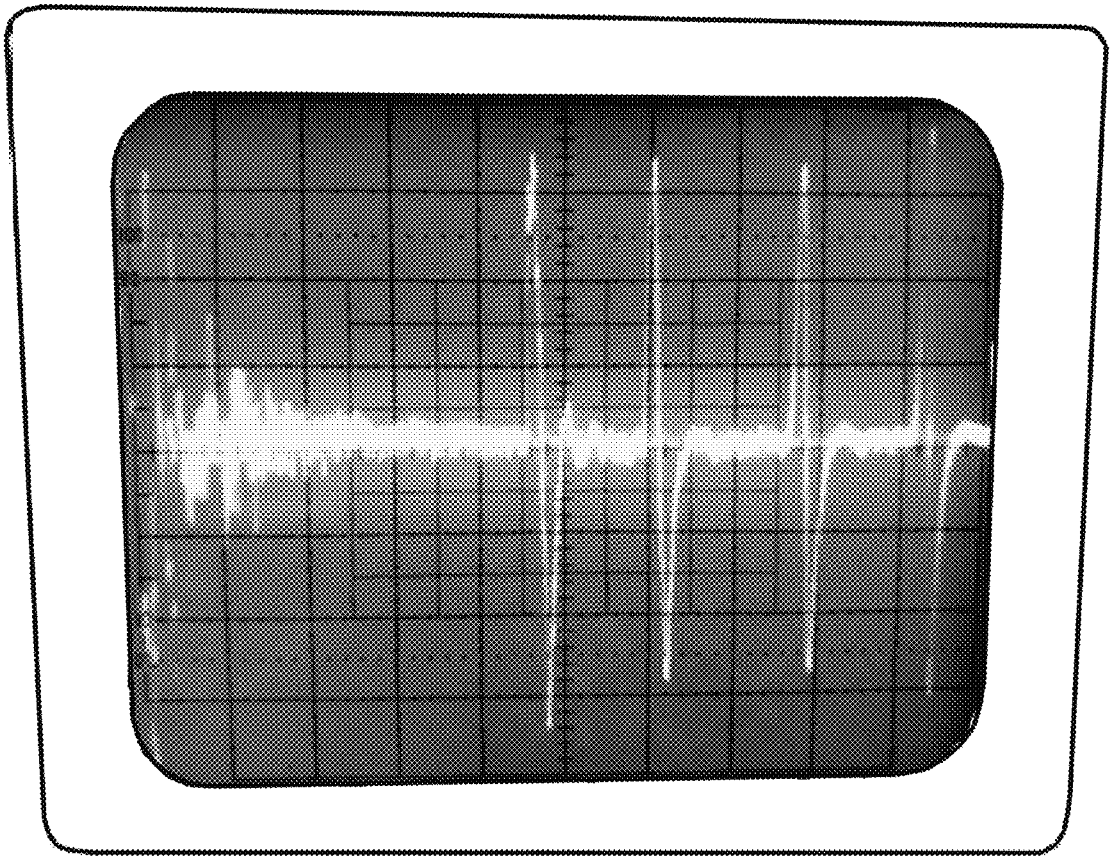
FIG. 19 is a graph depicting a signature associated with a connected user moving relative to a horizontal support line anchor structure.

FIG. 19 is a graph depicting a signature associated with a connected user moving relative to a horizontal support line anchor structure. At a left edge of the graph, an initial pulse 1901(*a*) is illustrated generated by initial contact of the anchor structure with the protective spring. Following are four pulses 1901(*b*)-1901(*e*) that are generated as the anchor structure drags across the pitch of the spring as the connection structure hook moves along the horizontal wire. In embodiments, the connected, moving user signature can be validated via use of data from another sensor, such as another accelerometer that indicates motion of the connection structure or a gate switch that indicates that a connection of the connection structure to the anchor structure may have been made such that the detected signature of FIG. 19 is valid.

Figure 20:
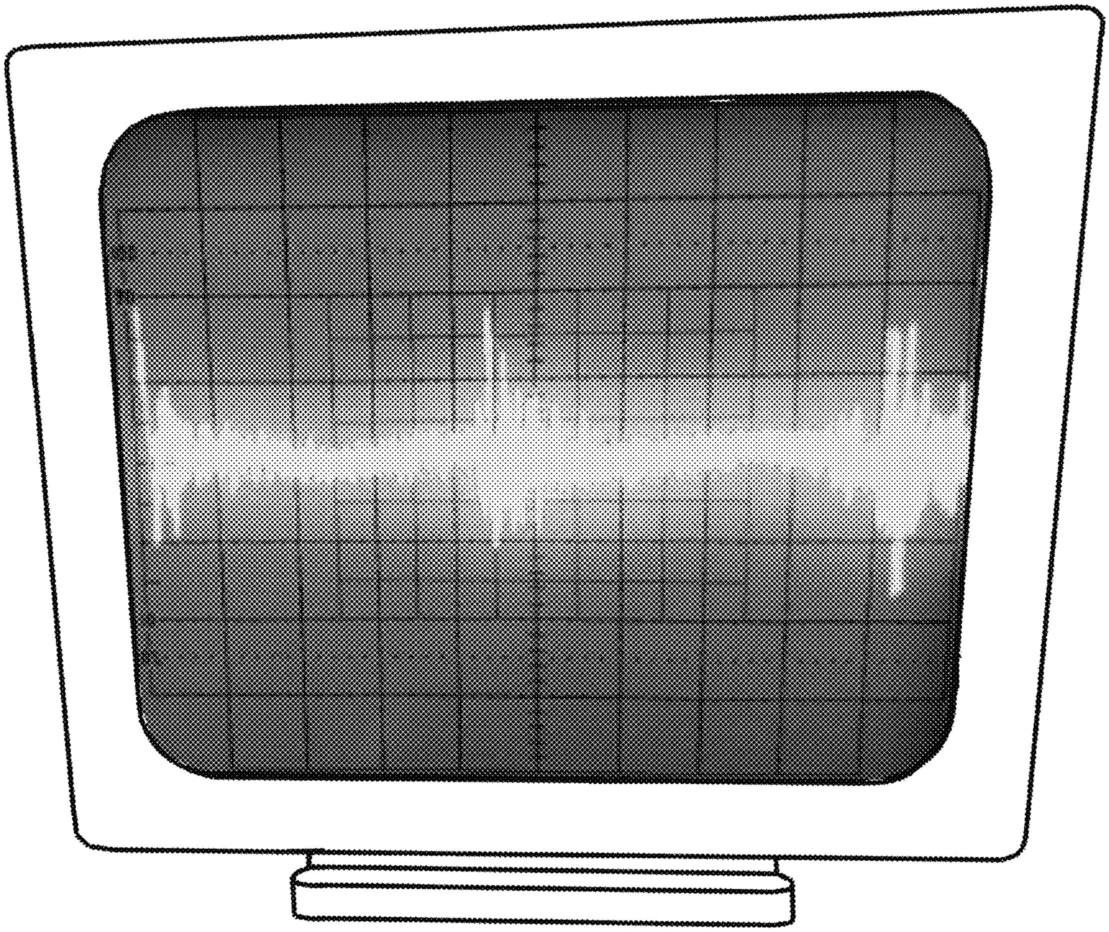
FIG. 20 is a diagram depicting an example piezo sensor output indicative of a connected user.

In addition to recognition of particular waveforms as indicating connectivity status, the continued presence of an output signal from a piezo sensor can be utilized. FIG. 20 is a diagram depicting an example piezo sensor output waveform 2001 indicative of a connected user. In one example, continued connection of a user is detected using a leaky bucket algorithm. In that algorithm, the exact shape of the waveform is less important than the presence (or lack) of a varying signal from the piezo sensor over time. In the leaky bucket algorithm, the signal is integrated over a period of time (e.g., the period of time depicted in FIG. 20). That integrated value is compared to a threshold, wherein a value over that threshold may be deemed indicative of a level of motion attributable to a connected user. As time passes, a portion of the waveform moves out of the integration window, such that it is no longer considered in the comparison to the threshold. Thus, once a level of motion over a period drops below a certain level on average, the threshold is not met and the system may generate an alert or other indication that a user may no longer be connected to the anchor structure.

Figure 21:
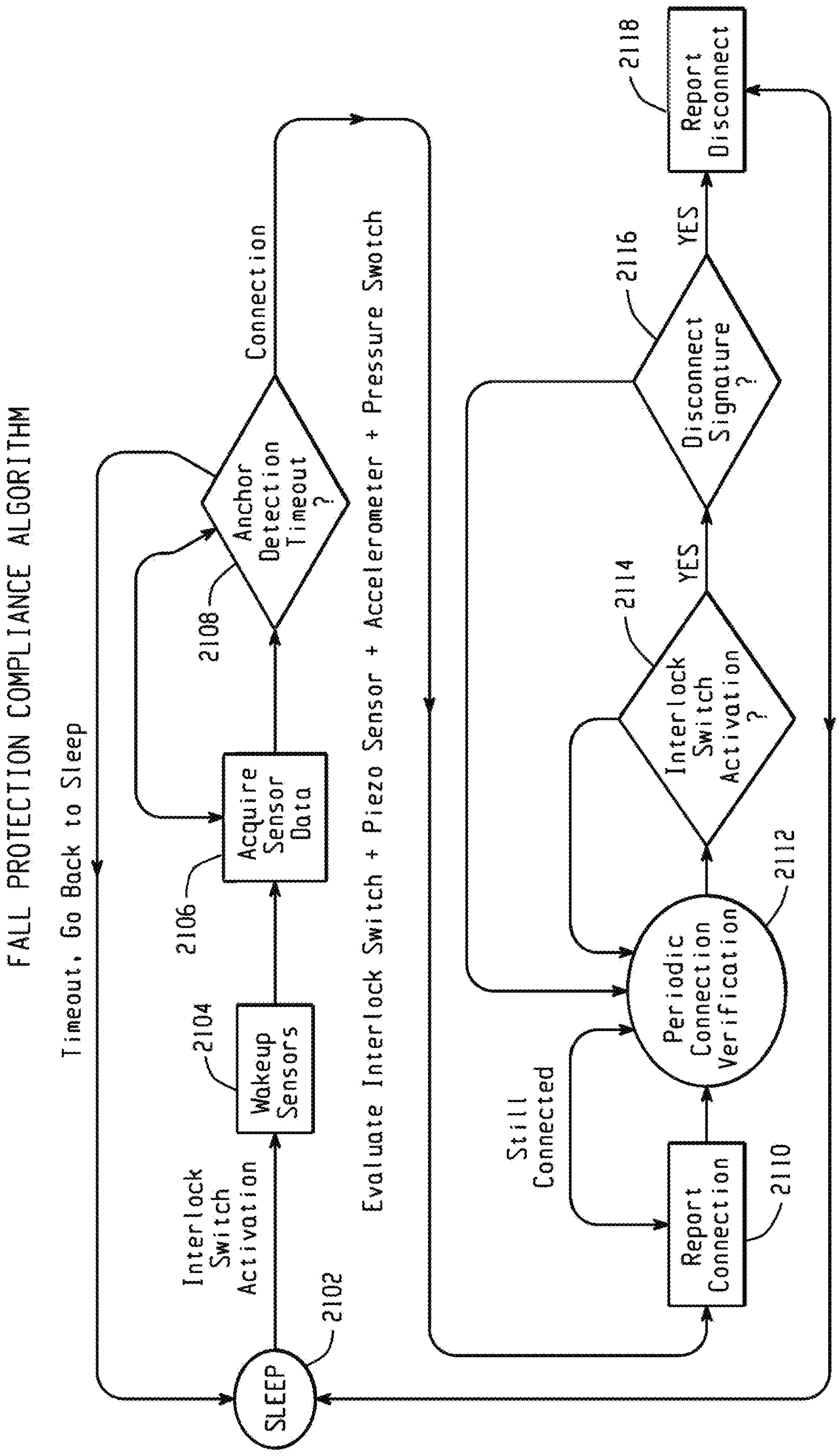
FIG. 21 is a flow diagram depicting an example method of providing fall protection compliance monitoring.

A process for providing fall protection compliance monitoring may take a variety of forms. FIG. 21 is a flow diagram depicting an example method of providing fall protection compliance monitoring. A system begins at 2102 in a sleep state. When a signal is received from the interlock switch, indicating movement of the movable gate of the connection structure, circuitry including other sensors is transitioned to a wake state at 2104. Those sensors are used to acquire data at 2106. Data from those sensors is monitored for a period of time via a loop from 2108 to 2106 until a connection is detected (e.g., based on signals from an accelerometer, piezo sensor, or pressure sensor indicating interaction with an anchor structure) where the system progresses to 2110 or until a timeout period occurs where the system then returns to the sleep state at 2102. When a connection is detected, that connection may be recorded in memory (e.g., with a date/time stamp) and/or reported externally, such as via a wireless data transmission. At 2112, continued connection verification is performed, such as via monitoring of connected sensors (e.g., sensors other than the gate switch). A Boolean connected signal or more detailed connection type characterization may be recorded in memory with a date/time stamp and may be transmitted wirelessly via the loop at 2110, 2112. At 2114, a subsequent activation of the gate interlock switch may be detected. This could be an indication that the connection structure is being disconnected from an anchor structure. At 2116, data (e.g., data from other sensors of the connection structure) is monitored to see if that data is indicative of connection termination (e.g., no or minimal acceleration data, no pressure sensor data, no or minimal piezo sensor data). If the sensors indicate a disconnect, then data regarding that disconnect (e.g., a date/time stamp) is recorded in memory and/or reported externally, such as via a wireless data transmission, while the device returns to a sleep state at 2102. If further sensor data indicates that a connection remains, then the interlock switch activation may be recorded and/or reported, with the process returning to 2112 for further monitoring.

Figure 22:
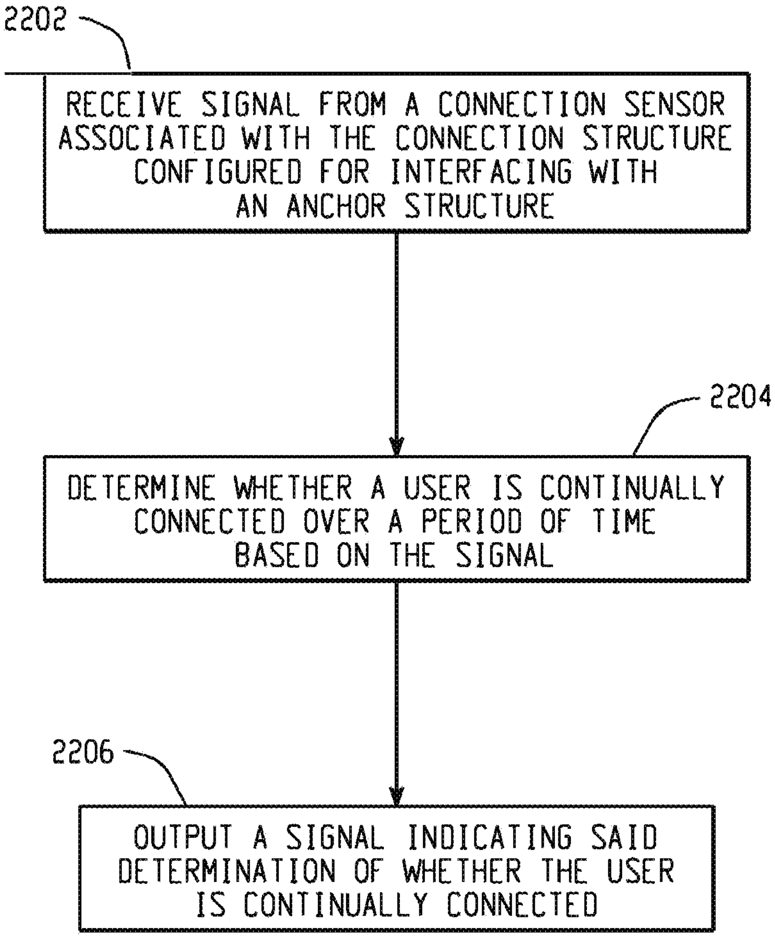
FIG. 22 is a flow diagram depicting another example method for providing fall protection compliance monitoring.

FIG. 22 is a flow diagram depicting another example method for providing fall protection compliance monitoring. At 2202, a signal from a connection sensor associated with a connection structure configured for interfacing with an anchor structure is received, where the connection sensor comprises an accelerometer or a pressure switch. At 2204, a determination is made as to whether a user is continually connected over a period of time based on the signal, and at 2206 a signal is output indicating said determination of whether the user is continually connected.

Figure 23A:
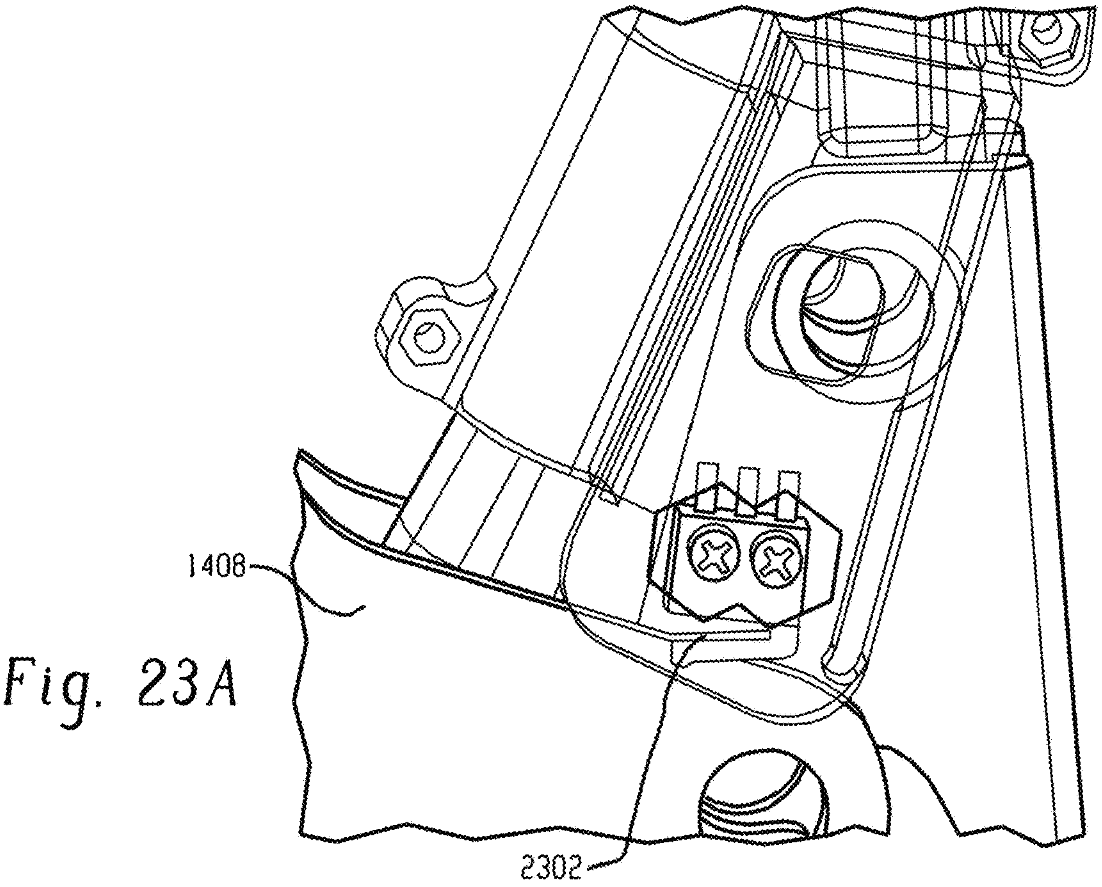
FIGS. 23A-H depict examples of gate structure monitoring sensors.
Figure 23B:
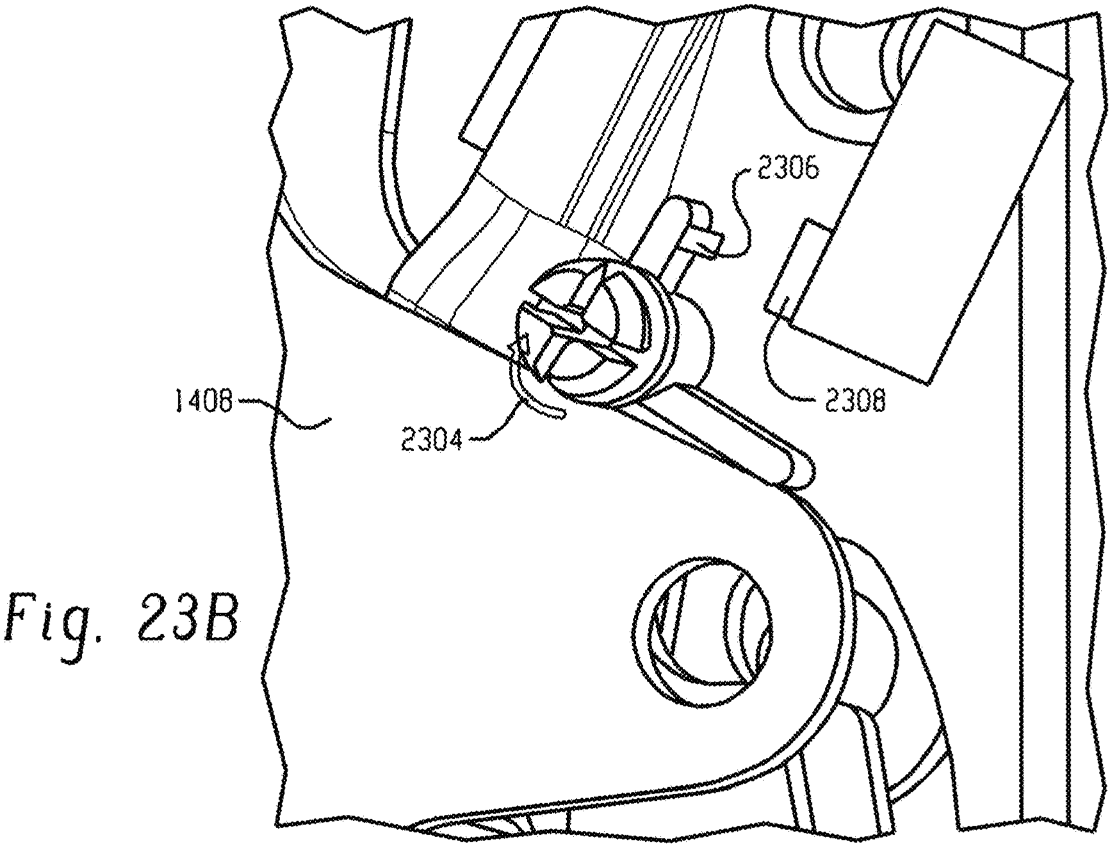

Alternate examples of components and concepts herein are also within the scope of this disclosure. For example, mechanisms for monitoring the status of a gate structure of a hook may take a variety of forms. FIGS. 23A-H depict examples of gate structure monitoring sensors that provide signals indicating the status of the gate structure. FIG. 23A depicts a limit switch sensor. In FIG. 23A, a limit switch 2302 assumes one position when the movable gate 1408 is in a closed position and a second position when the gate 1408 is moved to an open position. For example, rotation of the movable gate 1408 may compress the limit switch 2302 when the gate 1408 is in the open position, while the limit switch 2302 returns to an uncompressed position when the gate 1408 is again closed. FIG. 23B depicts a pivot arm and a reed switch arrangement. There a torsion spring 2304 is positioned next to the movable gate 1408 such that it is rotated in the clockwise direction when the gate 1408 is moved to the open position. When rotated in that clockwise direction a magnet 2306 positioned on the torsion spring is moved closer to a reed switch 2308, which detects the presence of the magnet 2306. The reed switch 2308 may provide a binary signal indicating the gate 1408 is open or closed, or in another embodiments, another type of sensor, such as a hall effect sensor, may provide a more detailed data value that can be used to infer an amount of opening (e.g., 10%, 50%, 100%) of the movable gate 1408.

Figure 23C:
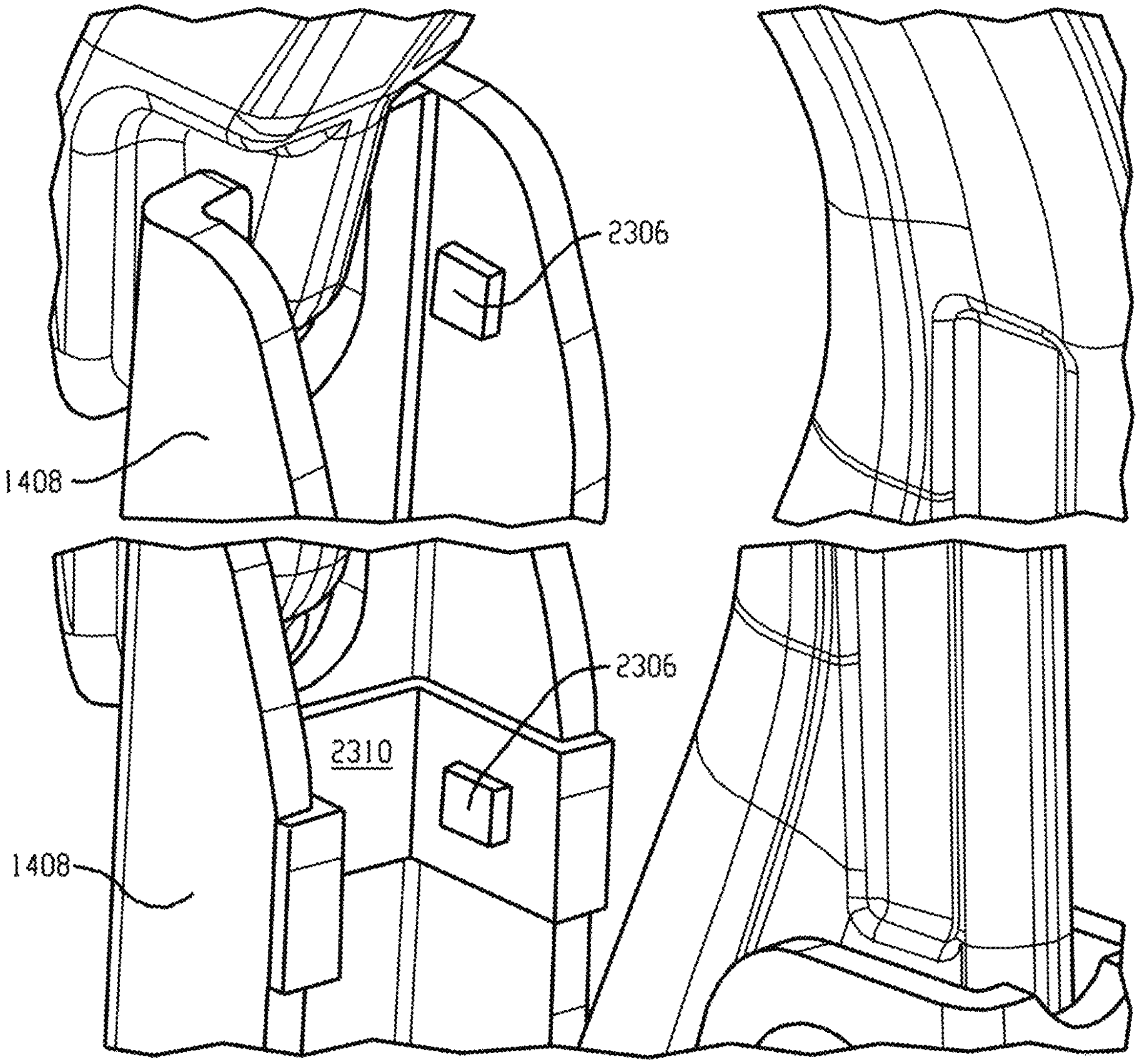
Figure 23D:
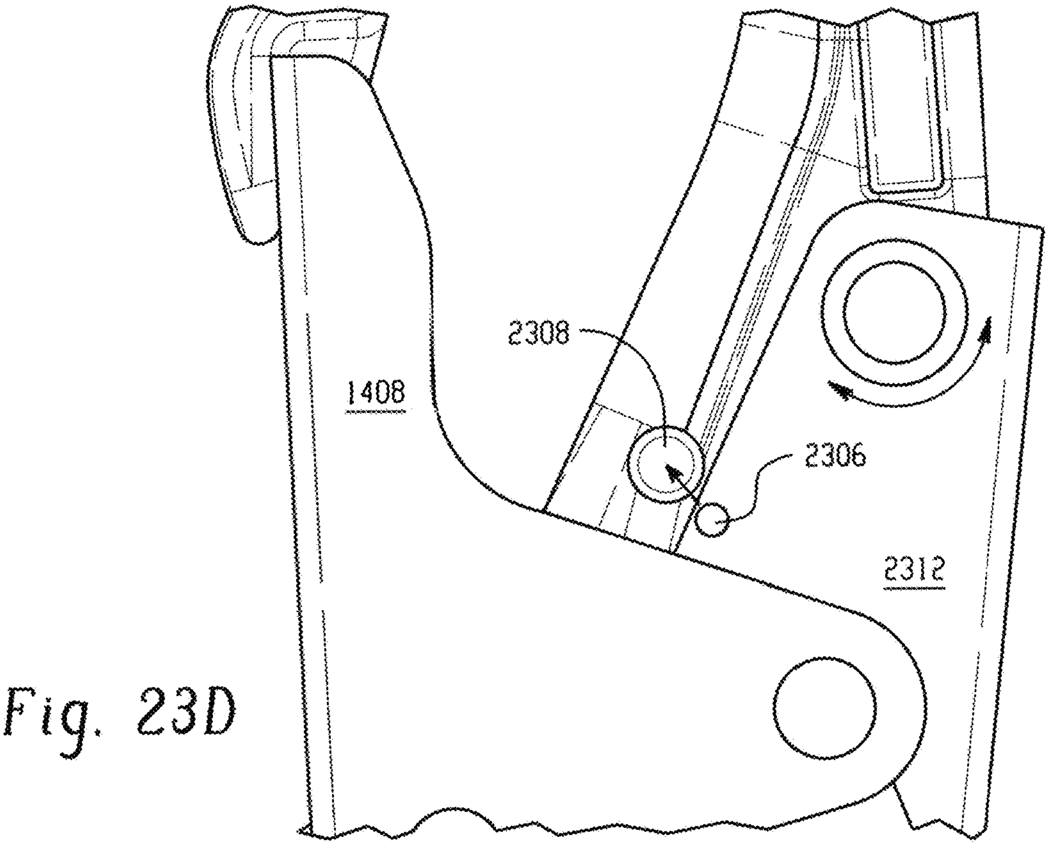

FIG. 23C depicts an alternate positioning of a magnet for interaction with a reed switch sensor. In this example, the magnet 2306 is affixed directly to the movable gate 1408, such as via adhesive, in the top diagram, and as a component of a bracket 2310 in the bottom diagram. When the movable gate 1408 is moved from its closed position, a reed switch (not shown) on the body of the hook detects the nearer-presence of the magnet 2306 and records and/or transmits a signal in response. FIG. 23D illustrates a further positioning of a magnet 2306 on a portion 2312 of hook that is rotated clockwise (e.g., a gate lock), and closer to a reed switch 2308 when the movable gate 1408 is moved from a closed to an open position.

Figure 23E:
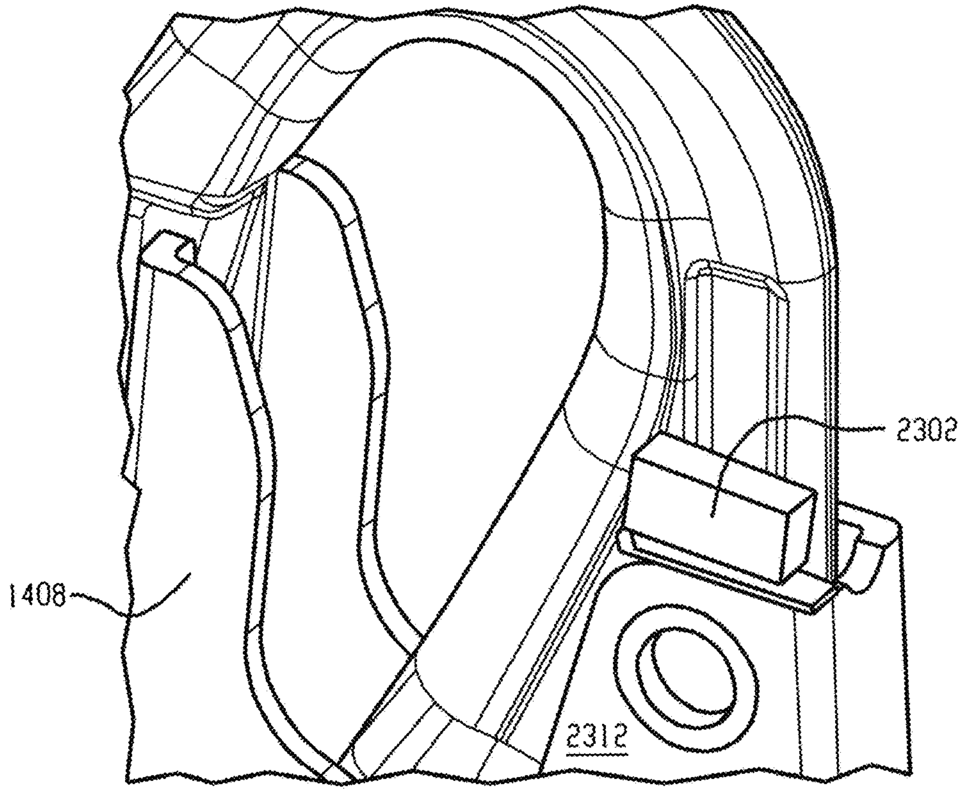

FIG. 23E provides a further example position of a limit switch. In FIG. 23E, the limit switch 2302 is positioned adjacent to the rotatable portion 2312 of the hook illustrated in FIG. 23D. Rotation of that portion 2312 of the hook structure compresses the limit switch 2302 generating a signal that indicates that the movable gate 1408 is currently open.

Figure 23F:
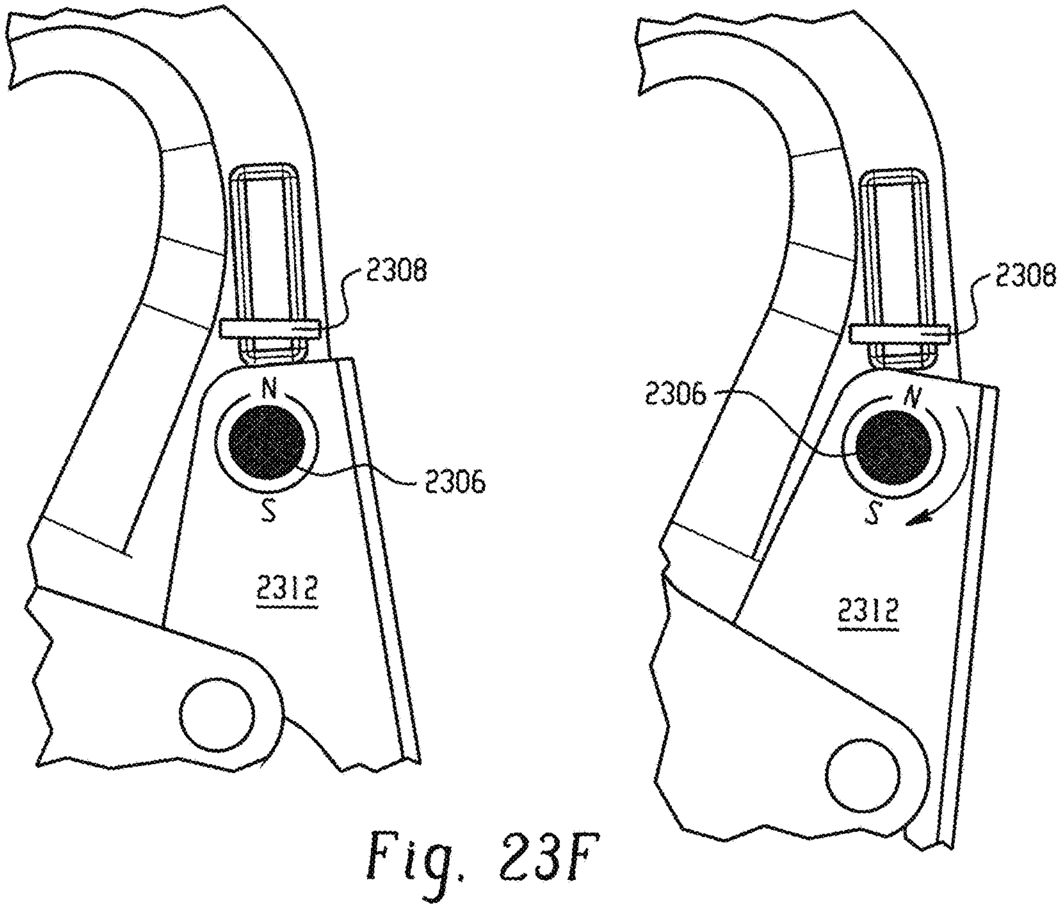

FIG. 23F illustrates a further reed switch embodiment, where the magnet 2306 is placed on the rotatable portion 2312 of the hook. A reed switch 2308 is positioned near the top of that portion 2312. When the movable gate is moved to the open position, the rotatable portion 2312 rotates clockwise, changing the pole direction of the magnet 2306 relative to the reed switch 2308. This changes the magnetic force detected by the reed switch 2308, where the reed switch generates a signal indicating a position of the gate based on that detected change in magnetic force.

Figure 23G:
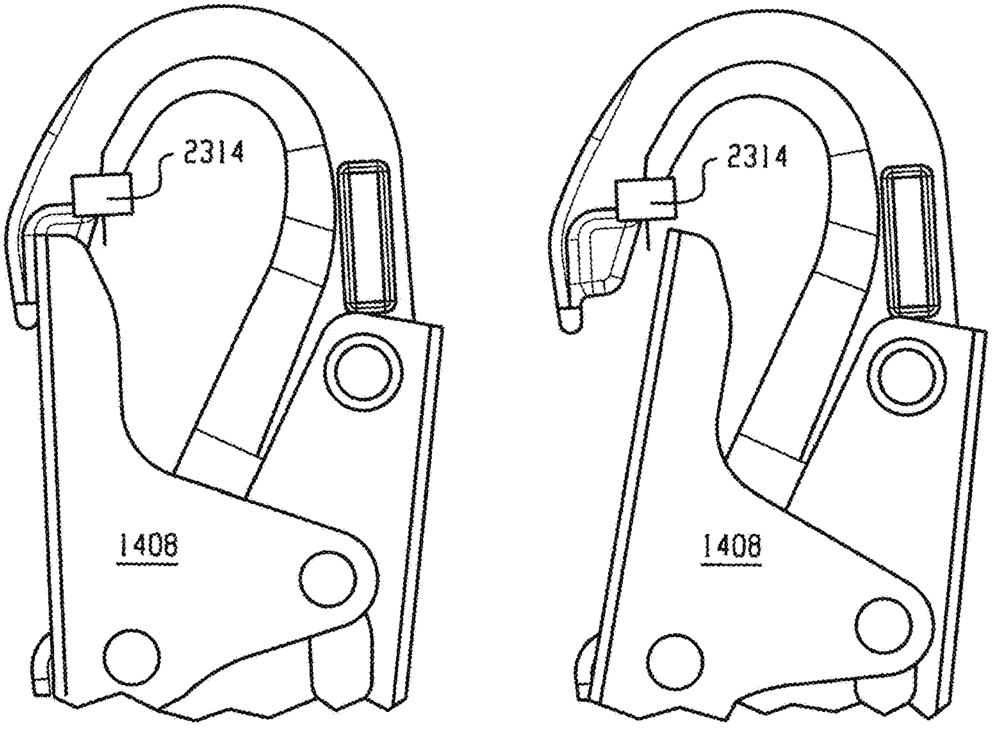

FIG. 23G depicts a mechanical double throw switch 2314 positioned near the tip of the hook structure. In this example, an arm of the switch 2314 is pushed in a first direction (right) when the movable gate 1408 transitions from the closed position to the open position. The arm of the switch 2314 is pushed in a second direction (left) when the movable gate

1408 is transitioned back to the closed position. Signals indicating a current position of the movable gate 1408 are generated based on the arm of the switch 2314 being transitioned to either the right or left state by the movable arm 1408.

Figure 23H:
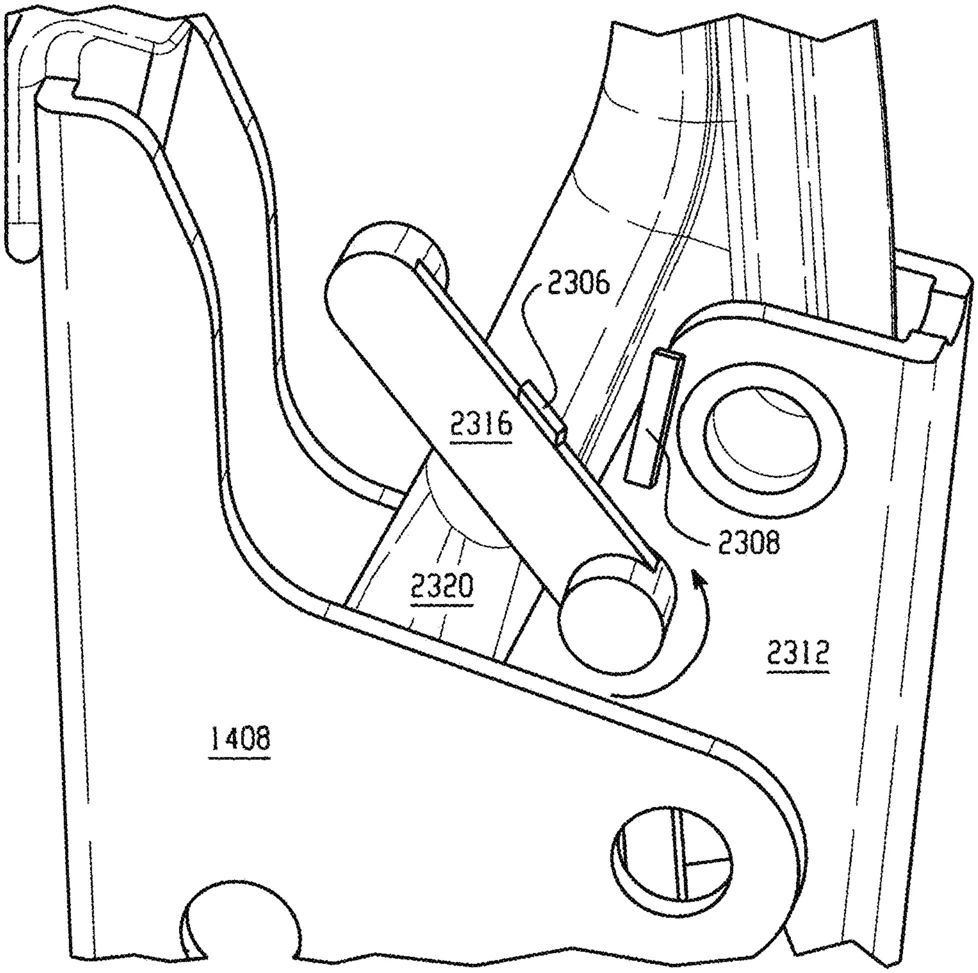

FIG. 23H depicts a further reed switch embodiment, where a magnet 2306 is positioned on a torsion arm 2316 that is attached to a body 2320 of the hook. When the rotatable portion 2312 of the hook rotates counter-clockwise on opening of the hook, the reed switch 2308 moves relative to the magnet 2306, generating a signal indicative of the gate opening.

In another embodiment, the torsion arm 2316 may be connected to the rotatable portion 2312 of the hook that rotates clockwise when the movable gate 1408 is moved to the open position. That gate opening motion brings the magnet 2306 near to the reed switch 2308, which generates a signal indicating the current position of the movable gate 1408. In an embodiment, the torsion arm is biased by a spring, such that physical interaction of the magnet 2306 with the reed switch 2308 compresses the spring, generating a counterclockwise force, pushing the structure to close the movable gate 1408.

In some embodiments, it may be beneficial to have a housing within the connection structure that is able to rotate with the connector. For example, such an arrangement may keep close proximity between an identification element positioned within the housing and a connection sensor assembly of a connector. That close proximity can increase the reliability of reads of the identification element by the connection sensor assembly when a connector is properly connected to a connection structure having a housing therein.

Figure 24:
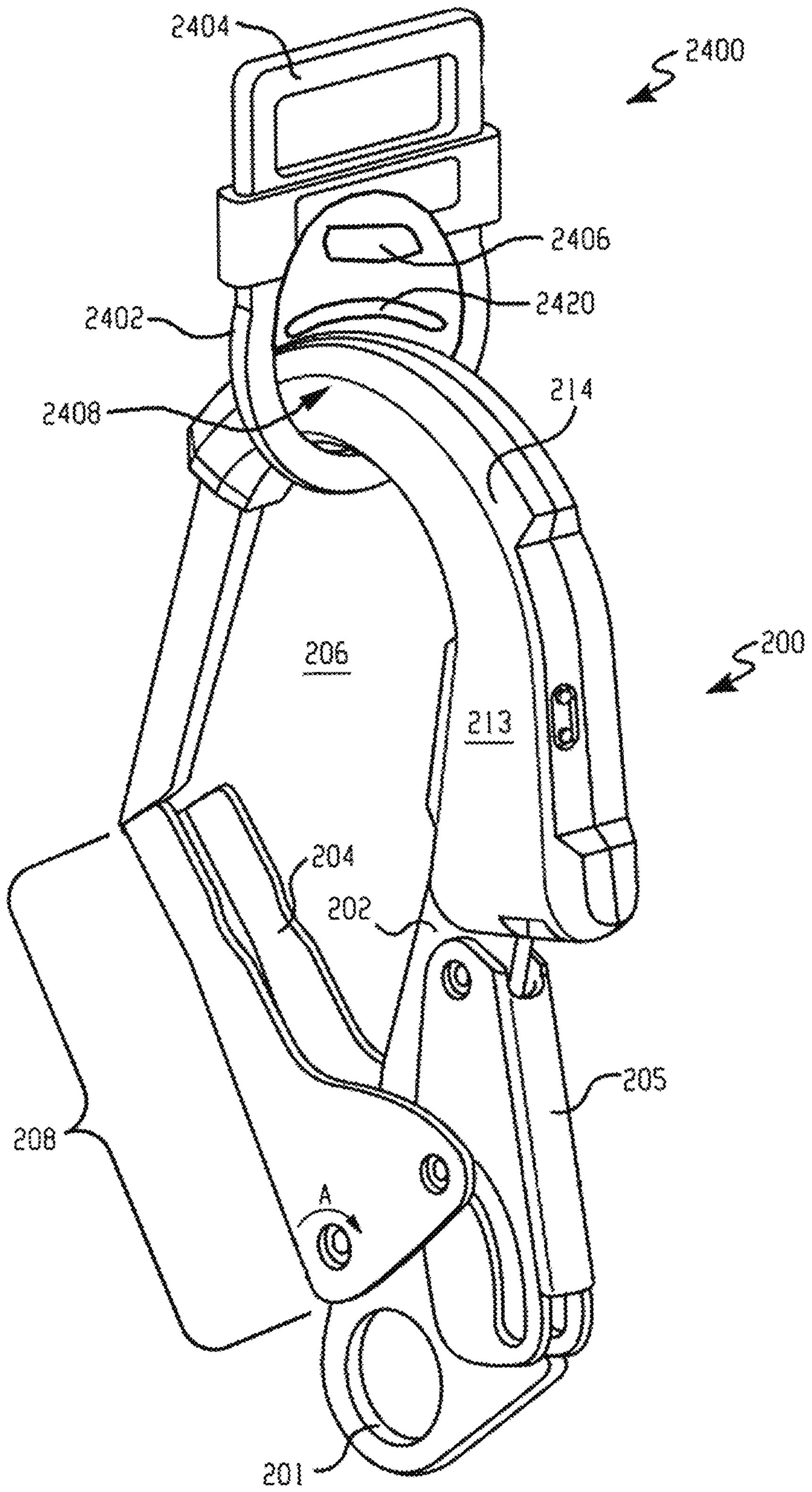
FIG. 24 is a perspective view of one of the connectors shown in FIG. 2 connected to a connection structure shown in FIG. 25

FIG. 24 depicts an example connection structure 2400 having a connection loop 2402 that is configured for being received within the connection area 206 of the connector 200 when the movable gate 204 is in the open position. The connection structure 2400 further has an anchor point 2404 configured as a separate loop for connecting to an anchor or a harness. The connection structure 2400 has a housing 2406, which may be fixed within the connection loop 2402 such that there is an aperture 2408 formed by the connection loop 2402 and the housing 2406 (shown in further detail in FIG. 25) configured to receive the connector 200 as described above. In embodiments, the housing 2406 is configured to hold an identification element 2420 such that the identification element is held close to a connection sensor assembly 214 when a connector is properly connected, allowing the connection sensor assembly to reliably sense the identification element (e.g., an RFID reader in the connection sensor assembly reading an identification element 2420 in the form of an RFID tag). A close up view of an example connection structure 2400 is shown in FIG. 25, where the connection structure 2400 is implemented as a D-ring connector to an anchor or a harness.

With further reference to FIG. 24, a connector 200 may be configured to detect whether a connection is made with the connection structure 2400, such as by detecting a presence of an identification element (e.g., a passive RFID tag) positioned within a housing 2406 in the connection structure 2400. The connection structure 2400 may interact with the connector 200 in a similar manner as connection structure 300 and the elements of connection structure 2400 may operate in a similar manner as the elements of connection structure 300. Specifically, in one example, the aperture 2408 formed by the connection structure 2400/housing 2406 are configured to receive a connector 200 therein when the connector 200 is connected to the connection structure 2400. When the connector 200 is within the aperture 2408, the connection sensor assembly 214 is positioned in close proximity to the identification element 2420 (e.g., a passive RFID tag), permitting reliable reading of the identification element 2420 by the connection sensor assembly 214. A successful reading of the identification element 2420 by the connection sensor assembly 214 can be used as an indication that the connector 200 has been properly connected to the connection structure 2400 associated with the identification element 2420.

In embodiments, the housing 2406 is able to rotate within the connection loop 2402 as pushed by the connector 200 connected within the aperture 2408, maintaining close proximity between the identification element 2420 and the connection sensor assembly 214 for reading the identification element 2420 while allowing freedom of movement for the operator connected to the connection structure 2400.

Figure 25:
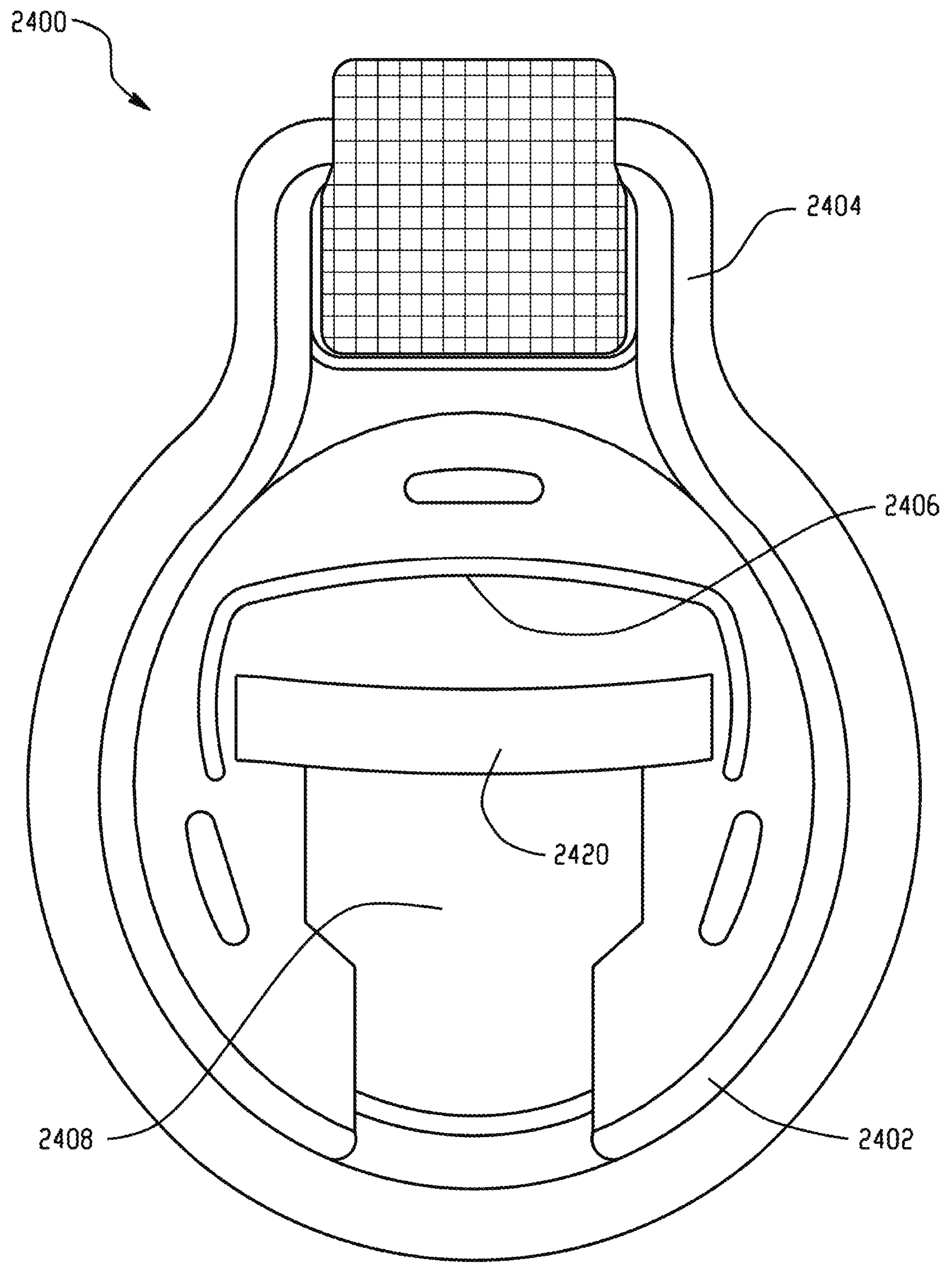
FIG. 25 is a diagram depicting a connection structure with a rotatable housing in accordance with some non-limiting embodiments or aspects of the present disclosure.
Figure 26:
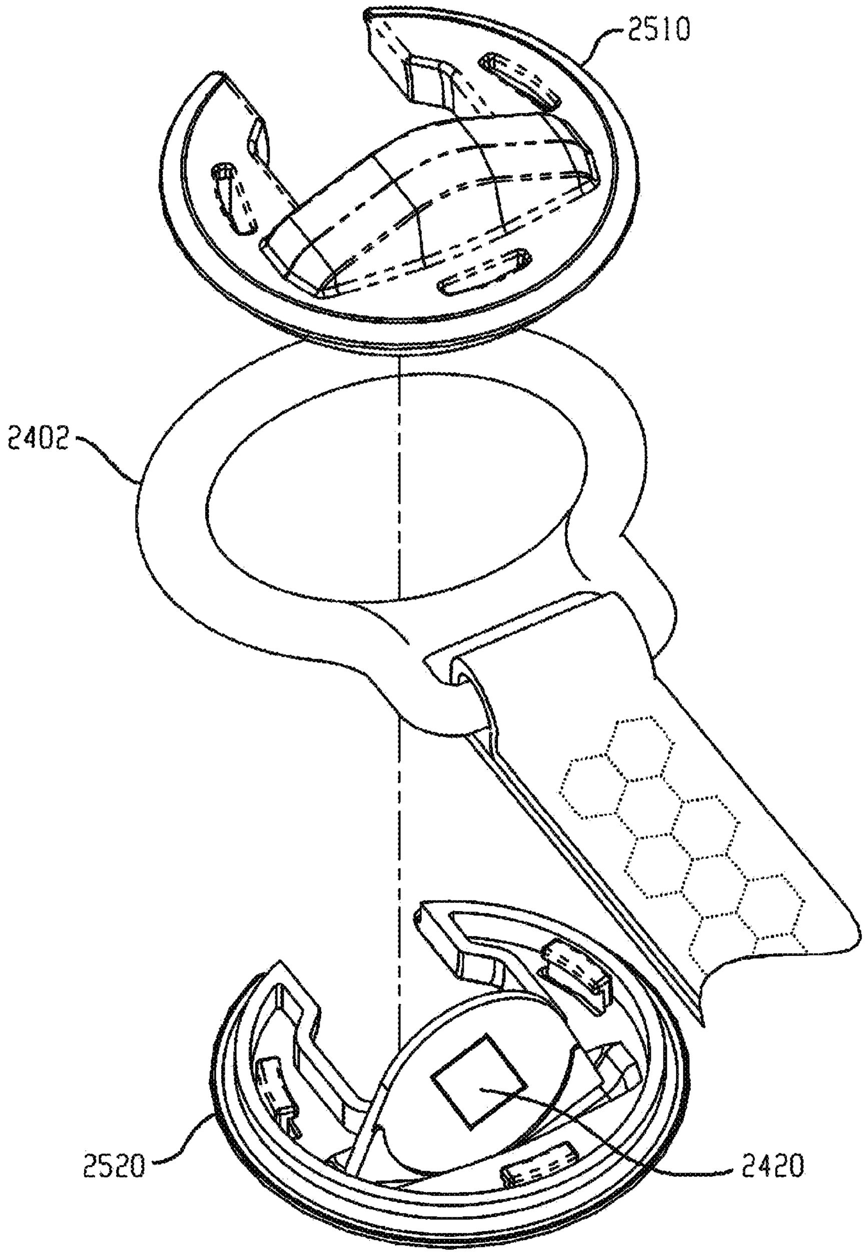
FIG. 26 is a diagram depicting the first and second component of the rotatable housing shown in FIG. 24.
Figure 27A:
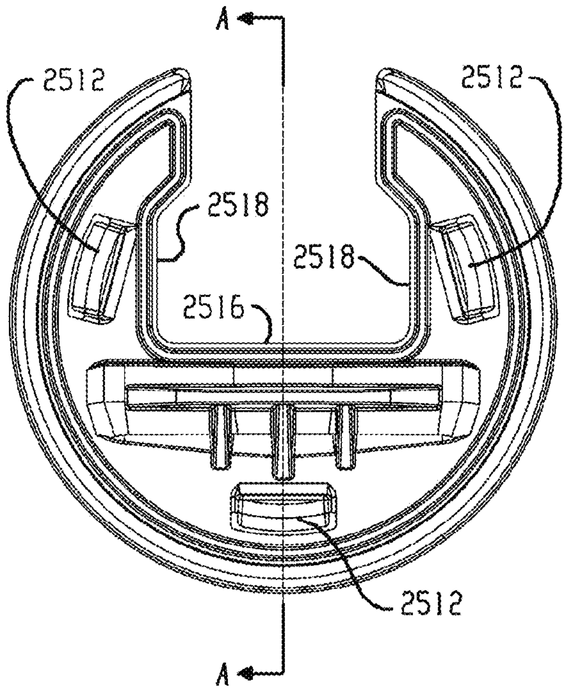
FIG. 27A is a front view of the first component of the rotatable showing.
Figure 27B:
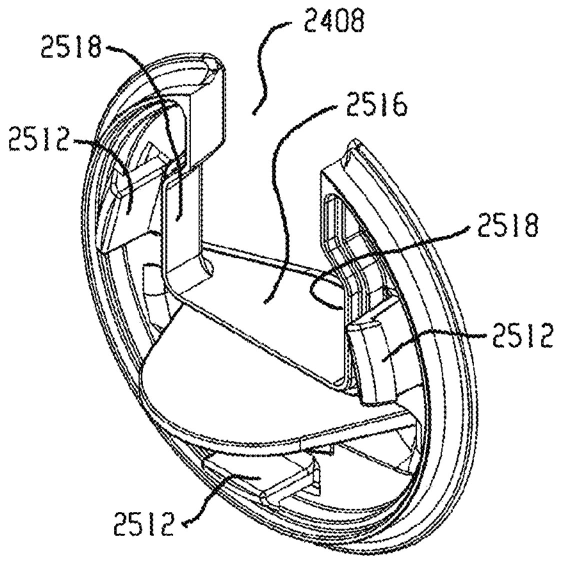
FIG. 27B is a bottom view of the first component of the rotatable showing.
Figure 27C:
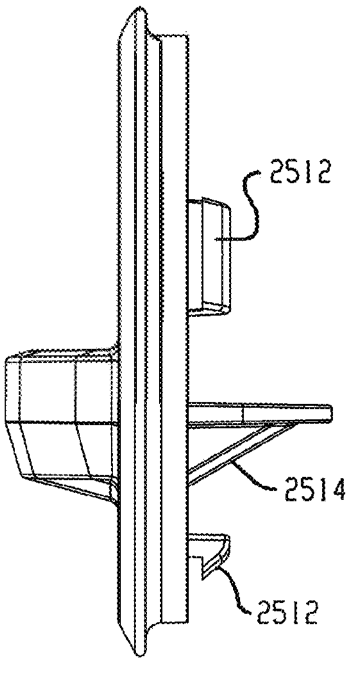
FIG. 27C is a side view of the first component of the rotatable showing; and, FIG. 27D is a perspective view of the first component of the rotatable showing.
Figure 27D:
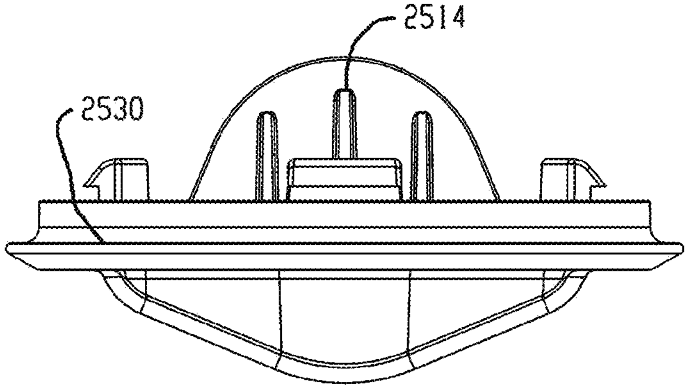
Figure 28A:
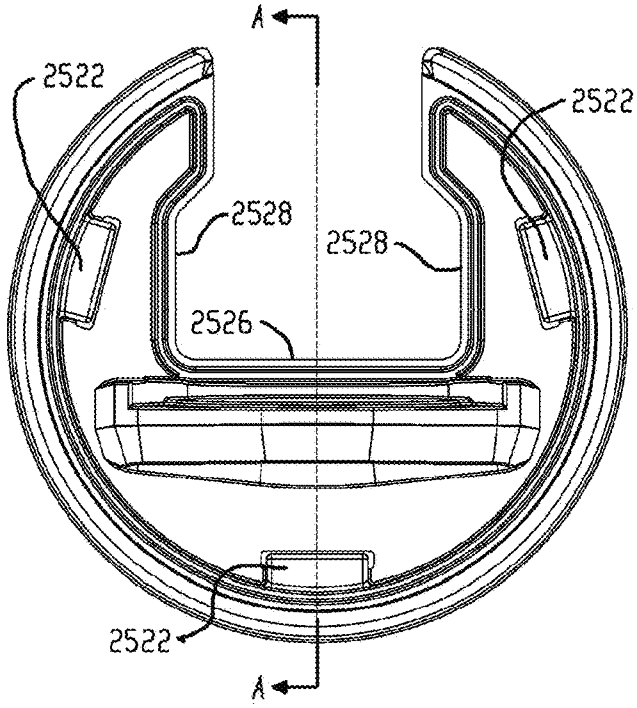
FIG. 28A is a front view of the second component of the rotatable showing.
Figure 28B:
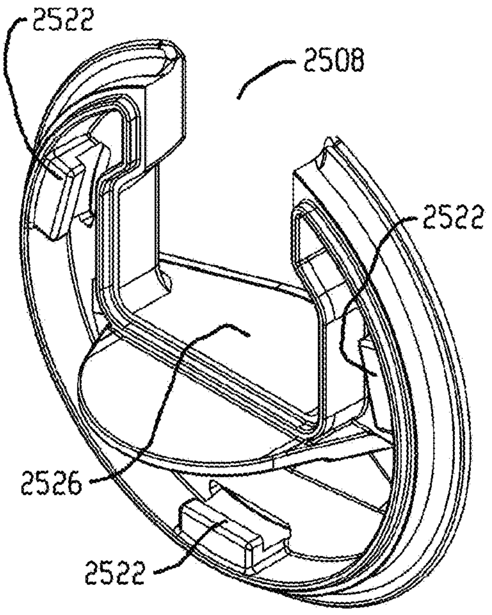
FIG. 28B is a bottom view of the second component of the rotatable showing.
Figure 28C:
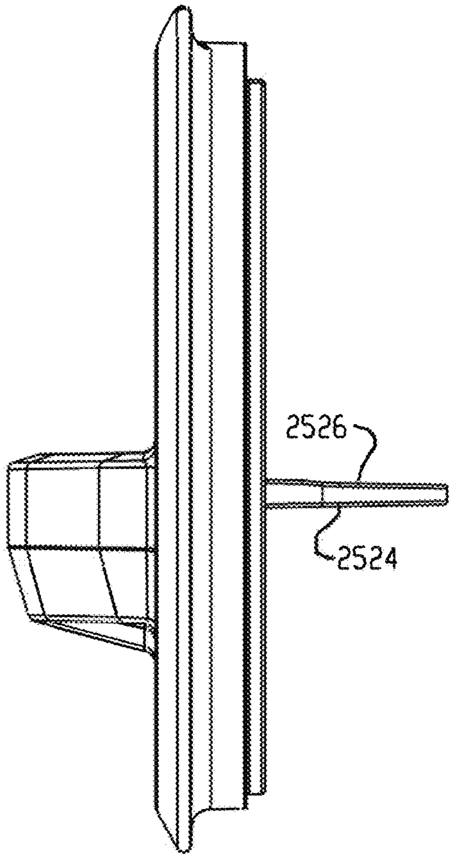
FIG. 28C is a side view of the second component of the rotatable showing.
Figure 28D:
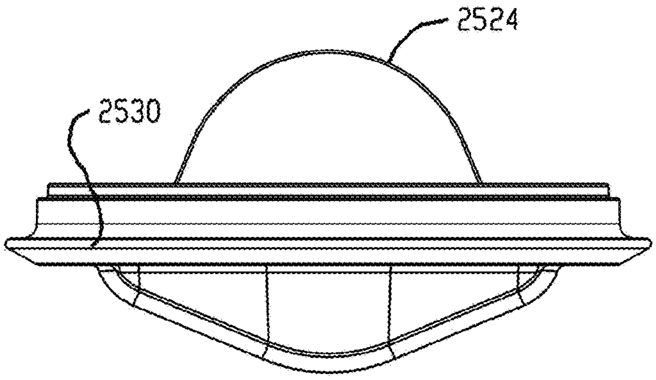
FIG. 28D is a perspective view of the second component of the rotatable showing.
Figure 29A:
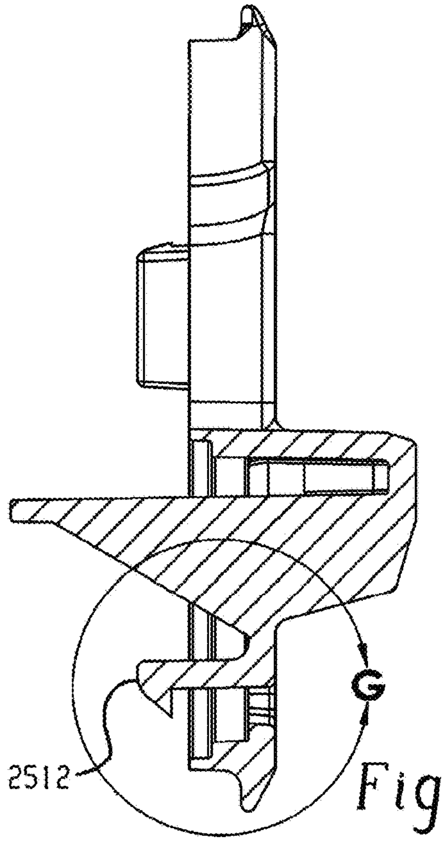
FIG. 29A is a first view of the snaps in the first component.
Figure 29B:
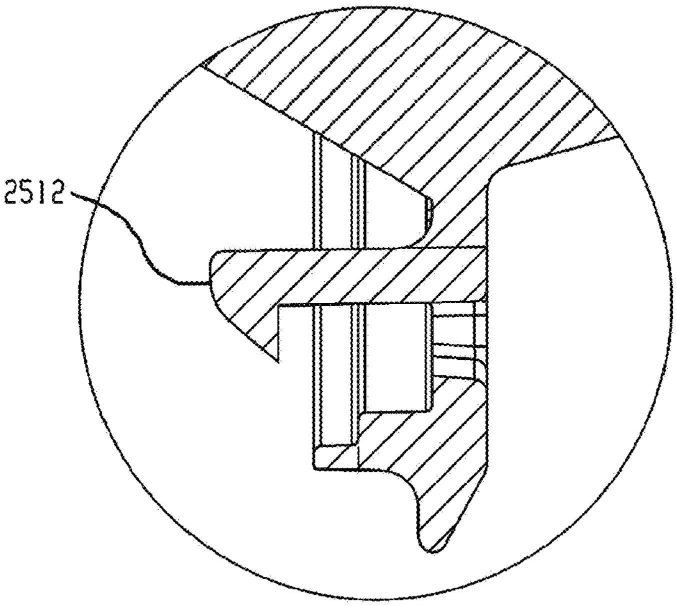
FIG. 29B is a second view showing the snaps in the first component.
Figure 29C:
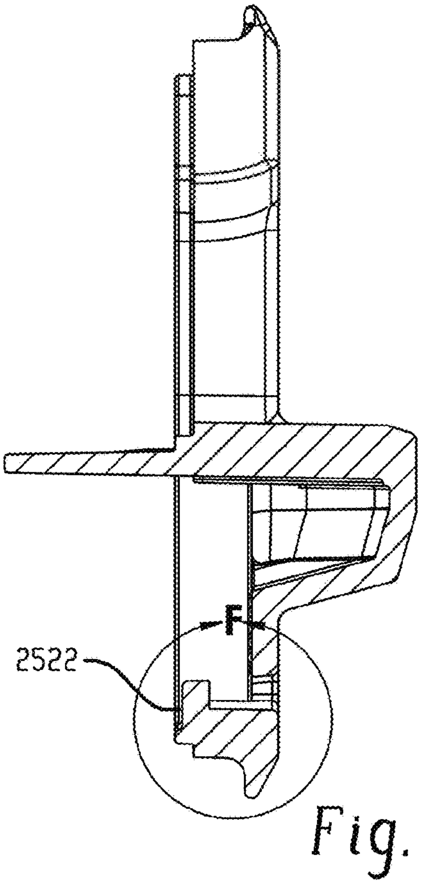
FIG. 29C is a first view of the hooks in the second component.
Figure 29D:
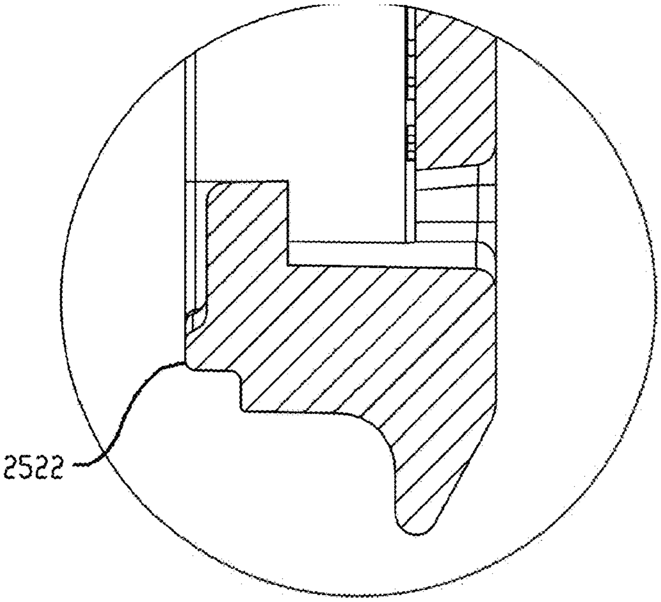
FIG. 29D is a second view showing the hooks in the second component.

A housing, as depicted in FIGS. 24 and 25 may take a variety of forms. For example, FIG. 26 depicts a housing 2406 that includes a first component 2510 and a second component 2520. In the example of FIG. 26, the first component 2510 and second component 2520 are configured to be snapped together when connected though the connection loop 2402 such that the two snapped-together components 2510, 2520 grip the connection loop 2402 there between via a groove formed by the connected components 2510, 2520. In embodiments, the first component 2510 and the second component 2520 collectively form a compartment that, when connected, is configured to house an identification element 2420 (e.g., on a flat surface formed on one of the components 2510, 2520 or collectively; in a compartment formed in one of components 2510, 2520 or collectively by those components).

FIGS. 27A-D depict detailed illustrations of the front, bottom, side, and perspective views of an example first component 2510. The first component 2510 may include a snap mechanism. More specifically, the first component 2510 may include a plurality of snaps 2512 that are configured to be received into corresponding hooks in the second component 2520 (shown below). The first component 2510 may also include a first internal surface 2514. In some embodiments, the first internal surface 2514 may act as a barrier to help hold the identification element on the surface of a second internal surface 2524 of the second component (shown below), such that it does not peel off. In other embodiments, the first internal surface 2514 may hold an identification element 2420. In embodiments, the identification element 2420 may be fixed to that surface 2514 using tape, glue, or other mechanism. A bottom surface 2516 opposite the internal surface 2514 may partially define the aperture 2408 into which a connector 200 and its corresponding connection sensor assembly 214 may be inserted, along with side walls 2518. The first component may have an edge surface 2530 that, along with an edge surface of the second component, forms a groove that grips an interior portion of the connection loop 2402 to hold the housing 2406 in place.

FIGS. 28A-D depict detailed embodiments of the front, bottom, side, and perspective views of an example second component 2520. The second component 2520 may include a hook mechanism. The second component 2520 may include a plurality of hooks 2522 for mating with corresponding snaps 2512 of the first component 2510. The second component 2520 may also include a second internal surface 2524 to fix an identification element 2420 on top of in conjunction or in the alternative to the second internal surface 2524 of the second component 2520. In embodiments, the identification element 2420 may be fixed to that surface 2524 using tape, glue, or other mechanism. The second internal surface 2524 may be flat. The second internal surface 2524 may lay on top of the first internal surface 2514 when the first and second components 2510, 2520 are fixed together, vice versa, or next to one another. An exterior surface 2526 opposite the second internal surface 2524 and side walls 2528 may define the aperture 2408 in collaboration with the corresponding features of the first component 2510. The second components 2520 may have edge surface 2530' that, in conjunction with the edge surface 2530 of the first component 2510, forms the groove that interfaces with the connection loop 2402.

FIG. 29 depicts detailed embodiments of the snaps on the first component and the hooks on the second component. In that example, the first and second components are fixed together using a cantilever snap-fit joint mechanism. FIGS. 29A-B depict a detailed embodiment of the snaps 2512. FIGS. 29C-D depict a detailed embodiment of the hooks 2522. The hooks 2522 have a protrusion, which fit into an opening in the snaps 2512. In some non-limiting embodiments or aspects the first and second components 2510, 2520 may be made of plastic. The first and second components 2510, 2520 may be flexible. Further, in some non-limiting embodiments or aspects, the first and second components 2510, 2520 may be fixed together using a method other than snap-fit, such as an adhesive method, a mechanical method or a welding method.

With reference back to FIGS. 24-26, the identification element 2420 may be connected to or held within of the housing 2406 held within the connection structure 2400. In some embodiments, the identification element 2420 may be placed on the internal surface 2524 of the second component, such that the identification element 2420 is enclosed within the housing 2406 when the first and second component are fixed together. The internal surface 2514 of the first component may act as a barrier to help hold the identification element 2420 on the second internal 2524 such that it cannot peel off. In some non-limiting embodiments or aspects, the internal surface 2524 is located proximate to the aperture 2408. The aperture may be shaped to correspond with the connection area 206. Furthermore, in some non-limiting embodiments or aspects, the aperture may be shaped to closely fit the connector 200.

Figure 30:
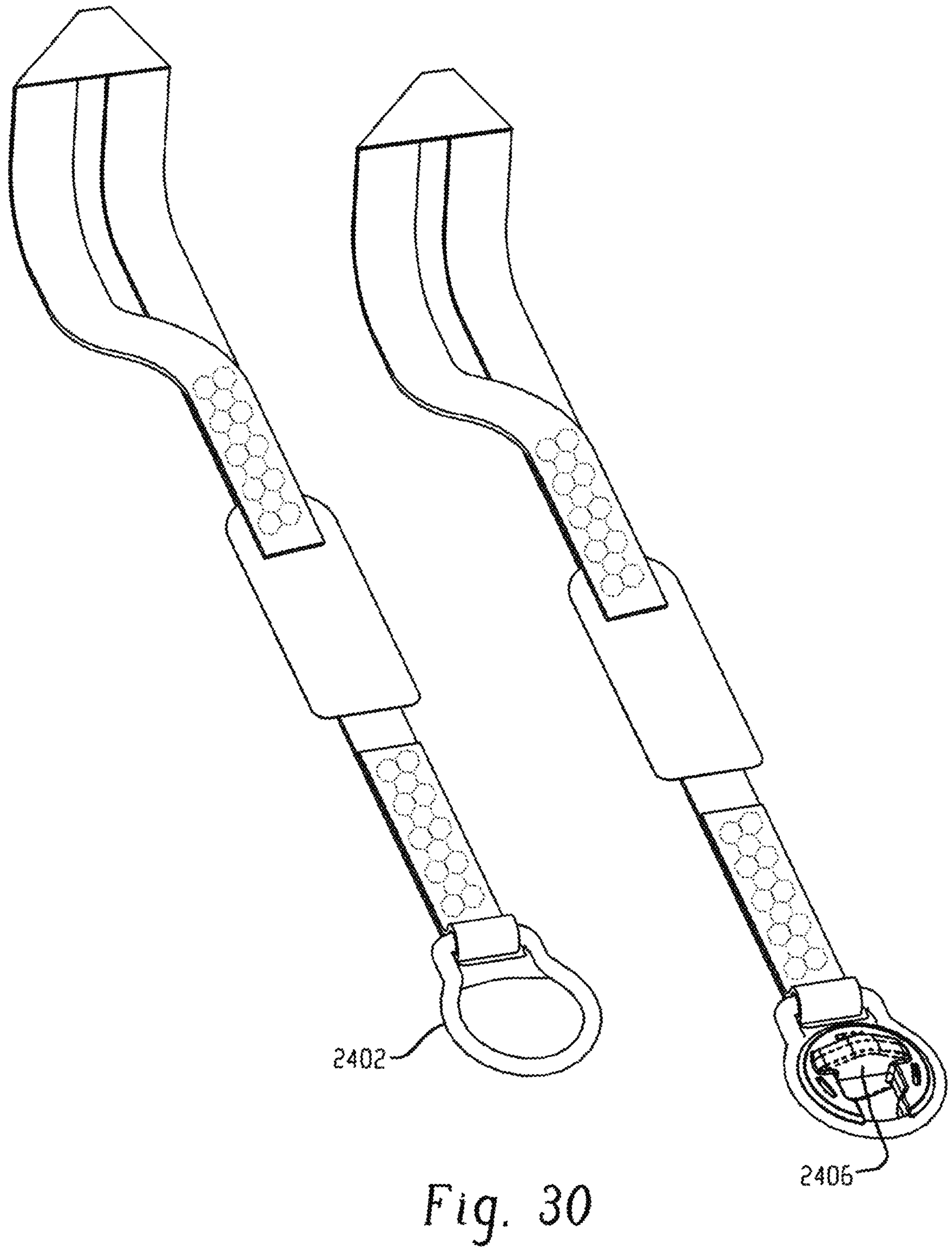
FIG. 30 is a diagram depicting the connection structure with and without the rotatable housing.

FIG. 30 depicts an example connection loop before and after a housing is installed therein. In some non-limiting embodiments or aspects, the housing 2406 may be sized to fit within the connection loop 2402, as shown in FIG. 30. The edge surfaces 2530, 2530' of the first and second components 2510, 2520 form a outer surface of the housing 2406 that allows for the housing 2406 to rotate within the connection loop 2402. Therefore, the housing 2406 may rotate with the connector 200, when the connection structure 2400 is received by the connector 200. The identification element 2420 may be placed adjacent to the connection sensor assembly 214 on the connector 200. As the housing 2406 rotates with the connector 200 (e.g., in response to relative movement of the connector 200), the identification element 2420 follows the connection sensor assembly 214 to maintain a good readability of the identification element 2420.

Figure 31A:
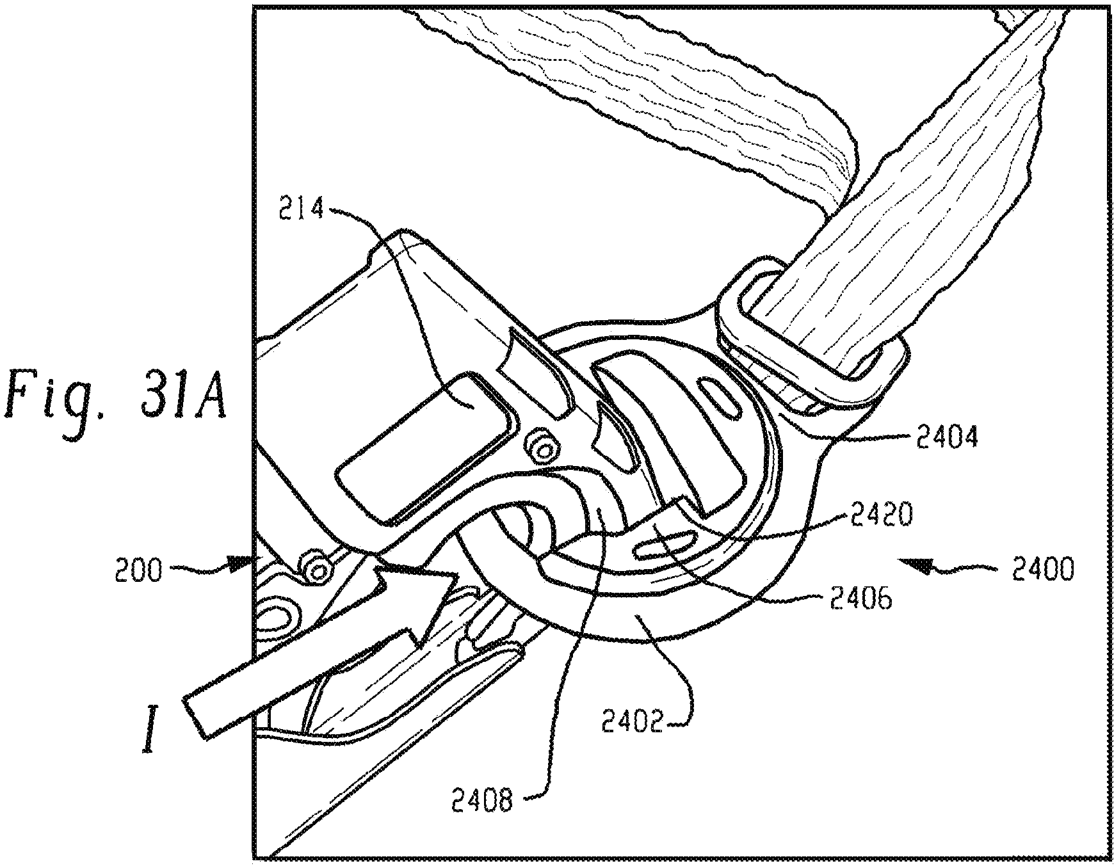
FIG. 31A is a diagram showing the rotatable housing at Position I.
Figure 31B:
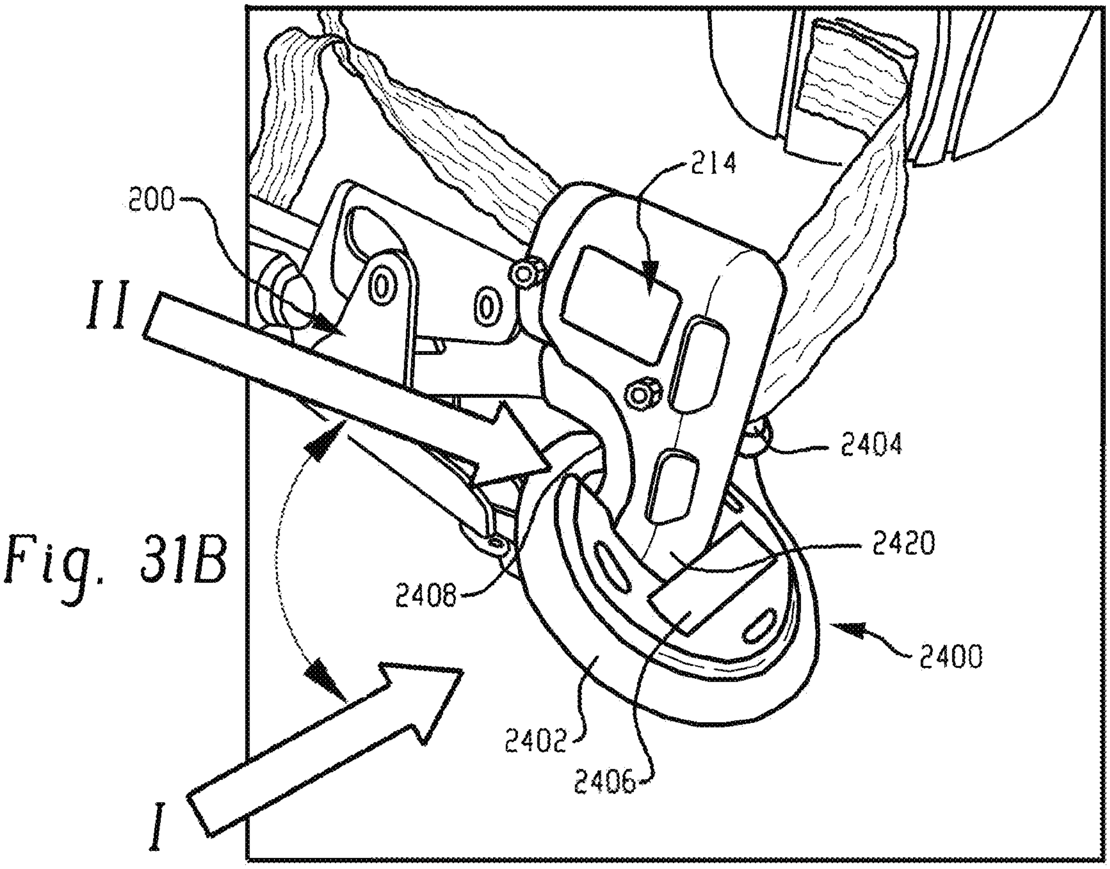
FIG. 31B is a diagram showing the rotatable housing at Position 2 after moving with the connector from Position I to Position II.

As noted above, in embodiments, the housing 2406 may be configured to rotate within the connection loop 2402 based on relative movement of the connector 200. FIGS. 31A-B depict the housing 2406 and the connector 200 rotating together from Position I to Position II. Position I may be a starting position when the connector receives the connection structure. When in Position I, the housing 2406 is turned such that the identification element 2406 is disposed between connection point aperture 2408 anchor 2404. Position II may be any position other than Position I around the loop. In performing actions while connector 200 is connected to the connection structure, the user may move such that the housing 2406 rotates within the connection structure. A closefitting aperture, in accordance with some non-limiting embodiments or aspects, may keep the identification element 2406 close to the connection sensor assembly 214, facilitating the identification element being more reliably read by a sensor associated with the connector.

Fall protection compliance systems as described herein may be implemented in a variety of use cases. In one example, a connector 200 is connected to a structure and is configured for further connection to a connection structure 300 (e.g., a connection device) that is attached to a user, such as a ring (e.g., a D ring) attached to a harness that the user is wearing. In some instances, the connector 200 is attached to a permanent or semi-permanent structure, such as a beam of a building structure. In other instances, the connector 200 is connected to a transitory structure or a structure that is designed to move, such as a top structure of a forklift or a scissor lift. In certain of these instances, the connector 200 may be in a position where it can receive power from an external power source while in operation (e.g., from a building power source when the connector 200 is connected to a permanent structure, from a battery associated with the forklift). In other instances, the connector 200 is not connected to a power source when in operation, such that the connector 200 operates on battery power.

Figure 32:
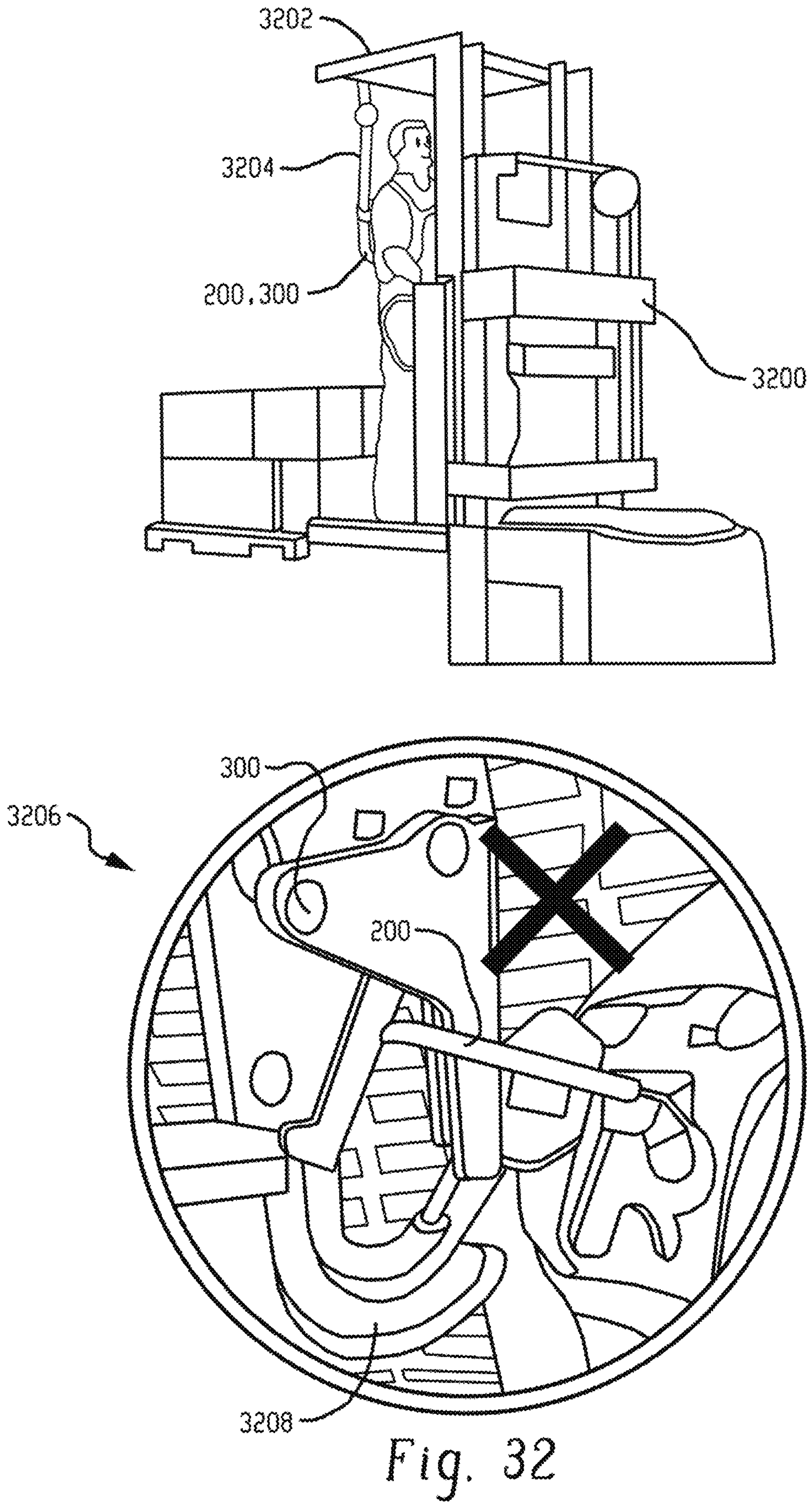
FIG. 32 is a diagram depicting a user operating a forklift, where the user is connected to a top structure of the forklift via a personal fall limiter.

FIG. 32 is a diagram depicting a user operating a forklift, where the user is connected to a top structure of the forklift via a personal fall limiter. A forklift 3200 includes a top structure 3202 that, in the embodiment of FIG. 32 forms a roof that raises and lowers with the platform and forks that are respectively supporting the user and a pallet holding boxes that are being raised or lower. The top structure 3202 is rigid and configured to support the user should the user fall from the platform on which they are standing. The user is connected to the top structure 3202 via a personal fall limiter 3204, such as an SRL as described herein. In embodiments, the fall limiter 3204 includes a connection device 300 configured to attach to a connector 200 (e.g., attached to a harness that the user is wearing). In embodiments, the connection device 300 (or the connector 200) is configured to monitor connection compliance, such as via one or more sensors. In some examples, the fall protection compliance system is configured to disallow operation of the fork lift when the user is not properly connected to the fork lift. In such examples, when a proper connection is detected (or an improper connection is not detected), a signal is transmitted to the fork lift allowing normal operation, such that the forks can be raised or lowered. The absence of that signal prohibits the user from raising and lowering the forks. In other examples, the presence of a signal indicating no/an improper connection prohibits operation. In one example, the connection device 300 is connected to the fork lift 3200 via the top structure 3202 over a wired connection through the personal fall limiter 3204, where that wired connection provides a path for both power to the connection device 300 and for signals between the connection device 300 and the fork lift 3200. In other embodiments, the connection device 300 communicates with the fork lift 3200 via a wireless communication path.

Connection of a user to a supporting structure that is at a limited height above the user can introduce difficulties, including with detecting connection of the user to a connection device 300. An example of this is depicted at 3206. There, a connector 200, taking the form of a D-Ring on the back of a harness worn by the user is held at an elevated position relative to an end portion 3208 of the connection device 300. This may occur when the height of the connector 200 on a standing user is higher than the hanging level of the connection device 300 connected to the fall limiter 3204. As described herein above, in some instances, instruments (piezo sensors, RFID readers, magnetic sensors, inductive sensors) for sensing a connection of the connector 200 to the connection device 300 are positioned at the end portion 3208 and take advantage of the typical close proximity of the connector 200 to the end portion 3208. The relative positioning of the connector 200 to the connection device 300 depicted at 3206 can create sensing challenges. Certain sensors that are based on forces, induction, or other phenomena based on contact or near contact between the connector 200 and the end portion 3208 may function suboptimally when the connector 200 is frequently spaced from the end portion 3208 where those sensors are often positioned. In instances where the connector 200 includes an identification element, such as an RFID tag, a reader positioned in the end portion 3208 may also not consistently read the identification element when the connector 200 is not consistently positioned touching or in close proximity to the end portion 3208.

It may also be desired to confirm that a user is safely connected to an approved anchor point. For example, some structures, such as a fork lift or a scissor lift, may include a number of points where a connection device (e.g., a snap hook) could be connected. But certain of those possible connection points may not be designed to support the weight of the user, especially during a fall. So in some instances, it may be desired to not only confirm that a user is connected to some structure, it may further be desired to determine whether the user is connected to an approved anchor point, where operation of a machine may be controlled accordingly. Certain systems and methods herein provide solutions that address certain of these goals and obstacles.

Figure 33:
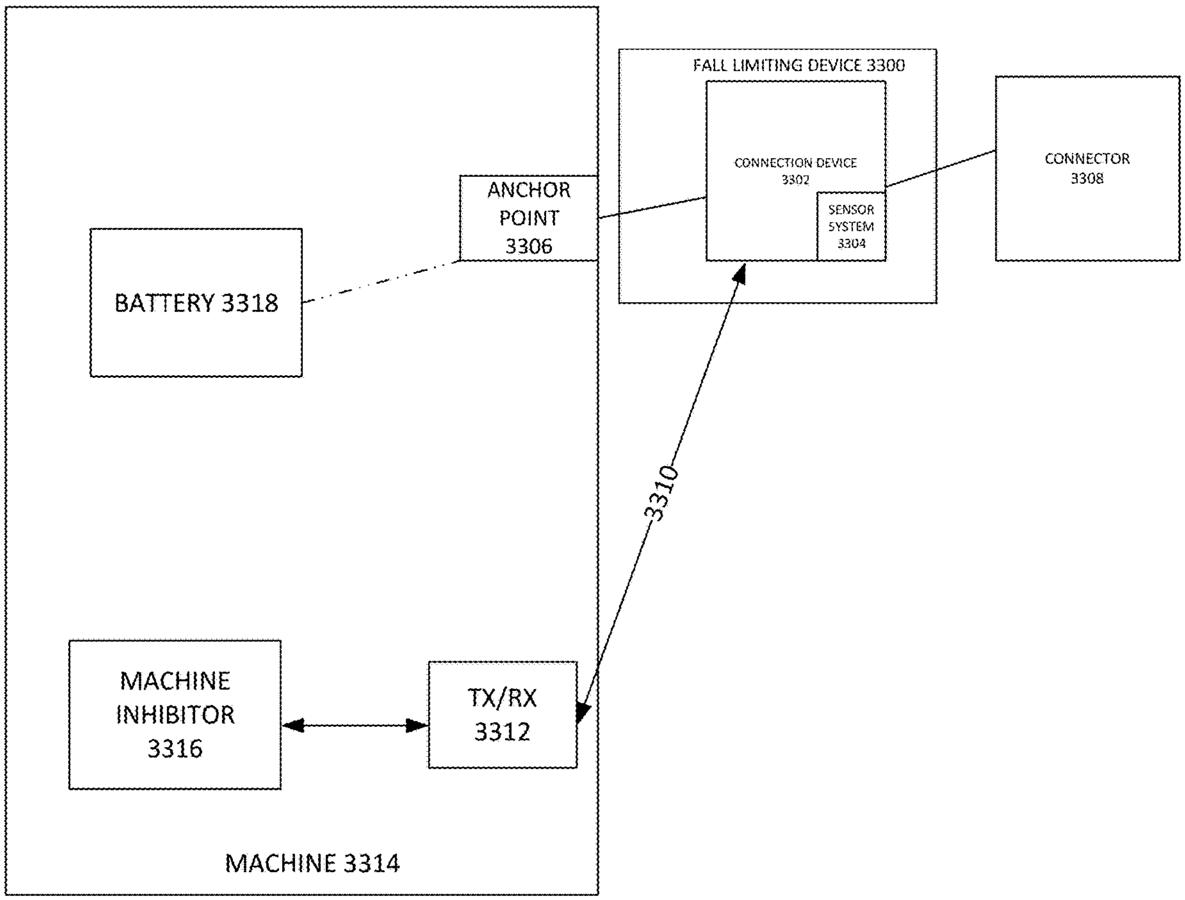
FIG. 33 is a diagram depicting a system for monitoring fall protection compliance.

FIG. 33 is a diagram depicting a system for monitoring fall protection compliance. The system includes a fall limiting device 3300 that includes a connection device 3302 (e.g., a snap hook, a carabiner) and a sensor system 3304. The fall limiting device 3300 is connected to an anchor point 3306. The sensor system 3304 is associated with the connection device 3302 and may be instrumented on the connection device 3302 or external to the connection device 3302. The sensor system 3304 is configured to determine whether a connector 3308 (e.g., a D-ring on a user harness) is connected to the connection device 3302. The sensor system 3304 is configured to transmit a signal 3310 based on detecting that the connector 3308 is connected to the connection device 3302. In one example, the signal 3310 is transmitted via a wireless signal to a transmitter/receiver module 3312 associated with a machine 3314. In another example, the signal 3310 is transmitted to the machine 3314 via a wired connection, e.g., via a cable of a self-retracting lanyard of the fall limiting device 3300 connecting the connection device 3302 to the anchor point 3306. Operation of the machine 3314 associated with the anchor point 3306 is controlled based on the signal 3310. In one example, the machine 3314 includes a machine inhibitor 3316 that prevents all or some operation (e.g., raising or lowering of a fork lift or scissor lift) when the signal 3310 indicates that a proper connection between the connector 3308 and the connection device 3302 is not present, or in the absence of a signal indicating the connection between those entities 3302, 3308 is in place.

In the example of FIG. 33, the connection device 3302 having the sensor system 3304 is permanently or substantially continuously connected to the machine 3314 via the anchor point 3306, where the connector 3308 is then periodically connected to the connection device 3302. In such an example, power may be provided to the sensor system 3304 via a wired connection from the machine 3314 (e.g., drawing from a battery 3318 on the machine 3314), such that the sensor system 3304 may require limited or no battery to operate. While certain battery saving techniques described herein may still be utilized in the example of FIG. 33, those techniques become even more beneficial in instances where the sensor system is present on a structure that is only intermediately connected to the machine 3314.

Figure 34:
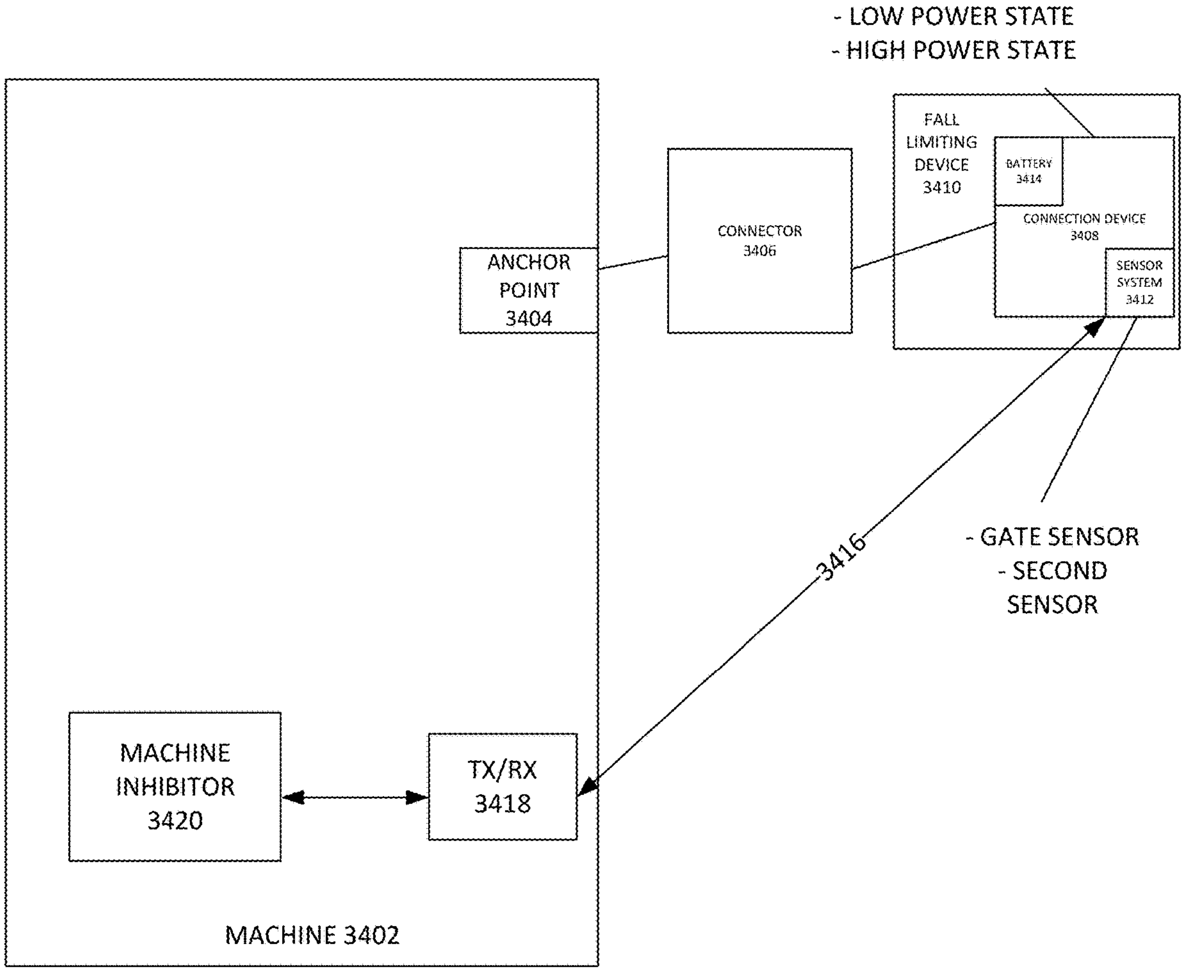
FIG. 34 is a diagram illustrating a compliance monitoring system in which a sensor system is intermittently connected to a machine.

FIG. 34 is a diagram illustrating a compliance monitoring system in which a sensor system is intermittently connected to a machine. FIG. 34 includes a machine 3402 having an anchor point 3404 that is sufficiently reinforced to withstand a force expected by a falling user connected to the anchor point via a connector 3406 (e.g., a carabiner, a D ring) that is further connected to a connection device 3408 of a fall limiting device 3410. The connection device 3408 (e.g., a snap hook, a carabiner) is instrumented with a sensor system 3412 for monitoring compliance of connection between the connector 3406 and the connection device 3408. Because the sensor system 3412 is remote from any power source (e.g., a battery of the machine 3402), the connection device 3408 includes a battery 3414 for powering the sensor system 3412.

The use of a battery 3414 in the example of FIG. 34 potentially adds complexity to the system. The use of a battery 3414 provides a benefit, in some instances, of incorporating battery saving techniques into a compliance monitoring system. In embodiments, battery saving techniques may include instrumenting a sensor system 3412 with multiple sensors for monitoring compliance. For example, a first sensor may monitor a first condition, such as a position of a gate of a snap hook. A signal from that first sensor can be used as a wakeup signal for a second sensor and other processing of the sensor system 3412. A gate sensor may take a variety of forms as described herein. In embodiments, the gate sensor takes the form of an ultrasonic or an optical sensor (e.g., a light or laser curtain, video) that is configured to sense movement of the gate.

In one example, a first gate sensor is used to indicate when the gate of a snap hook is open, a condition that indicates a connector 3406 may be being inserted or removed from the snap hook. An open gate signal may wake up a second, connection sensor that may detect conditions such as whether or not a connector 3406 is currently within the snap hook as well as properties associated with any detected connector 3406. For example, when the sensor system 3412 detects an open gate via the first sensor, a connector 3406 within the snap hook via the second sensor, and a closed gate via the first sensor, the sensor system 3412 may determine that the connection device 3408 is connected to a connector 3406 and transmit a signal 3416 to the machine 3402 via its transmitter/receiver 3418. That signal may be forwarded to the machine inhibitor 3420, which may allow operation of the machine 3402 based on the connected status. The first and/or second sensor and/or other processing functionality of the sensor system 3412 may then be put into a low power state.

In another example, where the sensor system 3412 has previously detected a connection between the connector 3406 and the connection device 3408, a detection of an open gate by the first sensor may again wake the second sensor. Should the second sensor then detect the absence of the connector 3406 within the snap hook followed by a closed gate signal from the first sensor, the sensor system may determine that the connector 3406 is no longer connected to the connection device 3408. The sensor system 3412 may send a no connection signal 3416 to the machine 3402, where the machine inhibitor 3420 then prohibits all or certain operations of the machine. The first and/or second sensor and/or other processing functionality of the sensor system 3412 may then be put into a low power state.

In a further example, where the first, gate sensor detects an opening of the gate followed by a closing of the gate, where the second connection sensor does not detect a change in the status of the connection between the connector 3406 and the connection device 3408, a repeat of the previous connection status signal 3416 or no additional signal may be transmitted to the machine 3402 such that its operational state remains the same. The system may then return to a low power state. In other examples, a system that is awoken by an open gate signal from the first sensor, where no further detection of a change of state by either the first sensor or the second sensor is received for a period of time may return to a low power state. Alternatively, an open gate signal that is not followed by a closed gate signal may be a cause for the system to issue an alarm based on an indication of a possible unintentional improper connection (e.g., clothing or other obstruction of the gate of the snap hook resulting in an partially open gate and unsecure connection that could be dislodged in a fall).

The sensor system 3412 may detect and report other connection data via the link at 3416. For example, the sensor system 3412 may periodically send data regarding a continuity of connection to the machine, where that periodic signal is required for the machine inhibitor 3420 to continue to allow operation of the machine 3402. In one example, the sensor system 3412 is equipped with sensors that detect motion of the connection device 3408 that indicate that a user remains connected to the connection device 3408 (e.g., the user has not taken off his harness). Such sensors may include a gyroscope, a sensor (e.g., a light sensor, a lifeline-friction-turned wheel) that monitors paying out and retraction of a life line between the connection device 3408 and the connector 3406, or a piezo sensor embedded in the connection device 3408. In one embodiment, certain periodic motion is excluded from qualifying as indicating continuity of connection, where such periodic motion could be the result of a hanging connection device 3408 with no user attached (e.g., the user removes a harness and allows it to hang from the connector 3406 via the connected connection device 3408).

The sensor system 3412 may be equipped with a variety of sensors for detecting connection, characteristics of the connection, and continuity of connection. In embodiments, the sensor system 3412 includes one or more of an RFID reader, a barcode scanner, a QR scanner, an inductive sensor, a capacitive sensor, a magnetic sensor, an infrared proximity sensor, an accelerometer, and a strain gauge In one example the connection device 3408 is configured to use motion of the device 3408 for energy harvesting to recharge the battery 3414. For example, current generated at a piezo sensor embedded in a snap hook could be routed to the battery for 3414 for charging. In another example, winding or unwinding of a drum holding a lifeline of the fall limiting device 3410 could be used as a generator of current for charging of the battery 3414 extending the life of the sensor system 3412 between recharges.

Figure 35:
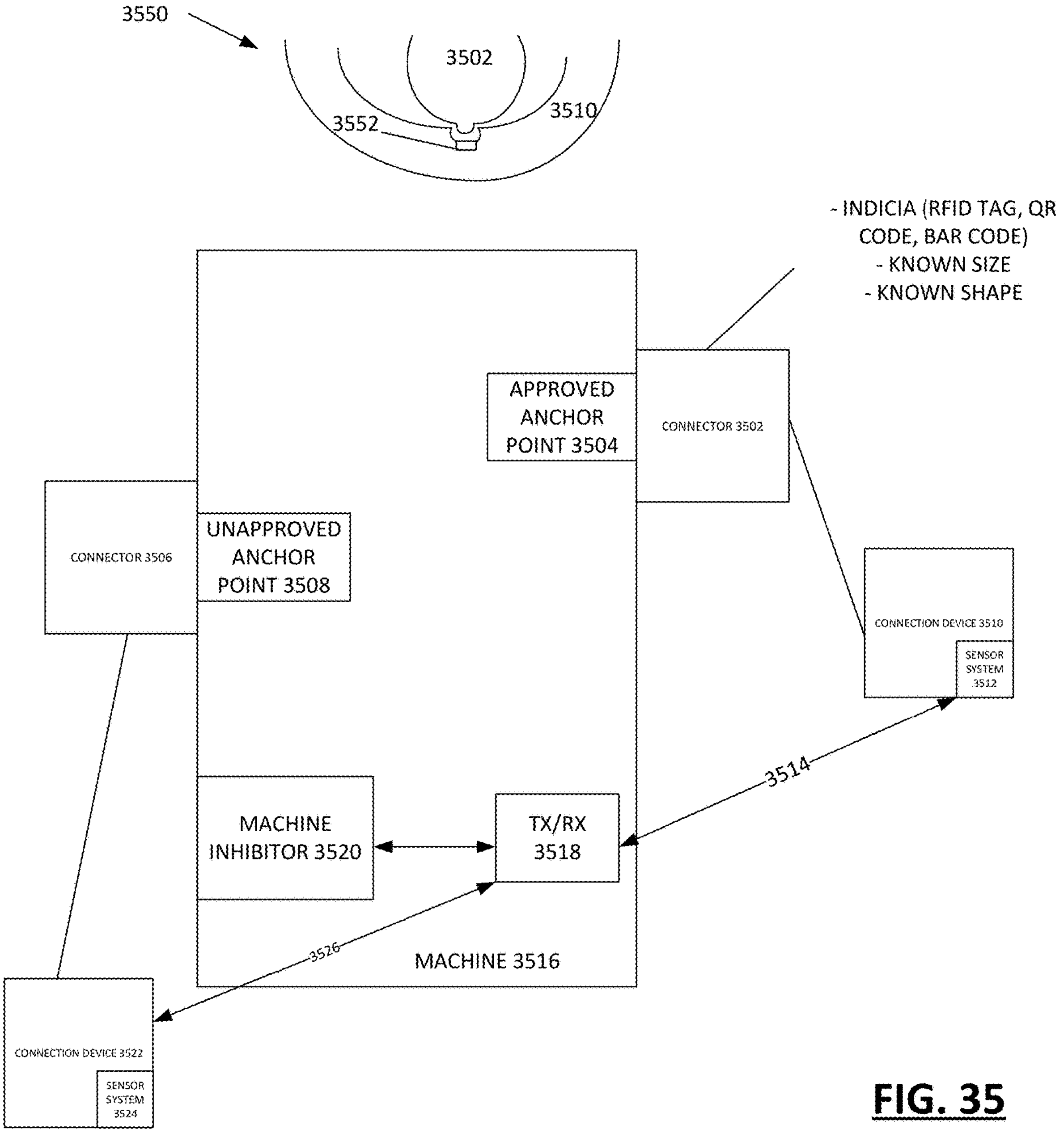
FIG. 35 is a diagram depicting a fall protection compliance system that determines whether the connection device is connected to an approved anchor point based on a characteristic of a connector.

In addition to detecting whether or not the connection device is connected to a connector, a sensor system may be configured to determine characteristics of the connector to which a connection device is connected. FIG. 35 is a diagram depicting a fall protection compliance system that determines whether the connection device is connected to an approved anchor point based on a characteristic of a connector. In FIG. 35, a first connector 3502 is connected to an approved anchor point 3504, while a second connector 3506 is connected to an unapproved anchor point 3508. (In examples, the connector 3502 may be the anchor point 3504 itself (e.g., the anchor point 3504 and the connector 3502 are the same structure), such that the sensor system 3512 is sensing characteristics of the anchor point 3504 rather than a separate connector 3502.) A first connection device 3510 is connected to the connector 3502 connected to the approved anchor point 3504. The sensor system 3512 of the first connection device 3510 determines one or more of (i) that the connection device 3510 is connected to some connector 3502; and (ii) that the connection device 3510 is connected to an approved anchor point 3504 connector. Sensor systems may detect an approved anchor point 3504 connection in a variety of ways. For example, connectors 3502 that are connected to approved anchor points 3504 may have particular characteristics that are detectable by a sensor system 3512. For example, such connectors 3502 may have a particular size or shape that can be detected by the sensor system 3512. For example, as depicted at 3550, the connector 3502 may include a protrusion that is able to contact a switch 3552 on an internal surface of the connection device (e.g., in a key fashion), such that that detected protrusion indicates a connector 3502 at an approved connection point 3504. In another example, the connector 3502 is made of a particular metal (e.g., magnetic) or has other properties (e.g., a continuous vibration, a periodic vibration, a signature vibration that indicates a particular connector, a small voltage) that can be detected by the sensor system 3512. In a further example, the connector 3502 includes visual indicia (e.g., a bar code, a QR code) or other indicia (e.g., an RFID tag) that can be read by a sensor of the sensor system 3512. In an additional example, an ultrasonic or optical sensor is configured to detect passage of the connector 3502 through the gate (e.g., into or out of a snap hook).

Based on detection of connection to an approved anchor point 3504, the sensor system is configured to send a signal 3514 to the machine 3516 via 3518 to control operation of the machine 3516, such as using the machine inhibitor 3520. In an alternative embodiment, the signal 3514 transmits other data (e.g., raw sensor data, the detected property of the connector 3502), where another processor (e.g., at the machine inhibitor 3520) determines whether the received data signal 3514 indicates connection to an approved anchor point 3504 and acts accordingly.

Certain machines may also include unapproved anchor points 3508 to which a connector 3506 might be attached. For example, a scissor lift might include certain rails that are designed to prevent a user from falling off the lift but are not sufficiently reenforced to support arresting the fall of a user. While those rails might be shaped so as to have a connector 3506 or a connection device 3522 connected thereto, it may be desirable to not allow operation of the machine when the connection device 3522 is not connected to an approved anchor point 3504. In one example, the connection device 3522 is able to detect, and in some embodiments report to the machine 3516, that the device 3522 is connected to a connector 3506 (or to the unapproved anchor point 3508 directly). But because that connector 3506 does not have the detectable indicia of an approved anchor point 3504, the sensor system 3524 is unable to report that the connection device 3522 is connected to an approved anchor point. In another example, the failure to detect indicia of an approved anchor point 3504 results in the sensor system 3524 determining that no connection is made at all, where a no connection signal may be sent at 3526, or no connection signal at all is sent via 3526 to the machine 3516.

Figure 36:
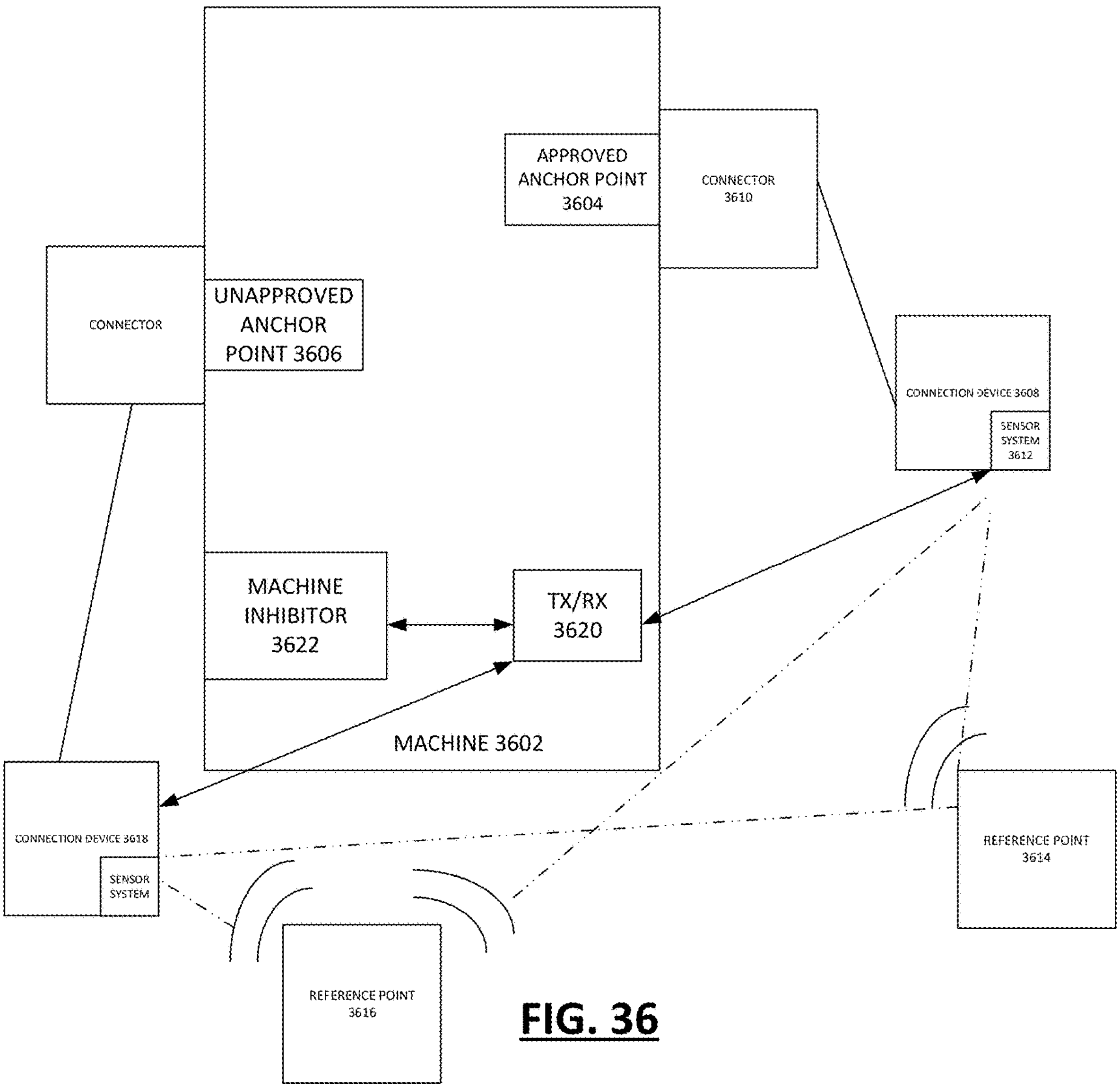
FIG. 36 is a diagram depicting for fall protection compliance that uses reference points for detection of connection to an approved anchor point.

In one embodiment, connection to an approved anchor point is detected based on time of flight of signals from one or more reference points. FIG. 36 is a diagram depicting for fall protection compliance that uses reference points for detection of connection to an approved anchor point. A machine 3602 includes an approved anchor point 3604 and an unapproved anchor point 3606. A first connection device 3608 is connected to a connector 3610 attached to the approved anchor point 3604. A sensor system 3612 of the first connection device 3608 is configured to detect connection to the connector 3610. The sensor system 3612 is further configured to determine whether the connection device 3608 is connected to an approved anchor point based on a time of flight of signals from one or more reference points 3614, 3616. Each of the reference points 3614, 3616 transmits (e.g., periodically) a signal, which may be encoded with data identifying the reference point or a location of the reference point (e.g., on an x-y coordinate field). Based on a one way or two way time of flight calculation by the sensor system 3612 or the reference point 3614, 3616, a distance between the connection device 3608 and the reference point(s) 3614, 3616 can be determined. Those distances can be used to determine a position of the connection device relative to the machine 3602 and its connection devices 3604, 3606 (e.g., where three reference points are used, an exact x-y position of the connection device 3608 can be determined). Alone, or in combination with other data such as a life line length between the connection device 3608 and the connector 3610, a system can determine whether the connection device 3608 is proximate to an approved anchor point 3604. If the connection device is too far from an approved connection point, as second connection device 3618 is, then the fall protection compliance system may determine that the second connection device 3618 is not connected to an approved connection point, while the first connection device 3608 is. The connection devices 3608, 3618 transmit data to the machine via 3620, where the machine inhibitor 3622 controls the machine 3602 based on that data, such as prohibiting operation of the machine without confirmation that the connection device 3608 is connected to an approved anchor point 3604.

Figure 37:
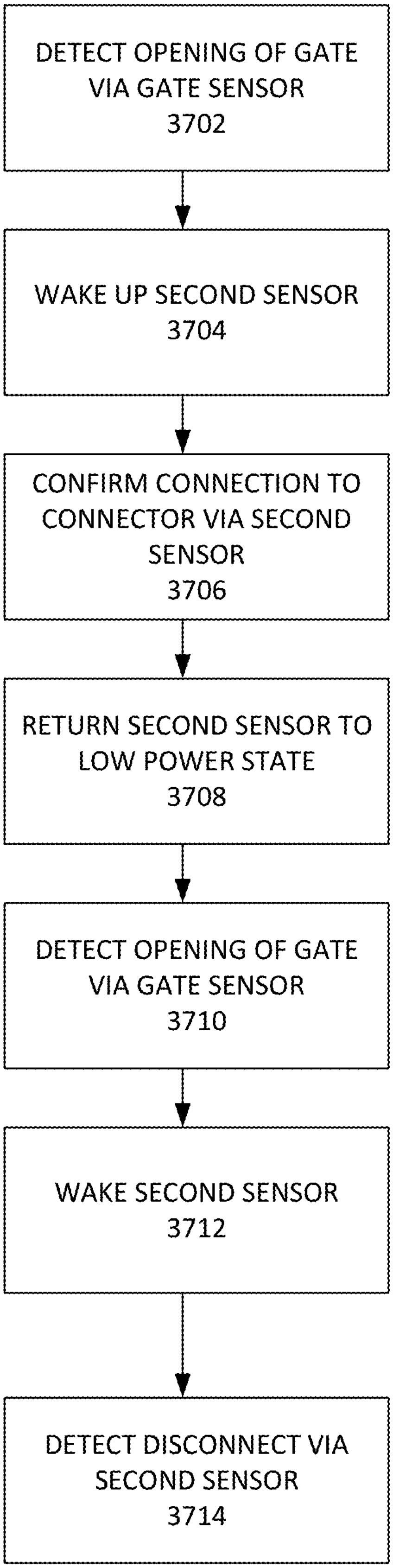
FIG. 37 is a flow diagram depicting a processor-implemented method of detecting fall protection compliance.

FIG. 37 is a flow diagram depicting a processor-implemented method of detecting fall protection compliance. At 3702, a gate sensor of a connection device detects opening of a gate of a carabiner or snap hook. At 3704, a second sensor is awakened from a low power state based on the detection at 3702. At 3706, the second sensor confirms connection of the connection device to a connector and transmits a signal indicating such. Upon detection at 3706 (or after a threshold period of time), the second sensor is returned to a low power state at 3708. At 3710, the gate sensor again detects opening of the gate and wakes the second sensor of the connection device at 3712. The second sensor detects a disconnecting of the connection device from the connector at 3714 and transmits a signal accordingly.

Although the disclosure has been described in detail for the purpose of illustration based on what are currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising: a fall limiting device, the fall limiting device comprising: a connection device; and a sensor system associated with the connection device, wherein the sensor system is configured to determine whether an approved connector is connected to the connection device and to transmit a signal based on detecting that the approved connector is connected to the connection device, wherein operation of a machine associated with the approved connector is controlled based on the signal; wherein the approved connector is determined to be approved based on time of flight of signals from a plurality of transmitters at known locations.

2. The system of claim 1, wherein the machine is prohibited from operating in the absence of the signal indicating that the connector is connected to the connection device.

3. The system of claim 1, wherein the approved connector is associated with a known location;
- wherein an estimated location is determined based on the signals from the plurality of transmitters;
- wherein the approved connector is determined to be approved based on the known location and the estimated location.

4. The system of claim 3, wherein the sensor system determines that the connection device is not connected to the approved connector when the known location is greater than a threshold distance from the estimated location.

5. The system of claim 1, wherein the signals from the plurality of transmitters are received from exactly three transmitters.

6. The system of claim 1, wherein the signals from the plurality of transmitters are received from exactly two transmitters.

7. The system of claim 1, wherein each of the plurality of transmitters periodically transmits a respective one of the signals from the plurality of transmitters.

8. The system of claim 3, wherein a particular one of the transmitters transmits its respective signal in response to a signal from the sensor system;
- wherein the estimated location is based on a two way time of flight between the sensor system and the particular transmitter.

9. The system of claim 1, wherein a signal from a particular one of the transmitters is encoded with data identifying the particular transmitter.

10. The system of claim 1, wherein a signal from a particular one of the transmitters is encoded with data identifying a location of the particular transmitter.

11. A method of determining whether a fall limiting device is connected to an approved connector, comprising:
- detecting that a connection device of the fall limiting device is connected to a connector;
- receiving a signal from a first transmitter associated with a first known location;

receiving a signal from a second transmitter associated with a second known location;

determining an estimated location of the connector based on the signal from the first transmitter and the signal from a second transmitter;

determining whether the estimated location is within a predetermined distance from a known location of an approved connection; and outputting a control signal based on the determination of whether the estimated location is within the predetermined distance.

12. The method of claim 11, further comprising inhibiting operation of a machine when the estimated location is not within the predetermined distance of the known location of the approved connection.

13. The method of claim 11, further comprising:

receiving a signal from a third transmitter associated with a third known location;

determining an estimated location of the connector further based on the signal from the third transmitter.

14. The method of claim 11, wherein the estimated location is determined based on signals from exactly three transmitters.

15. The method of claim 11, wherein the estimated location is determined based on signals from exactly two transmitters.

16. The method of claim 11, further comprising:

periodically repeating said receiving a signal from a first transmitter; receiving a signal from a second transmitter; determining an estimated location; and determining whether the estimated location is within the predetermined distance.

17. The method of claim 11, further comprising:

transmitting a polling signal from the fall limiting device;

wherein the signal from the first transmitter and the signal from the second transmitter are received based on the polling signal.

18. The method of claim 11, wherein the signal from the first transmitter is encoded with data identifying the first transmitter.

19. The method of claim 11, wherein the signal from the first transmitter is encoded with data identifying a location of the first transmitter.

20. The method of claim 11, wherein the estimated location is determined based on a time of flight of the signal from the first transmitter and a time of flight of the signal from the second transmitter.

* * * * *